(12) United States Patent
Cassella et al.

(10) Patent No.: US 11,761,825 B2
(45) Date of Patent: Sep. 19, 2023

(54) SUBHARMONIC TAGS FOR REMOTE CONTINUOUS AND THRESHOLD SENSING

(71) Applicant: Northeastern University, Boston, MA (US)

(72) Inventors: Cristian Cassella, Boston, MA (US); Hussein Hussein, Boston, MA (US); Matteo Rinaldi, Boston, MA (US)

(73) Assignee: Northeastern University, Boston, MA (US)

( * ) Notice: Subject to any disclaimer, the term of this patent is extended or adjusted under 35 U.S.C. 154(b) by 229 days.

(21) Appl. No.: 17/226,182

(22) Filed: Apr. 9, 2021

(65) Prior Publication Data

US 2021/0318178 A1 Oct. 14, 2021

Related U.S. Application Data

(60) Provisional application No. 63/124,228, filed on Dec. 11, 2020, provisional application No. 63/119,601, (Continued)

(51) Int. Cl.
*G01K 7/22* (2006.01)
*H04B 5/00* (2006.01)
(Continued)

(52) U.S. Cl.
CPC .............. *G01K 7/22* (2013.01); *G01K 7/34* (2013.01); *H04B 5/0031* (2013.01); *H04B 5/0062* (2013.01); *G01K 1/024* (2013.01)

(58) Field of Classification Search
CPC . G01K 7/22; G01K 7/34; G01K 1/024; H04B 5/0031; H04B 5/0062
See application file for complete search history.

(56) References Cited

U.S. PATENT DOCUMENTS

| 6,278,379 B1* | 8/2001 | Allen .................. G01L 19/0092 340/447 |
| 10,182,328 B1* | 1/2019 | Maibach ............... G07F 19/209 |

(Continued)

FOREIGN PATENT DOCUMENTS

WO 2017082985 A2 5/2017

OTHER PUBLICATIONS

Hussein et al., "Chip-less and battery-less subharmonic tag for wireless sensing with parametrically enhanced sensitivity and dynamic range", Sci Rep 11, 3782, pp. 1-11 (2021). https://doi.org/10.1038/s41598-021-82894-x.

(Continued)

*Primary Examiner* — Nathaniel T Woodward
*Assistant Examiner* — Philip L Cotey
(74) *Attorney, Agent, or Firm* — Verrill Dana, LLP

(57) ABSTRACT

A sensing device is provided having sensing circuitry, connected to an input port and the output port, with a sensor having an impedance sensitive to a parameter of interest, one or more passive electrical components, and a variable capacitor. The sensing circuitry is triggered to generate an output signal for transmission from the output port, the output signal dependent on the parameter of interest sensed by the sensor and on an input power value, $P_{in}$, of an input signal received at the input port being greater than a parametric threshold power value, $P_{th}$. A sensing system includes the sensing device and a transmitting device to transmit the input signal to the sensing device at a frequency representative of the parameter of interest. A receiving device, which can be incorporated with or located remotely from the transmitting device, receives the output signal of the sensing device, which has a frequency that is half of the frequency of the input signal transmitted by the transmitting device.

18 Claims, 29 Drawing Sheets

Related U.S. Application Data filed on Nov. 30, 2020, provisional application No. 63/116,958, filed on Nov. 23, 2020, provisional application No. 63/008,093, filed on Apr. 10, 2020.

(51) Int. Cl.
  *G01K 7/34* (2006.01)
  *G01K 1/024* (2021.01)

(56) References Cited

U.S. PATENT DOCUMENTS

| | | | |
|---|---|---|---|
| 2010/0198039 A1* | 8/2010 | Towe | A61B 5/076 600/373 |
| 2012/0242160 A1* | 9/2012 | Tseng | H02J 50/80 307/104 |
| 2015/0115983 A1* | 4/2015 | Potyrailo | G01N 33/2888 324/693 |
| 2015/0128707 A1* | 5/2015 | Viikari | G01H 13/00 73/584 |
| 2016/0328584 A1* | 11/2016 | Rokhsaz | G06K 7/10326 |
| 2017/0201004 A1* | 7/2017 | Rokhsaz | G06K 19/07788 |
| 2017/0258363 A1* | 9/2017 | Towe | A61B 5/0031 |
| 2018/0018481 A1* | 1/2018 | Paulson | G01K 1/024 |
| 2018/0040939 A1* | 2/2018 | Rokhsaz | G06K 19/07788 |
| 2019/0360877 A1* | 11/2019 | Schalles | G01K 7/36 |
| 2020/0012008 A1* | 1/2020 | Chen | G01L 9/007 |
| 2020/0380062 A1* | 12/2020 | Li | G06F 17/13 |
| 2021/0249862 A1* | 8/2021 | Awal | H03B 5/02 |

OTHER PUBLICATIONS

Hussein et al., "Systematic synthesis and design of ultralow threshold 2:1 Parametric frequency dividers", IEEE Transactions on Microw. Theory Tech. 68, 3497-3509 (2020). arXiv preprint arXiv:2002.09619 (2020).
Cassella et al., "Phase noise suppression through parametric filtering", Appl. Phys. Lett. 110, 063503 (2017). pp. 1-6.
Qian et al., "Zero-power infrared digitizers based on plasmonically enhanced micromechanical photoswitches", Nat. nanotechnology 12, 969-973 (2017).
Kumar et al., "Harmonic RFID communication using conventional UHG system", IEEE J. Radio Freq. Identif. 3, 227-235 (2019).
Lazaro et al., "A passive harmonic tag for humidity sensing", Int. J. Antennas Propag. (2014). pp. 1-12.
Cassella et al., Parametric filtering surpasses resonator noise in AIN contour-mode oscillators. In Proc. IEEE 27th Int. Conf. Micro Electro Mechanical Systems (MEMS), 1269-1272 (2014).
Cassella et al., "Low phase-noise autonomous parametric oscillator based on a 226.7 MHz AIN contour-mode resonator", Freq. Control. IEEE Transactions on Ultrason. Ferroelectr. 62, 617-624 (2015).
Melville et al., "Experimental investigation of bifurcation behavior in nonlinear microwave circuits", IEEE Transactions on Microw. Theory Tech. 65, 1545-1559 (2017).
Vivaldi et al., "A temperature-sensitive RFID tag for the identification of cold chain failures", Sensors and Actuators A 313, 112182 (2020) pp. 1-6.
Badia-Melis et al., "Assessing the dynamic behavior of WSN motes and RFID semi-passive tags for temperature monitoring", Comput. Electron. Agric. 103, 11-16 (2014).
Qi et al., "Full passive UHG RFID tag with an ultra-low power, small area, high resolution temperature sensor suitable for environment monitoring", Microelectron. J. 45, 126-131 (2014).
Jiang et al., "Reconfigurable sensing antennas integrated with thermal switches for wireless temperature monitoring", IEEE Antennas Wirel. Propag. Lett. 12, 914-917 (2013).
Jiang et al., "Reconfigurable RFID tag antenna for wireless temperature monitoring", In Proc. IEEE Int. Symp. Antennas and Propagation, pp. 1-2 (2012).
Bhattacharyya et al., "RFID tag antenna based temperature sensing using shape memory polymer actuation", In Proc. IEEE Sensors, 2363-2368 (2010).
Wang et al., "Single event recording of temperature and tilt using liquid metal with RFID tags", IEEE Sensors J. 20, 3249-3256 (2020).
Shafiq et al., "A Passive RFID Temperature Sensing Antenna With Liquid Crystal Elastomer Switching", IEEE Access 8, pp. 24443-24456 (2020).
Fathi et al., "Potential Chipless RFID Sensore for Food Packaging Applications: A Review", IEEE Sensors J. 20, pp. 9618-9636 (2020).

\* cited by examiner

SUBHARMONIC TAGS FOR REMOTE CONTINUOUS AND THRESHOLD SENSING

CROSS REFERENCE TO RELATED APPLICATIONS

This application claims priority under 35 U.S.C. § 119(e) of U.S. Provisional Application No. 63/008,093, filed on 10 Apr. 2020, entitled "Acoustic-Based Passive Transponder System for Continuous Sensing and Threshold Sensing"; U.S. Provisional Application No. 63/116,958, filed on 23 Nov. 2020, entitled "Acoustic-Based Passive Transponder System for Continuous Sensing and Threshold Sensing"; U.S. Provisional Application No. 63/119,601, filed on 30 Nov. 2020, entitled "Ultra High Frequency Sub-Harmonic Tags for Sensing and Identification"; and U.S. Provisional Application No. 63/124,228, filed on 11 Dec. 2020, entitled "Acoustic-Based Passive Transponder System for Continuous Sensing and Threshold Sensing"; the disclosures of all of which are hereby incorporated by reference.

STATEMENT REGARDING FEDERALLY SPONSORED RESEARCH OR DEVELOPMENT

This invention was made with government support under Grant Number 1854573 awarded by the National Science Foundation. The United States government has certain rights in the invention.

BACKGROUND

Recently, much attention has been paid to the development of compact and passive radio-frequency (RF) transponders, like RFID-tags, enabling the temperature monitoring of a steadily growing number of different kinds of goods and items. Such effort has been driven by the growing need to protect specialized equipment, such as those used in manufacturing warehouses and data-centers, from undesired increases of their operational temperature. Similarly, the availability of such RF systems can also be beneficial in cold-chain applications, where passive temperature-threshold systems can enable the prompt identification of any perishables, from food to medicine, suddenly exposed to incompatible temperatures. Additionally, the continuously expanding Internet-of-Things (IoT) has created a plethora of smart applications for structural health monitoring, environmental surveys, smart logistics, and more that can also utilize such RF systems.

SUMMARY

Massive deployments of wireless sensor nodes (WSNs) that continuously detect physical, biological or chemical parameters are needed to truly benefit from the unprecedented possibilities opened by the Internet-of-Things (IoT). WSNs using such sensors formed by advanced on-chip designs and microfabrication processes require energy to transmit the sensed information. Consequently, they either contain batteries that need to be periodically replaced or energy harvesting circuits whose low efficiencies prevent a frequent and continuous sensing and impact the maximum range of communication. The technology described herein provides embodiments of chip-less and battery-less tag-based WSNs that do not rely on this paradigm. The technology herein provides WSNs, formed by off-the-shelf lumped components on a printed substrate, that can sense and transmit information without any need of supplied or harvested DC power, while enabling full-duplex transceiver designs for interrogating nodes rendering them immune to their own self-interference. Also, even though the WSNs described herein do not require any advanced and expensive manufacturing, their parametric dynamical behavior enables sensitivities and dynamic ranges that can surpass those achieved by on-chip sensors. The devices described herein can operate in any frequency range, including the Ultra-High-Frequency range, and are capable of passively and continuously detecting parameters of interest, such as temperature, humidity, moisture, pressure, magnetic field, strain, and other environmental, chemical, and physical parameters remotely from an interrogating node.

More particularly, embodiments of a sensing device and sensing system and methods of use thereof are provided that can address continuous and threshold sensing needs for a variety of applications. The sensing device can employ a subharmonic tag incorporating circuitry that can generate and transmit a subharmonic signal in response to an interrogating signal. The sensing device can utilize dynamical characteristics of parametric solid-state components to surpass, in some instances by several orders of magnitude, the sensitivity achieved by conventional linear sensing components and devices. The technology can include CMOS-compatible components to ensure the smallest form-factor and a large-scale production existing IC-facilities. Tools can be created to generate scalable solutions that allow the simultaneous monitoring of multiple devices. The technology can be used with a variety of different applications that have sensing and identification needs.

In some embodiments, the technology can provide a sensing device employing sensing circuitry that includes a sensor having an impedance sensitive to a parameter of interest, one or more passive electrical components, and a variable capacitor connected to the sensing circuitry. The sensing circuitry is triggered to generate an output signal dependent on the parameter of interest for transmission of a power from an output port at a frequency that is half of the one received from an input power when such received power is greater than a parametric power threshold power value, $P_{th}$.

In some embodiments, the technology can provide a sensing system that employs the sensing device and both a reader or receiving device and a transmitting device for transmitting an interrogating input signal to the tag or sensing device at a frequency representative of the parameter of interest. In some embodiments, the reader and the transmitting device can be incorporated in the same component. In some embodiments, the reader or receiving device can be located remotely from the transmitting device.

Further embodiments, aspects, and features include the following:

1. A sensing device comprising:
   an input port and an output port; and
   sensing circuitry, connected to the input port and the output port, comprising:
   a sensor having an impedance sensitive to a parameter of interest,
   one or more passive electrical components, and
   a variable capacitor connected to the sensing circuitry;
   wherein the sensing circuitry is triggered by an input signal to generate an output signal for transmission from the output port, the output signal dependent on the parameter of interest sensed by the sensor and on an input power value, $P_{in}$, of the input signal received at the input port being greater than a parametric threshold power value, $P_{th}$.

2. The device of 1, wherein the parametric threshold power value $P_{th}$ is determined by the impedance of the sensor.

3. The device of any of 1-2, wherein the parametric threshold power value $P_{th}$ is determined by a junction capacitance and tuning range of the variable capacitor.

4. The device of any of 1-3, wherein the parametric threshold power value $P_{th}$ is determined by impedances of the passive electrical components of the sensing circuitry.

5. The device of any of 1-4, wherein the parametric threshold power value $P_{th}$ is determined by the impedance of the sensor, a junction capacitance and tuning range of the variable capacitor, and impedances of the passive electrical components of the sensing circuitry.

6. The device of any of 1-5, wherein the sensing circuitry is operative as a frequency divider circuit to generate the output signal at an output frequency that is half of an input frequency of the input signal.

7. The device of any of 1-6, wherein the parametric threshold power value $P_{th}$ is a minimum power value at which the sensing circuitry is operable.

8. The device of any of 1-7, wherein the sensing circuitry is operative to activate a period doubling mechanism through a super-critical bifurcation triggered by the input power of the input signal.

9. The device of any of 1-8, wherein the sensing circuitry is operative to vary the parametric threshold power value, $P_{th}$, and an output power value, $P_{out}$, of the output signal in response to perturbations of the parameter of interest.

10. The device of any of 1-9, wherein the sensing circuitry is operative to boost a sensitivity to the parameter of interest and a dynamic range of the output power value, Pow, in proximity to a supercritical bifurcation.

11. The device of any of 1-10, wherein a change in the output power value, $P_{out}$, is at least an order of magnitude greater than a perturbation of the input power value, $P_{in}$.

12. The device of any of 1-11, wherein the sensing circuitry is operative as a frequency divider circuit through a sub-critical bifurcation triggered by the input power of the input signal to generate the output signal at an output frequency that is half of an input frequency of the input signal.

13. The device of any of 1-12, wherein the sensing circuitry is operative to exhibit a hysteresis behavior, whereby the output signal remains active when a value of the parameter of interest sensed by the sensor returns to a determined tolerable range of values.

14. The device of any of 1-13, wherein the output signal is representative of a continuous measurement of the parameter or interest or passing of a threshold value of the parameter of interest.

15. The device of any of 1-14, wherein the sensor comprises a resonator having a resonance frequency $f_{res}$ and an electrical response sensitive to the parameter of interest, and the sensing circuitry is operative to trigger an output signal when a received input frequency is at or close to a multiple of the resonance frequency, wherein the output signal is representative of a value of the parameter of interest.

16. The device of any of 1-15, wherein the resonator is an acoustic-based transponder or a microelectromechanical acoustic resonator.

17. The device of any of 1-16, wherein the resonator comprises a piezoelectric acoustic resonator.

18. The device of any of 1-17, wherein the piezoelectric acoustic resonator includes a piezoelectric material selected from the group consisting of $LiNbO_3$, AlN, AlScN, PZT, and lithium tantalate.

19. The device of any of 1-18, further comprising a plurality of resonators connected to the output port, each resonator operative to resonate in response to an associated different selected parameter.

20. The device of any of 1-19, wherein the passive electronic components include a plurality of inductors and capacitors connected in series or in parallel.

21. The device of any of 1-20, wherein one or both of the input port and the output port are connected to an antenna for wireless communication.

22. The device of any of 1-21, wherein the sensing circuitry is further operative to generate from the input signal a further output signal with a polarization orthogonal to a polarization of the output signal.

23. The device of any of 1-22, wherein the sensor is a temperature sensor, pressure sensor, humidity sensor, vibration sensor, acceleration sensor, strain sensor, magnetic sensor, gyroscopic sensor, infrared sensor, chemical sensor, gravitational sensor, radio frequency identification (RFID) sensor, or environmental sensor.

24. The device of any of 1-23, wherein the parameter of interest is a temperature, and the sensor is a temperature sensor.

25. The device of any of 1-24, wherein the temperature sensor is a thermistor, a thermocouple, a resistance temperature detector, an integrated circuit temperature sensor, or a microelectromechanical acoustic resonator.

26. The device of any of 1-25, wherein the parameter of interest is a temperature ranging from +60° C. to −70° C.

27. The device of any of 1-26, wherein the parameter of interest is a temperature, and the temperature is −70° C., −60° C., −50° C., −40° C., −20° C., −10° C., 0° C., +10° C., +20° C., +30° C., +40° C., +50° C., +60° C., +70° C., +80° C., +90° C., +100° C., +150° C., +200° C., or +300° C.

28. The device of any of 1-27, wherein the device is disposed in a cold storage device, a refrigerator, a freezer, a cold storage facility, a cold transportation vehicle, on food packaging, on medical packaging, on drug packaging, in concrete, on a bridge, in a tunnel, in a building, or in a structure.

29. A sensing system comprising:
    the sensing device of any of 1-28; and
    a transmitting device comprising a transmitter operative to transmit the input signal to the sensing device at a frequency representative of the parameter of interest.

30. The sensing system of 29, wherein the transmitting device further includes a receiver operative to receive the output signal of the sensing device, the output signal having a frequency that is half of the frequency of the input signal transmitted by the transmitter.

31. The sensing system of any of 29-30, further comprising a receiver, located remotely from the transmitting device, operative to receive the output signal of the sensing device, the output signal having a frequency that is half of the frequency of the input signal transmitted by the transmitting device.

32. The sensing system of any of 29-31, further comprising a receiving device operative to receive the output signal from the sensing device and determine a strength of the parameter of interest at the sensing device based on an output power of the output signal.

33. The sensing system of any of 29-32, wherein the receiving device is a laptop computer or a mobile device.

34. The sensing system of any of 29-33, wherein the receiving device is operative in a stand-by mode to awaken upon receipt of the output power signal.

35. The sensing system of any of 29-34, wherein the receiving device is operative to receive a further output signal generated by the sensing circuitry with a polarization orthogonal to a polarization of the output signal to provide a differential measurement at the receiving device.

36. The sensing system of any of 29-35, further comprising a plurality of further sensing devices, each disposed at a location to sense a parameter of interest.

37. A method of sensing a parameter of interest, comprising:
   providing the sensing device of any of 1-28 at a location to sense the parameter of interest;
   transmitting an input signal from a transmitting device to the sensing device to generate the output signal from the sensing device, the output signal having a frequency that is half of the frequency of the input signal transmitted by the transmitting device; and
   receiving the output signal from the sensing device at a receiving device.

38. The method of 37, further comprising, at the receiving device, determining a strength of the parameter of interest at the sensing device based on an output power of the output signal.

39. The method of any of 37-38, wherein the receiving device is operative in a stand-by mode to awaken upon receipt of the output power signal.

40. The method of any of 37-39 wherein the receiving device is located at or remotely form the transmitting device.

41. The method of any of 37-40, wherein the sensor is a temperature sensor, pressure sensor, humidity sensor, vibration sensor, acceleration sensor, strain sensor, magnetic sensor, gyroscopic sensor, infrared sensor, chemical sensor, gravitational sensor, radio frequency identification (RFID) sensor, or environmental sensor.

42. A method of sensing a parameter of interest, comprising:
   providing the sensing system of any of 29-36 with the or a plurality of sensing devices disposed at one or more locations to sense a parameter of interest;
   transmitting an input signal from a transmitting device to the sensing device or sensing devices to generate the output signal from the sensing device or sensing devices, the output signal having a frequency that is half of the frequency of the input signal transmitted by the transmitting device; and
   receiving the output signal from the sensing device at a receiving device.

43. The method of 42, further comprising, at the receiving device, determining a strength of the parameter of interest at the sensing device or sensing devices based on an output power of the output signal.

44. The method of any of 42-43, wherein the receiving device is operative in a stand-by mode to awaken upon receipt of the output power signal.

45. The method of any of 42-44 wherein the receiving device is located at or remotely form the transmitting device.

46. The method of any of 42-45 wherein the sensor is a temperature sensor, pressure sensor, humidity sensor, vibration sensor, acceleration sensor, strain sensor, magnetic sensor, gyroscopic sensor, infrared sensor, chemical sensor, gravitational sensor, radio frequency identification (RFID) sensor, or environmental sensor.

DESCRIPTION OF THE DRAWINGS

FIG. 1 illustrates a schematic of a SubHT-enabled wireless sensing architecture. It allows to passively and remotely sense any targeted parameters of interest PoIs. Also, the sensed information is radiated back from the SubHT towards the interrogating node by using a passively generated carrier frequency ($f_{in}/2$) that is half of the interrogating frequency ($f_{in}$). FIG. 2 illustrates a schematic of sensing circuitry representing a generic SubHT. This includes a varactor and a passive network of off-the-shelf lumped components acting as a stabilization network for the large-signal periodic regimes driven by the SubHT received input power ($P_{in}$). Also, this network embodies one component that is sensitive to the specific PoI and that is responsible for the activation of the dynamics leveraged by the SubHT to sense the PoI. FIG. 3 illustrates a graphic representation of the typical input and output signals characteristics of a SubHT, for input power levels ($P_{in}$) lower (in green) or higher (in red) than the SubHT parametric power threshold ($P_{th}$). FIG. 4 illustrates typical output power ($P_{out}$) vs. $P_{in}$ characteristic of a SubHT when not perturbed (solid line, in green) by the PoI or, alternatively, when subject to a positive (lower dashed line, in red) or negative (upper dashed line, in blue) variations of the PoI.

FIG. 7A illustrates a schematic of the circuit topology used for both the analyzed parametric frequency dividing circuit and the frequency doubling circuit. The values of the ideal lossless components used for both circuits are the following: dividing circuit) $L_1$=382.5 nH, $L_2$=742.5 nH, $L_3$=500 nH, $C_1$=6.6 pF, $C_2$=0.85 pF, $C_3$=1.7 pF; doubling circuit) $L_1$=28.7 nH, $L_2$=705 nH, $L_3$=336 nH, $C_1$=5.5 pF, $C_2$=0.9 pF, $C_3$=1.7 pF; FIGS. 7B and 7C illustrate extracted $R_{conv}$ (B) and $C_v$ (C) vs. $P_c$ for both investigated circuits. FIGS. 7D and 7E illustrate extracted return-loss (RL) (D) and conversion loss (CL) (E) vs. $P_c$ for both investigated circuits. All simulations were run in a commercial Harmonic Balance (HB) simulation platform set to consider an HB order in pair of 4 when considering a fundamental frequency of 100 MHz. Subharmonic curves are marked with X.

FIG. 8A illustrates a tethered co-site electromagnetic node (the illuminator) that radiates a pool of continuous-wave (CW) signals with dedicated frequencies ($f_{in}^{(1)}$, $f_{in}^{(2)}$, etc.) for each monitored stored item or group of items. FIG. 8B illustrates all the monitored elements carrying dedicated PASTs. When the temperature of a singularly monitored item or the one of a jointly monitored group of items exceeds its specific maximum allowed value ($T_{th}$), the corresponding PAST starts generating output power at a subharmonic of its received signal, acting as an alarm-signal for any readers. FIG. 8C illustrates an example trend of a PAST's output power (bottom graph) when exposed to an arbitrarily chosen time-variant temperature profile (top graph), showing a dynamically triggered temperature-controlled hysteresis loop that is leveraged by PASTs to implement a memory functionality through the use of conventional passive and memory-less components.

FIGS. 15A and 15B illustrate measured (A) and simulated (B) $P_{out}$ vs. $P_{in}$ trends of the fabricated SubHT, at $f_{in}$=886 MHz and for different temperatures (T s) ranging from 25° C. to 60° C. FIGS. 15C and 15D illustrate measured (C) and simulated (D) $P_{out}$ vs. T trends of the fabricated SubHT for different $P_{in}$ values close to the $P_{th}$ value extracted at 25° C. All the reported curves (FIGS. 15A-15D) were extracted through a wired characterization experiment. More details about the experimental set-up and the followed simulation approach are described below and in FIG. 22.

FIG. 18A illustrates an overview of the wireless set-up used to characterize the SubHT as a WSN, sensing the local temperature at 4 meters away from two network analyzers placed in the RF test and characterization facility and together emulating a complementary interrogating node. More details regarding this set-up are provided below and in FIGS. 23A-23B. FIG. 18B illustrates measured $P_R$ vs. $P_T$ trends extracted for the explored temperatures. FIGS. 18C and 18D illustrate measured (C) and simulated (D) $P^{\wedge}_R$ vs. T trends extracted from the wireless characterization of the built SubHT.

FIG. 19A illustrates measured trend of $P_{out}$ vs. $T_a$ of the built PAST for different $f_{in}$ values, ranging from 865 MHz to 880 MHz with steps of 1 MHz, and the same $P_{in}$ (−11 dBm). FIG. 19B illustrates measured trend of $T_{th}$ vs. $f_{in}$ for the same $P_{in}$ considered in FIG. 19A, showing that by simply tuning the output frequency of the illuminator the same PAST can be configured to exhibit any $T_{th}$ values included in the ranges of storage temperatures relative to the majority of the foods and medical products currently transported along the cold-chain. FIG. 19C illustrates measured $P_{out}$ vs. $T_a$ for the same $P_{in}$ value considered in FIG. 19A and when using the specific $f_{in}$ values allowing to achieve $T_{th}$s of −45° C. (left, in blue), −25° C. (middle, in green) and 4° C. (right, in red). During this experiment, the built PAST was subject to a temperature forward sweep from −70° C. to 10° C., followed by a backward sweep from 10° C. to −70° C. Evidently, the PAST's parametric dynamics allow the generation of temperature-controlled hysteresis loops that the PAST can leverage to capture and memorize the occurrence of a temperature violation event without requiring an on-chip memory device or the adoption of any exotic materials or components, irreversibly changing the strength of the backscattered signal generated by passive tags when the temperature exceeds a preset unchangeable value.

FIG. 20A illustrates a schematic view of the set-up used during the wireless characterization of the built PAST. The illuminator was placed in a laboratory space housing a digitally-controlled temperature chamber (Tenney TUJR). The illuminator, radiating a power level of 20 dBm at 874 MHz (i.e. the strategically chosen $f_{in}$ value giving a $T_{th}$ of −25° C., see FIG. 19B and FIG. 19C), was placed at a distance from the chamber of 4 meters, limited by the area of the laboratory space housing the chamber. Simultaneously, a spectrum analyzer used as a reader was moved across the entire floor of the building to verify the ability to remotely detect the occurrence of any temperature violations at multiple distant locations from the PAST. FIG. 20B illustrates a map of the floor where the PAST's wireless characterization took place, showing the positions of the chamber and of the illuminator, along with all the locations (stars) where the reader could be connected to the power grid in order to measure the received portion of the radiated PAST's output signal, if any. A table summarizing the distance between the chamber and all the considered testing locations is also shown, along with the corresponding measured $P_{out}$ values for $T_a$ right above $T_{th}$. FIG. 20C illustrates measured $P_{out}$ vs. $T_a$ at the location marked as "1" in FIG. 20B, when exposing the built PAST to 9 consecutive temperature cycles (each lasting 50 minutes) to verify that a reliable and repeatable wireless response is always attained, despite the operation in an uncontrolled electromagnetic environment populated by a large amounts of electronic systems producing significant levels of electromagnetic noise.

FIG. 21A illustrates the layout of the PCB with the annotated connection for every component. FIG. 21B is a picture of the fabricated SubHT prototype assembled on a PCB of FR-4 substrate with two standard SMA connectors for the input and the output. FIG. 21C illustrates an equivalent high frequency circuit model of the thermistor used in the SubHT prototype.

FIG. 23A illustrates the experimental setup that was used during the characterization of the SubHT operation as a WSN. As shown, the input and output ports of the SubHT were here connected to two commercial antennas. The antenna (model no. AEACAC054010-S915) connected to the SubHT input port exhibited a gain of 2 dBi whereas the other antenna (model no. 712-ANT-433-CW-QW) connected to the SubHT output port exhibited a gain of 3.3 dBi. An identical set of antennas was also connected to the same network analyzers that were used in the former wired setup. An amplifier (ZHL-1000-3 W+, with power gain of 45 dB) was used between the output port of the network analyzer operating as the transmitter and its corresponding antenna. The wireless performance of the SubHT were extracted in a laboratory space, which is an uncontrolled electromagnetic environment populated with significant levels of electromagnetic noise. Furthermore, the two VNAs were placed next to each other and 4 meters away from the built SubHT. As in the former experiment, the SubHT was positioned on the digitally controlled hotplate for temperature measurements. FIG. 23B illustrates the SubHT prototype connected to two antennas, at the input and output ports respectively.

DETAILED DESCRIPTION

Figure 1:
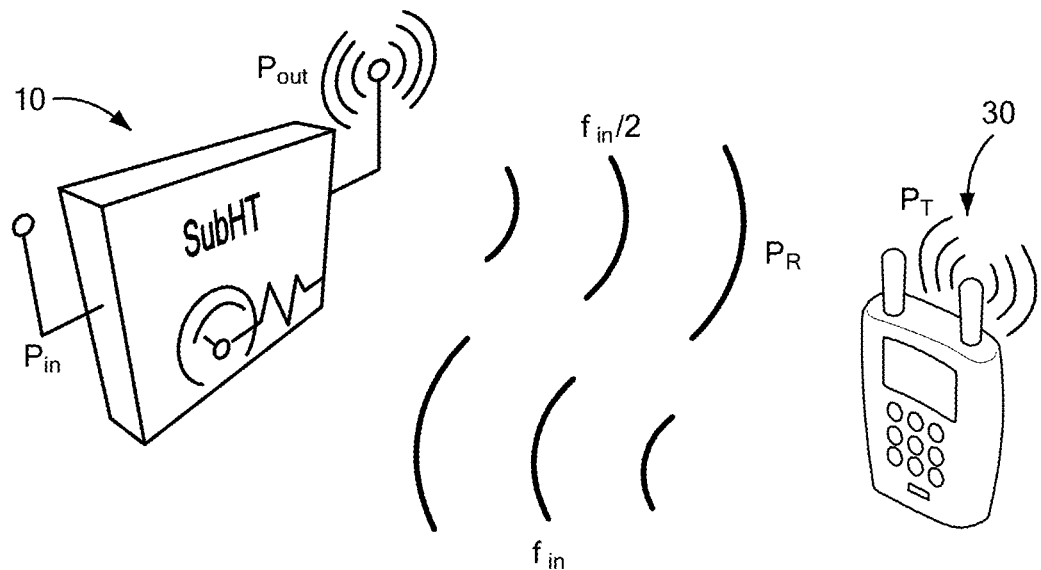
FIGS. 1-4 illustrate a sub-harmonic tag (SubHT) and its unique operational features.

Any existing wireless sensor node (WSN) used for remote sensing applications can be seen as the combination of a sensing system and a radio frequency (RF) front-end responsible to transmit and receive electromagnetic signals. The sensing system relies on a sensor to detect the variations of a specific parameter-of-interest (PoI) with a sensitivity that strongly depends on the adopted sensing technology. In particular, the development of advanced manufacturing processes has recently enabled sensitive on-chip micro- and nano-electromechanical (MEM/NEM) physical and chemical sensors, consuming near-zero stand-by powers.

Yet the majority of the existing WSNs, including those using such miniaturized new sensors, still require considerable amounts of energy to transmit the sensed information to any other interrogating nodes or readers within the same network. As a result, they must rely on on-board batteries or, alternatively, on integrated harvesting circuits, scavenging energy from the environment and use it to temporally sustain the transmission capabilities. Some battery-powered WSNs can achieve extremely long lifetimes (nearly 10 years, limited by the self-discharge of their batteries) when deployed to detect time-critical but relatively rare events (i.e. operating predominantly in off-but alert-mode). Nevertheless, such lifetimes can be abruptly reduced to just few months when, instead, WSNs need to sense and transmit information many times per hour, thus demanding orders of magnitude higher average power levels than that consumed during their stand-by operational mode. In other operational scenarios, frequent periodic battery replacements are required, hence leading to high maintenance costs that can even be unsustainable when WSNs are deployed in locations that are difficult to reach or in harsh environments. Also, the increase of the number of deployed battery-powered WSNs raises environmental concerns regarding the disposal of batteries in landfills. Additionally, since the capacity of any available battery technologies dramatically lowers as the operational temperature is decreased, using active tags under frozen (−10° C. but higher than −20° C.) or deep-frozen (−20° C.) temperatures, like the ones encountered in any cold-chain facilities dedicated to the storage of frozen meat and fish, does not even represent a technically viable option. Similarly, any WSNs relying on on-chip harvesting circuits are also hardly usable when a frequent detection of any PoIs is required. In fact, both the maximum communication range and the highest detection rate achievable through these WSNs are severely affected by the inability of the currently available rectifying circuits to exhibit acceptable efficiencies when receiving RF power levels significantly lower than 1 mW.

Chip-less and battery-less tag-based WSNs are known that are printable on disposable substrates. Yet, in order to achieve a small size and a long communication range, while rendering any interrogating nodes able to separate the transmitted and received data streams, these WSNs must rely on advanced resonant components with exceptionally high quality factors (Q), like surface acoustic wave (SAW) devices. The use of such high-Q components comes with significantly higher manufacturing costs.

To avoid using any expensive high-Q components, a class of chip-less and battery-less tag-based WSNs known as harmonic tags (HTs) has been proposed. These WSNs rely on unbiased nonlinear devices, such as varactors or Shottky diodes, to deliver the sensed information through output signals that have twice the frequency of the interrogating ones, thus being easily distinguishable, once received by the interrogating nodes, from any undesired signals with the same frequency used by the interrogating one. Yet, the output signals of harmonic tags show power levels that are lower than those of their input signals by a large amount known as conversion loss (CL) that, depending on the technology of the nonlinear variable capacitor, can even exceed 35 dB when the received input power levels are lower than −15 dBm. In addition, since the sensed information is transmitted at twice the frequency of the interrogating signals, harmonic tags inherently suffer from a 6 dB higher path-loss than traditional single-frequency counterparts, thus further reducing the signal-to-noise ratio (SNR) at the receiver of their interrogating nodes and, consequently, the maximum communication range.

Semi-passive tags for remote temperature monitoring are known. When targeting the highest possible reading range without any on-chip resonant components built on expensive substrates, these include an antenna, a temperature sensitive element or a sensor and an energy harvesting circuit. This circuit scavenges energy from the environment and uses it to modulate the backscattered portion of the interrogating signal coming from their complementary reader in manners that strongly depend on the measured temperature. By generating a backscattered signal, in fact, any interrogating nodes can discriminate the received signal from their own self-interference and from any environmental electromagnetic echoes of their output signal. Nevertheless, due to the significant power carried by such undesired signals, the capability of any interrogating nodes to reliably extract useful information from a backscattered signal significantly drops as the distance from the tag to ping is increased, limiting the sensing ranges to just few meters. Furthermore, the detection rate achievable by any existing passive tags is severely affected by the inability of the currently available harvesting circuits to exhibit acceptable efficiencies when receiving power levels significantly lower than 1 mW. Ultimately, most semi-passive tags aimed to a temperature monitoring require on-chip non-volatile memories (NVMs) like EEPROMs in order to permanently record the occurrence of any temperature violations, avoiding critical loss of information that would otherwise occur after the amount of harvested energy is fully depleted. Unfortunately, any existing NVMs suitable for a massive wafer-scale production require too large programming voltages, leading to unsustainable power levels that cause large reductions in the reading range of any tags that use them.

Passive tags are known that embody specific low-cost devices or materials to permanently change the strength of the backscattered signal when a fixed temperature threshold ($T_{th}$) is exceeded, thus allowing to use no NVMs at the cost of not being re-usable. Yet, due to the limited temperature sensitivity exhibited by such devices and materials, none of these passive tags has achieved a reading range exceeding 3 meters. Even more, all these tags exhibit fixed and not resettable $T_{th}$ values hardly lower than 0° C., thus being inherently able to monitor just a subset of the heterogeneous products transported along the cold-chain, providing significant challenges towards their massive scale production.

Described herein, is a class of printable, battery-less, harvester-free and chip-less passive tags, termed subharmonic tags (subHTs), that can address the shortcomings of such prior art devices and system. The subHTs can employ circuitry that can generate and transmit a subharmonic output signal in response to an input interrogating signal. SubHTs can exploit a dynamical feature of diode-based parametrically driven circuits to enable the remote sensing of any parameters-of-interest (PoI) with an unexpectedly high sensitivity. Also, when interrogated by any complementary readers, they allow transmitting of the sensed information through a passively generated output signal whose frequency is half of the interrogating one. This operational characteristic permits the achieving of unexpectedly large sensing ranges by allowing to largely attenuate any strong disturbing signals originated from the interrogating node that, instead, heavily limit the maximum reading range of the conventional passive tags. The SubHTs have been shown to be inherently able to surpass all the performance limitations of the existing harmonic tags (described further below). Also, they enable high sensitivities and dynamic ranges while being exclusively formed by off-the-shelf components assembled on printed substrates. They can enable both continuous parameter sensing and threshold parameter sensing. They can enable monitoring of a large number, in some cases thousands, of different items. The sensing device can be provided in a reduced form factor.

Referring to FIGS. 1-4, in some embodiments, a sensing device 10 can include an input port 12 and an output port 14. Sensing circuitry 20, connected to the input port and the output port, includes a sensor 16 having an impedance sensitive to a parameter of interest, one or more passive electrical components 18, and a variable capacitor 22 connected to the sensing circuitry. The sensing circuitry is triggered to generate an output signal dependent on the parameter of interest for transmission from the output port based on an input power value, $P_{in}$, of an input signal received at the input port that is greater than a parametric threshold power value, $P_{th}$. The parametric threshold power value $P_{th}$ can be determined by the impedance of the sensor, by a junction capacitance and tuning range of the variable capacitor, and by impedances of the passive electrical components of the sensing circuitry. The parametric threshold power value $P_{th}$ is a minimum power value at which the sensing circuitry is operable. The sensing circuitry can generate the output signal at an output frequency that is half of an input frequency of the input signal. In some embodiments, the sensing circuitry can activate a period doubling mechanism through a super-critical bifurcation triggered by the input power of the input signal. The sensing circuitry can vary the parametric threshold power value, $P_{th}$, and an output power value, $P_{out}$, of the output signal in response to perturbations of the parameter of interest. The sensing circuitry can boost a sensitivity to the parameter of interest and a dynamic range of the output power value, $P_{out}$, in proximity to the supercritical bifurcation. In some embodiments, the sensing circuitry can be a frequency divider circuit operative through a sub-critical bifurcation triggered by the input power of the input signal to generate the output signal at an output frequency that is half of an input frequency of the input signal. In some embodiments, the sensing circuitry can exhibit a hysteresis behavior, whereby the output signal remains active when a value of the parameter of interest sensed by the sensor returns to within a tolerable range of values. In some embodiments, the sensor device can include a resonator having a resonance frequency $f_{res}$ and an electrical response sensitive to the parameter of interest, and the sensing circuitry can trigger an output signal when a received input frequency is at or close to a multiple of the resonance frequency, wherein the output signal is representative of a value of the parameter of interest. The output signal can be representative of a continuous measurement of the selected parameter or passing of a threshold value of the selected parameter. In some embodiments, the sensing device can generate a further output signal with a polarization orthogonal to a polarization of a first output signal to provide a differential measurement at a receiving device.

In some embodiments, a sensing system can include the sensing device 10 and a transmitting device 30 that can transmit an interrogating input signal to the sensing device at a frequency representative of the parameter of interest. In some embodiments, the transmitting device can also include a receiver or receiving device to receive the output signal of the sensing device, the output signal having a frequency that is half of the frequency of the input signal transmitted by the transmitter. The receiving device can receive the output signal from the sensing device and determine a strength of the parameter of interest at the sensing device based on an output power of the output signal. In some embodiments, a receiving device can be located remotely from the transmitting device. In some embodiments, the receiving device can be a laptop computer or a mobile device. In some embodiments, the receiving device can operate in a stand by mode to awaken upon receipt of the output power signal. In some embodiments, the receiving device can receive a further output signal generated by the sensing circuitry with a polarization orthogonal to a polarization of the output signal to provide a differential measurement at the receiving device.

Figure 5:
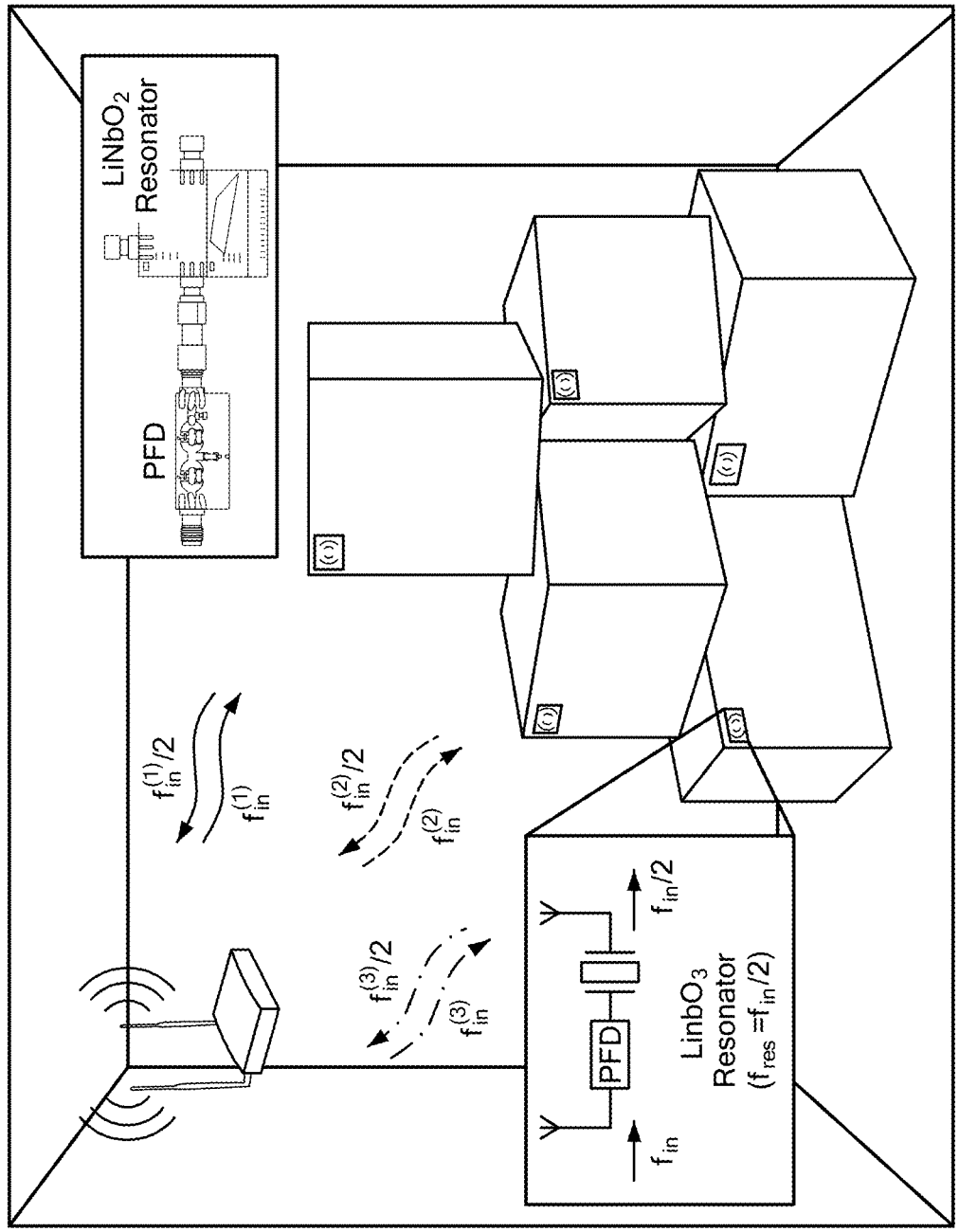
FIG. 5 is a schematic view of an embodiment of a passive acoustic-based transponder (PAT) as described herein. PATs using different resonators enable discrimination of the temperature data-streams coming from different items, through dedicated channels that are centered around different lithographically defined $f_{res}$-values. An illustration of a PAT prototype is also shown in the in-set. Details about the PFD designs are available in Hussein, H. M. E. et al. Systematic Synthesis and Design of Ultralow Threshold 2:1 Parametric Frequency Dividers. *IEEE Transactions on Microw. Theory Tech.* 68, 3497-3509 (2020), (arXiv preprint arXiv:2002.09619 (2020) (incorporated by reference herein).

In some embodiments, the sensing device described herein can provide a class of passive acoustic-based transponders (PATs). (See FIG. 5.) A PAT can enable both continuous and threshold parameter sensing. The PAT can rely on the dynamical features exhibited by high-Q acoustic resonators, connected to the output of sensing circuitry including a solid-state parametric frequency dividers (PFD).

In some embodiments, the sensing device can employ piezoelectric acoustic resonators. In some embodiments, the piezoelectric acoustic resonator can utilize a piezoelectric material selected from the group consisting of $LiNbO_3$, AlN, AlScN, PZT, and lithium tantalate. Suitable devices can continuously monitor an environment and wake up an electronic circuit upon detection of a specific trigger signature of electromagnetic radiation.

In particular, depending on the ambient temperature (T), which sets the actual resonance frequency ($f_{res}$) of the resonator, when an interrogating RF signature, with frequency close to $2f_{res}$, reaches the input of a PAT, its PFD can trigger a sub-harmonic oscillation, at $f_{res}$, through a bifurcation mechanism. Based on the varactor DC-bias (VDC), such bifurcation can be either super-critical or sub-critical, where the super-critical enables a smooth but extraordinary steep dependence of the PFD output power ($P_{out}$) vs. T, while the sub-critical introduces a sudden increase of $P_{out}$ in the presence of small temperature rises. The generated $P_{out}$ can be radiated back to the interrogating node, which can receive the information through a different channel from the one used to transmit the signature. This feature makes any temperature data accessible, in real-time, without a need for more expensive transponder architectures.

Also, due to the highly selective frequency response exhibited by acoustic resonators, the transponder architecture enables a direct analog discrimination among multiple different items, in some instances over thousands of different items, each of which is associated with a specific interrogating signature. The system can be converted into a variety of different sensing or identification devices. For instance, when different physical parameters need to be sensed, the output of the PFD can be connected to different monolithic integrated acoustic resonators, designed to be highly sensitive to those parameters. Such a change, which can be implemented without any variation in the PFD design, can allow the dynamic control of the different parameters to be tested. Thus, it can enable a sensing system to address the needs of a variety of embedded sensing applications. Also, when the identification of a specific item, associated with a component resonating at a specific frequency ($f_{resx}$), is requested, a reader or receiving device can monitor the presence of the item by transmitting an adequate interrogating signal at $2f_{resx}$ to the sensing device while listening for any signal coming back at $f_{resx}$.

In some embodiments, the technology described herein provides an ultrahigh frequency (UHF) sub-harmonic tag (subHT), which can be used for the remote identification of items. In some embodiments, a UHF subHT can be identified using a reader device at much greater distances than previous RFID tags. The UHF subHT does not require an integrated RF harvester, which typically exhibits too low an efficiency to permit long range operation. In some embodiments, a UHF subHT can utilize features and the compact form-factor of microacoustic resonators and ferroelectric varactors, which can be fabricated from piezoelectric materials such as aluminum scandium nitride (AlScN) or other piezoelectric materials. In some embodiments, UHF subHTs can provide compact, wearable, and mass producible UHF RFID tags that can passively respond to a set of received input frequencies with a corresponding set of sub-harmonic output signals.

Figure 2:
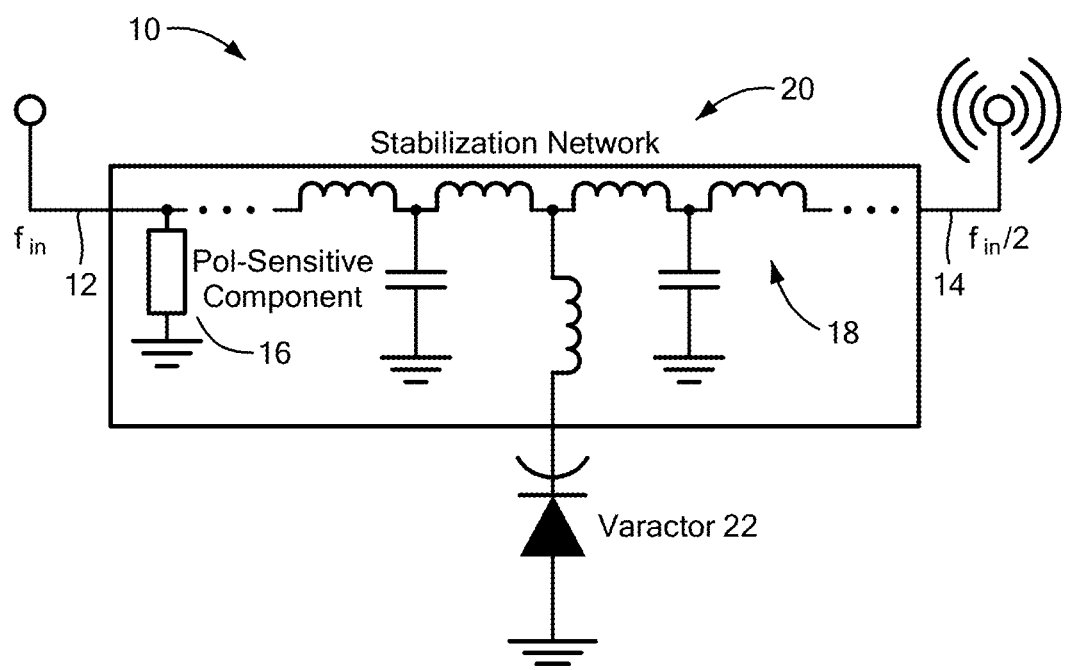
Figure 3:
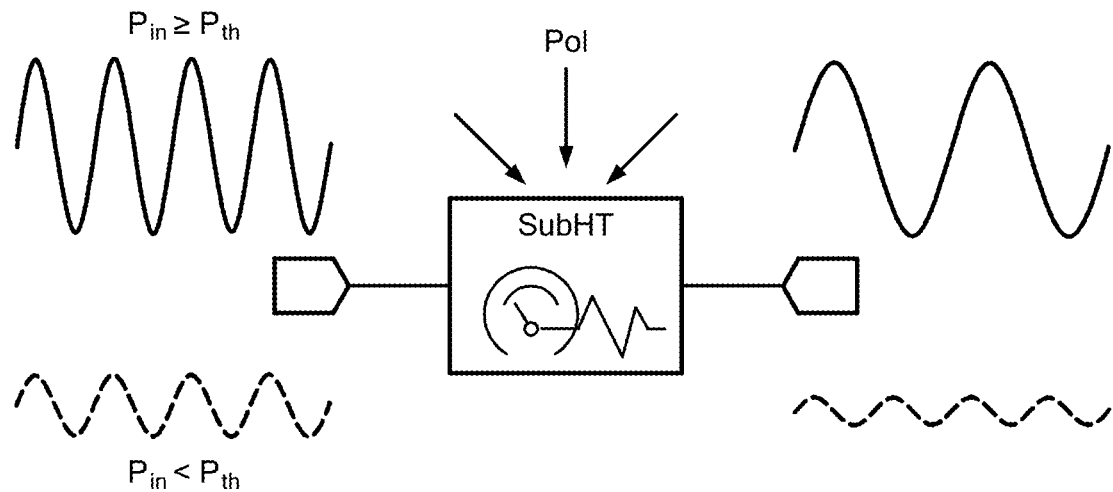

In some embodiments, UHF subHTs can be highly-miniaturized (<1 $cm^2$) and batteryless, and can utilize the high quality factor (Q) exhibited by, for example, AlScN acoustic resonators, as well as the tuning range (>80%) exhibited by AlScN ferroelectric varactors. This can allow the realization of an RF wireless system capable of responding to ultralow power (<-50 dBm) UHF signatures through the passive generation and radiation of sub-harmonic signals of the interrogating signals (FIGS. 1-3).

In some embodiments, UHF tags as described herein can provide sensing ranges of more than 20 meters, depending on the power sensitivity of the reader. In some embodiments, such high sensing ranges can be attained utilizing monolithic integrated antennas with gains lower than −20 dB (i.e., maximum antenna size less than 1 cm), which can be fabricated on a single wafer used for the other forming components. Thus, embodiments of subHTs described herein can be highly compact and mass producible using the same semiconductor fabrication processes used for commercial integrated circuits. In some embodiments, subHTs can be interfaced with any printed UHF RFID antennas to obtain detection ranges exceeding hundreds of meters, such as 200 meters or more, while maintaining a same form factor.

In some embodiments, the UHF SubHTs of the present technology can be formed, for example, by an on-chip AlScN ferroelectric varactor, an on-chip AlScN antenna, and a set of AlScN resonators. The combination is strategically designed to provide an on-chip sub-harmonic tag able to respond to interrogation signals coming from much longer distances than possible through the available technologies, such as up to 200 meters or more.

In some embodiments, a class of chip-less and battery-less tag-based WSNs, referred to as sub-harmonic tags (SubHTs) (FIG. 1), can enable remotely and continuously sense PoIs with large sensitivities and dynamic ranges. They can rely on low-cost off-the-shelf lumped components assembled on printed substrates. SubHTs can transmit the sensed information over a dedicated channel, distinct from the channel used to interrogate them. Advantageously, this full-duplex characteristic can be achieved by strategically operating in regions where a parametrically originated period-doubling mechanism is active. This mechanism allows SubHTs to transmit the sensed information through a dedicated passively generated carrier frequency (Au), which is half of the one used by the interrogating signal ($f_{in}=2f_{out}$). In some embodiments, SubHTs can operate at very low input power levels (<−18 dBm). In some embodiments, SubHTs can operate with no DC biasing voltage. In some embodiments, SubHTs can generate an output signal from a received input power more efficiently than harmonic tags, thus enabling significantly lower conversion loss (CL) values. Since for any chosen $f_{in}$ value, $f_{out}$ is always one fourth of the output frequency that would be used if harmonic tags were used, SubHTs inherently enable a 12 dB reduction in the path-loss affecting the portion of their output signal reaching the interrogating nodes. These features enable orders of magnitude higher SNRs at the receiver of the interrogating nodes than has been possible to achieve with harmonic tags, enabling the device to provide a more accurate wireless sensing and a longer communication range. Furthermore, the parametric dynamics leveraged by SubHTs also provide a large boosting of the sensitivity and the dynamic range attained by off-the-shelf commercial sensors, thus providing a way to achieve superior sensing capabilities without requiring advanced on-chip sensors.

In particular, independently of the targeted sensing parameter, the sensing circuitry employing a SubHT can be described as a two-port electrical network formed by an un-biased variable capacitor and a set of lumped electrical passive elements (FIG. 2). This set includes a component, such as a separate commercial off-the-shelf sensor, with an electrical impedance dependent on the specific PoI. The two ports of any SubHTs are connected to properly sized antennas, enabling the simultaneous reception and transmission of signals from and to the interrogating nodes. The technology (planar, wire, aperture, etc.) and design characteristics of such antennas can be chosen based on the targeted application and other system level requirements.

Figure 4:
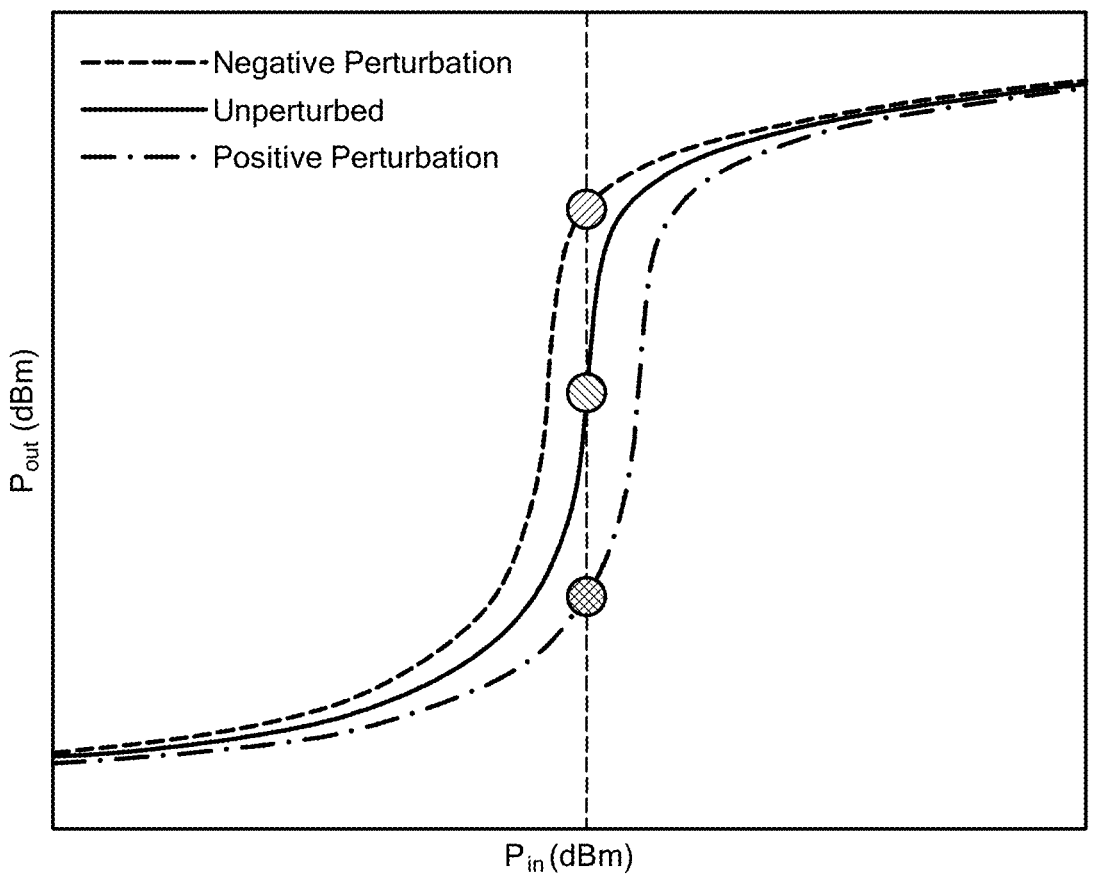

Depending on the strength and on the frequency of its input signal, the sensing circuitry employing a SubHT can exhibit operational regions where it undergoes a period-doubling mechanism. In such regions, it relies on the energy coming from the interrogating node, at a frequency $f_{in}$, to passively generate a strong output signal at $f_{in}/2$ (i.e. $f_{out}$), which is radiated back to the interrogating node. The activation of such period-doubling mechanism (FIG. 3) occurs through a super-critical bifurcation triggered by the power ($P_{in}$) of the SubHT input signal. In particular, for $P_{in}$ values exceeding a certain threshold (known as parametric threshold, $P_{th}$), SubHTs exhibit a steep but continuous $P_{out}$ vs. $P_{in}$ characteristic (FIG. 4), where $P_{out}$ is the output power at $f_{out}$ delivered to the antenna at the output port used for transmission. $P_{th}$, which designates the minimum input power at which a SubHT can operate, is set by the junction capacitance and tuning range exhibited by the adopted varactor, along with the impedances that such variable capacitor sees at both $f_{in}$ and $f_{out}$. These impedances are set by the equivalent passive network formed by the selected lumped components excluding the varactor. Such network acts as a stabilization network for the non-autonomous periodic regimes generated by the interrogating signal through the large modulation of the varactor's capacitance. The SubHT lumped components are selected to minimize $P_{th}$ given a desired $f_{in}$ value. Yet, by including the chosen sensor component with impedance dependent on the targeted PoI within the stabilization network, any change in the strength exerted on the SubHT by such PoI results in a corresponding change of $P_{th}$, hence activating a dynamical behavior that is leveraged here (FIG. 4). Due to the steep slope of the $P_{out}$ vs. $P_{in}$ characteristic for $P_{in}$ approaching $P_{th}$ and due to the fact that the power at $f_{out}$ is only generated for $P_{in}$ higher than $P_{th}$, any induced variations of $P_{th}$, even if small, produce an extremely large change of $P_{out}$ and, consequently, of the power received ($P_R$) at $f_{out}$ by the interrogating device. Such change can span over several orders of magnitude, even when only small perturbations to the SubHT operational point are caused by the PoI. This dynamical feature provides the manner to achieve a sensitivity to the PoI and a dynamic range that greatly exceed what is possible when the selected sensor component with electrical response dependent on the PoI is used as an independent sensor. In other words, the sensing circuitry can provide tag-based WSNs that can surpass, electronically, the limited sensitivity of their sensitive element, instead of requiring more advanced technologies that demand higher fabrication complexities or special operating conditions unsuitable for a massive-scale deployment. By analyzing the received power ($P_R$) at $f_{out}$, the interrogating node can then remotely assess the strength of the PoI at the sensing device location. Because the sensing device can couple the sensed information to a different carrier frequency from the one used to interrogate it, it does not need high quality factor components. Instead, the sensing device can enable full-duplex transceiver architectures for the interrogating nodes, simply relying on two filtering components, centered at $f_{in}$ and $f_{out}$, to separate simultaneously transmitted and received data streams.

Figure 6:
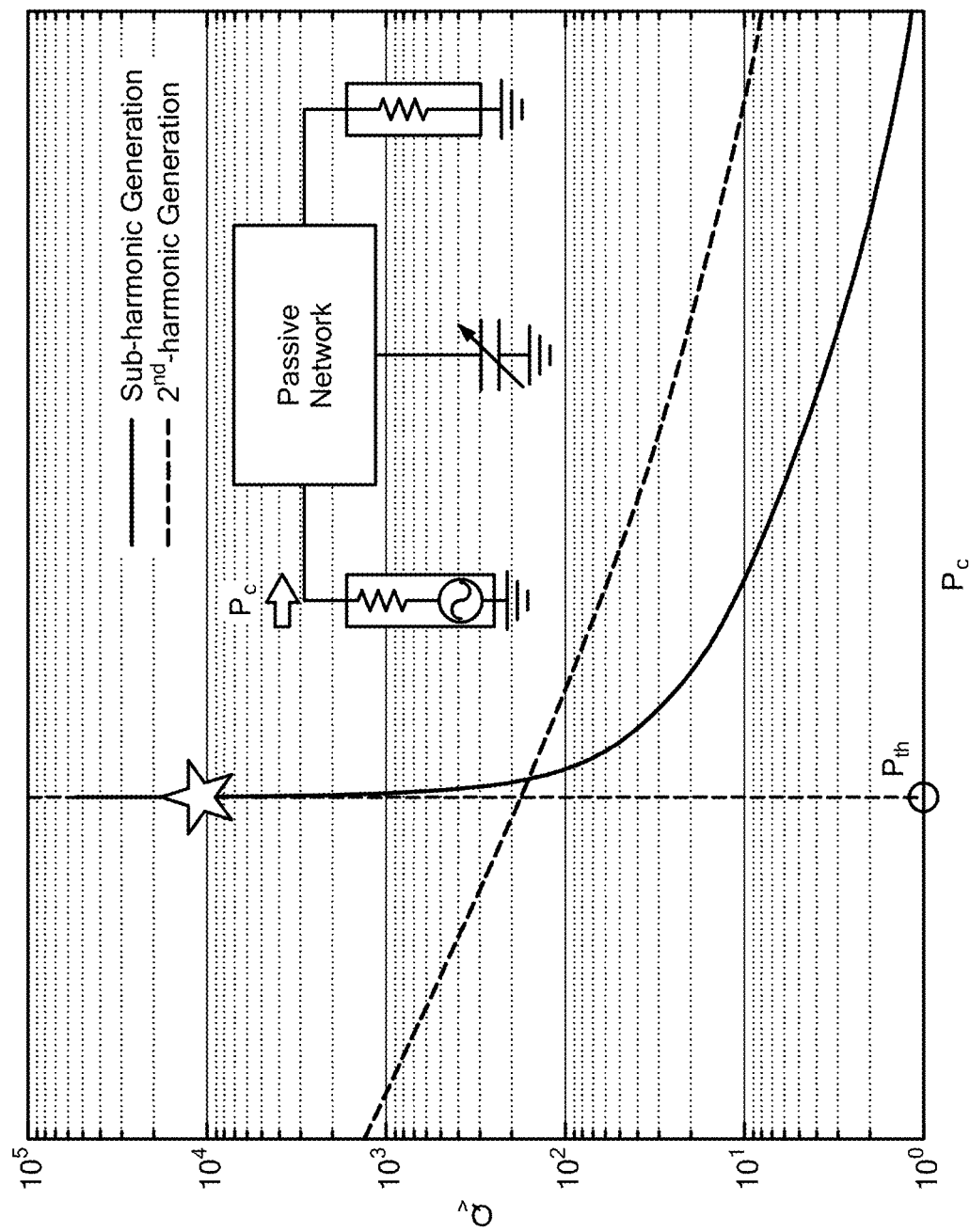
FIG. 6 illustrates the power dependent quality factor exhibited by an ideal largely modulated reactance used for frequency division or frequency doubling. Typical trends of $Q_v$ vs. $P_c$ attained through circuit simulations and relative to an ideal nonlinear reactance, independently used by two same-order and same-topology passive circuits respectively optimized for frequency division by two (in blue, with star) or for frequency doubling (in red). More details about the simulation strategy followed to extract these trends are reported in FIGS. 7A-7E.
Figure 7A:
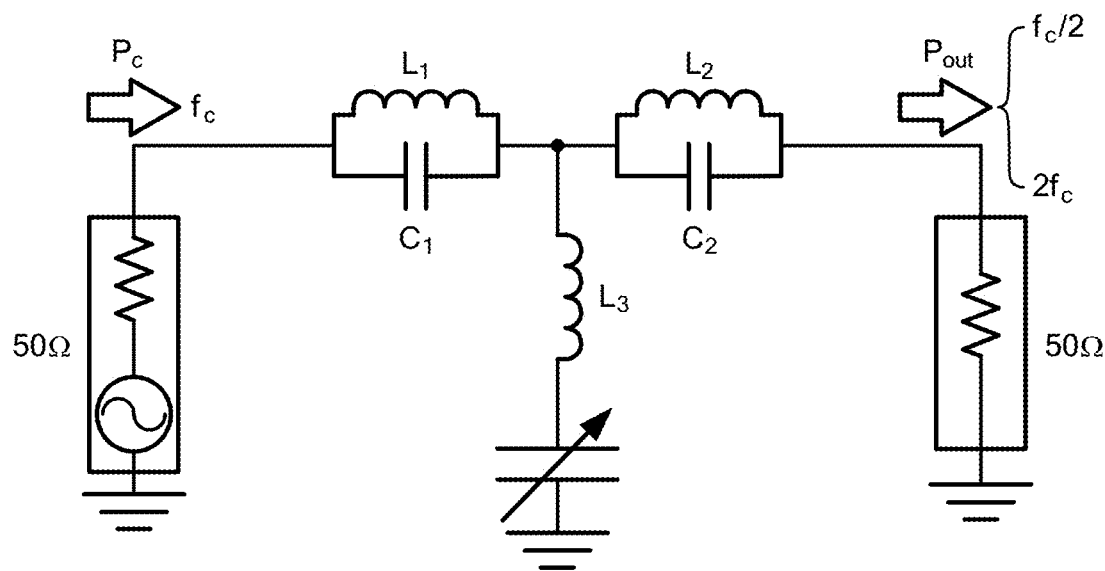
FIGS. 7A-7E illustrate a comparison between ideal frequency doubling and frequency dividing circuits based on the same nonlinear reactance.
Figure 7B:
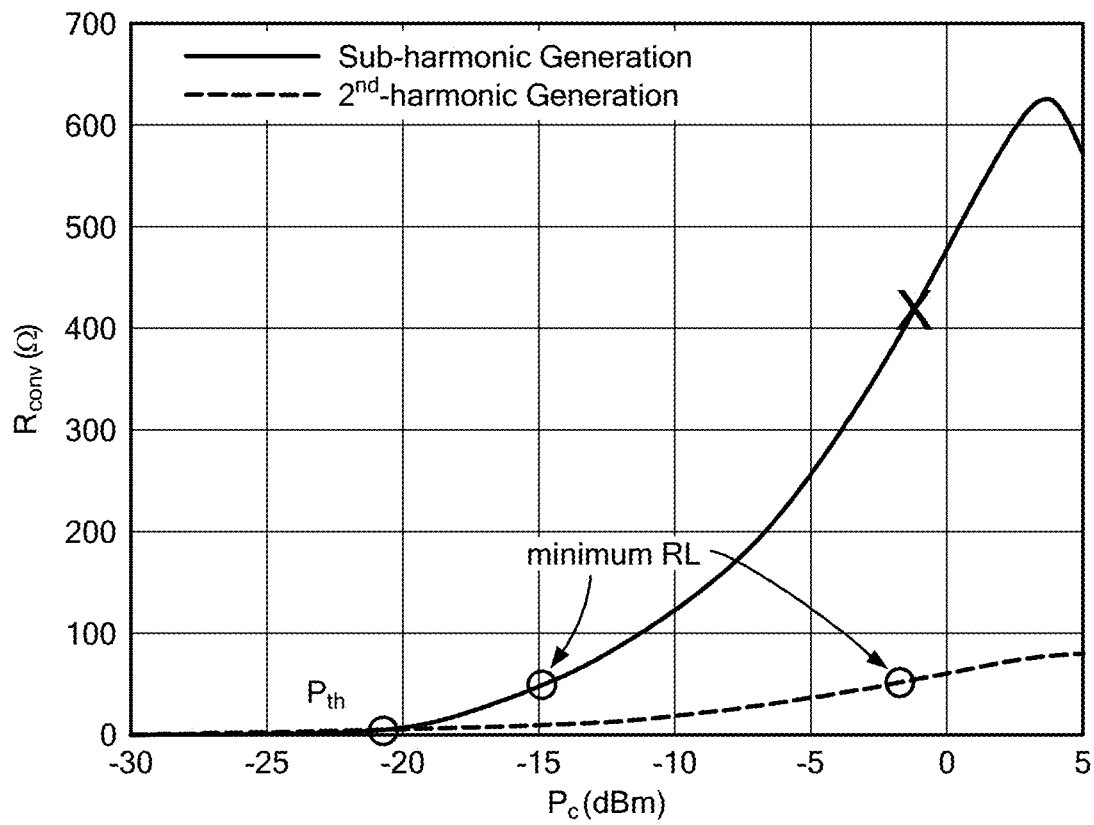
Figure 7C:
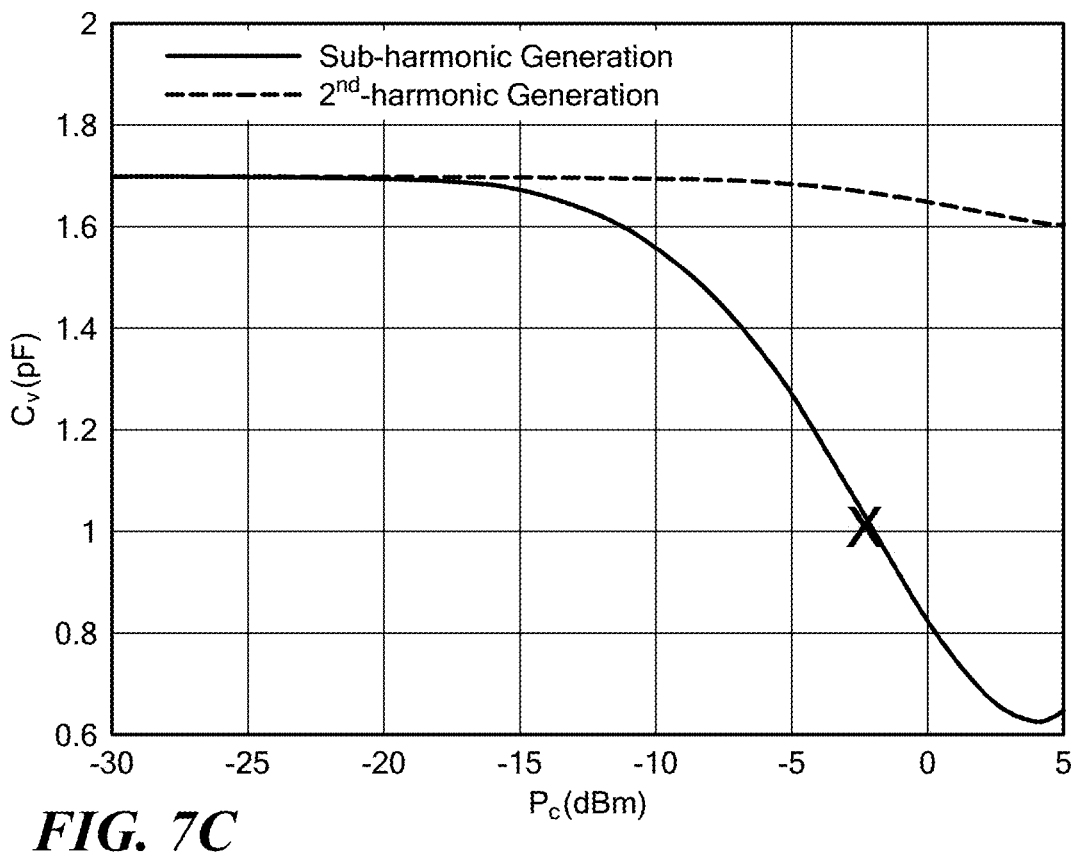
Figure 7D:
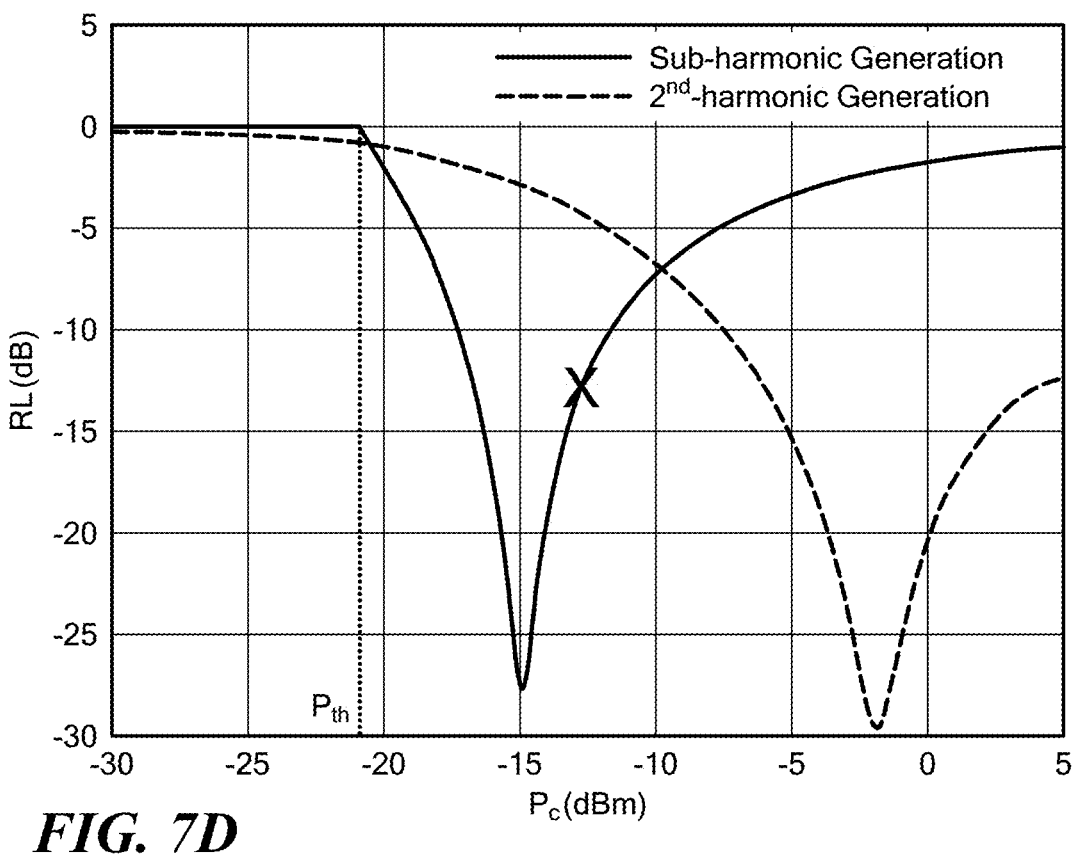
Figure 7E:
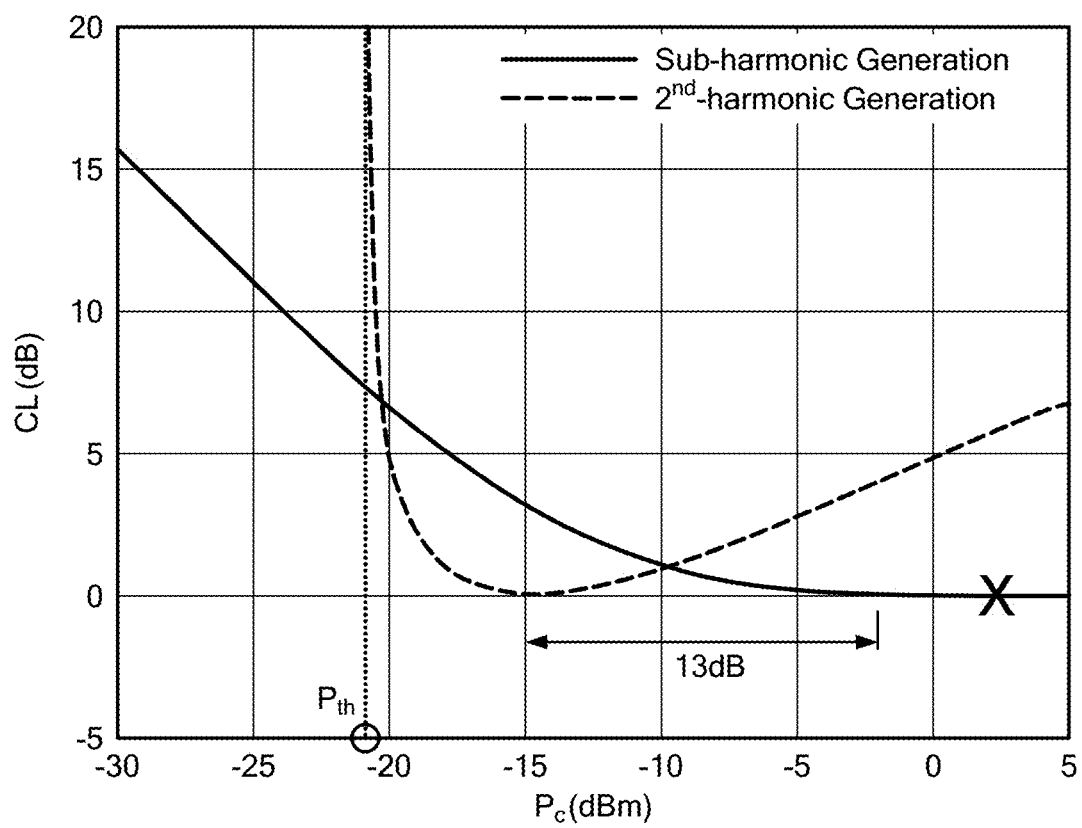

Furthermore, due to the sensing circuitry dynamics, the generation of their sub-harmonic output signal from $P_{in}$ can be significantly more efficient than the corresponding production of a high-order harmonic in any harmonic tags. This efficiency is enabled by the capability of any parametric systems operating above threshold to more efficiently transform the energy stored by their nonlinear reactances at the driving frequency into power at the desired sub-harmonic output frequency. This can be verified, for instance, by monitoring the different trends of the power dependent quality factor ($Q_v$, FIGS. 7A-7E.) exhibited by an ideal lossless nonlinear reactance, connected either to a lossless stabilization network to enable a frequency division with minimum $P_{th}$ or to a circuit exploiting the same topology used for the stabilization network, yet engineered to allow a frequency doubling functionality with minimum conversion loss (CL). These frequency dividing and frequency doubling systems operate with the same input frequency ($f_c$) and input power ($P_c$), but with an output frequency being either half or twice $f_c$ (FIG. 6). As these two exemplary systems are relied upon to assess the capability of the same nonlinear reactance to generate different desired output frequencies, $Q_v$ is of great interest as it maps the ratio between the imaginary part of the modulated reactance impedance at $f_c$ and its nonlinearly generated resistance ($R_{conv}$). This resistance captures the effects of the capacitance modulation at $f_c$ on the energy transformation between input and output frequencies, thus progressively increasing as higher $P_c$ values are used. Also, differently from CL, $Q_v$ is independent of the matching characteristics relative to the circuits ports, hence being a more adequate parameter to assess the intrinsic conversion capabilities granted by the same nonlinear reactance when used in the two analyzed systems. In particular, while $Q_v$ diverges for $P_c$ tending to zero (for the frequency doubling circuit) or to $P_{th}$ (for the parametric frequency dividing circuit), due to the decreasing capacitance modulation lowering $R_{conv}$, it progressively reduces as $P_c$ is increased. In particular, by comparing the trends of $Q_v$ vs. $P_c$ relative to the two investigated circuits, a significantly lower $Q_v$ value can be found, for $P_c$ higher than $P_{th}$, when the nonlinear reactance is used to parametrically generate a sub-harmonic output signal, rather than create a second harmonic one (FIG. 6). As a result, for low $P_c$ values, the CL value achieved by SubHTs can be smaller than the corresponding value in harmonic tags, thus allowing to increase the SNR at the receiver of the interrogating nodes without requiring more power to be transmitted by the same nodes. Moreover, it can be pointed out that since $P_{out}$ has a frequency that is one fourth of the output frequency adopted for the same driving frequency by harmonic tags, the SNR improvement enabled by SubHTs is further amplified (by 12 dB in free-space) due to a reduction in the path-loss affecting $P_{out}$ before reaching any interrogating nodes.

As a comparison, $Q_v$ can be determined in ideal lossless nonlinear circuits for frequency doubling and frequency division. In order to determine $Q_v$ (see FIG. 6), two ideal lossless circuits were designed, characterized by the same topology and based on the same ideal nonlinear reactance, which was simply modelled in terms of a nonlinear capacitance (C(v)) characteristic exhibiting a tuning range of 0.3 and a chosen average capacitance ($C_3$). The two circuits (FIG. 7A) were optimized to guarantee the minimum CL for low driving powers when considering the same input frequency ($f_c$) and the same input power ($P_c$) but output frequencies being twice and half $f_c$ respectively. In other words, one circuit was designed to address a frequency doubling functionality, thus emulating the behavior of any previously reported harmonic tags, whereas the other circuit was designed to satisfy the same resonant conditions used during the design of the demonstrated SubHT, yet relying on the same topology used by the former frequency doubling one. Both circuits include a minimum number of components for optimum performance, equal to five, and rely on the same circuit topology. In particular, two lossless LC notch resonators ($L_1$-$C_1$ and $L_2$-$C_2$) are used at the input and output ports to prevent any energy, at the output and input frequencies respectively, from flowing towards the undesired circuit termination. Also, an additional inductor ($L_3$) is used by both circuits, in series to the adopted nonlinear reactance, to make sure that the input impedance relative to both the input and output ports can resonate at the corresponding frequencies (i.e. $f_c$ and $f_c/2$ or $2 f_c$, respectively). Finally, for the frequency doubling circuit, $L_1$, $L_2$ and $L_3$ are chosen, among all the possible combinations satisfying the described design constraints, to make sure that the minimum CL can be attained for the lowest $P_c$ and when considering 50Ω terminations. The corresponding circuit components of the frequency dividing circuit are chosen, instead, to minimize $P_{th}$, as needed by any SubHTs. While comparing the $Q_v$ trends vs. $P_c$ relative to the same nonlinear reactance when used in the two described circuits would lead to the same phenomenological conclusion regardless of the chosen $f_c$ value, a $f_c$ value of 200 MHz has been used during this analysis. This frequency has been chosen, for simplicity, since the design, operation and modelling of a corresponding parametric frequency dividing circuit, exploiting the same targeted circuit topology and input frequency, has been already discussed in full details in Hussein, H. M. E. et al. Systematic Synthesis and Design of Ultralow Threshold 2:1 Parametric Frequency Dividers. *IEEE Transactions on Microw. Theory Tech.* 68, 3497-3509 (2020), (arXiv preprint arXiv:2002.09619 (2020). The list of the component values adopted for both circuits in the circuit simulations is summarized in the description of FIG. 7A-7E. By extracting for increasing $P_c$ values the driving voltage across the nonlinear reactance and the corresponding current flowing into the same component, it was found the equivalent dynamical impedances exhibited at $f_c$ by such nonlinear element in each circuit, in terms of both imaginary and real parts. From the imaginary parts, the trends of the capacitance ($C_v$) vs. $P_c$ were found, whereas, from the real parts, the trends of $R_{conv}$ vs. $P_c$ were extracted (see FIGS. 7B and 7C). $Q_v$ was then computed, for both cases, by using Eq. 1.

$$Q_v \frac{1}{2\pi f_c R_{conv} C_v} \qquad (1)$$

$Q_v$ allows to compare quantitatively the maximum conversion efficiency that the same nonlinear reactance can achieve when used either for frequency division or for frequency doubling, independently from the adopted terminal impedances and, consequently, from the characteristics of any possibly used matching networks. Consequently, its value is more suitable than conversion loss (CL) to capture the difference in the conversion capability that any nonlinear reactances can exhibit when addressing a frequency conversion functionality. Yet, when searching for the minimum CL, such value is strongly dependent on the power dependent return loss (RL) at the input circuit port and, consequently, on the frequency selectivity of the adopted circuit topologies. Therefore, while the smaller $Q_v$ exhibited by the sub-harmonic frequency generator for $P_c$ higher than $P_{th}$ maps, for any given $P_c$, a higher $R_{conv}$ than generated by the frequency doubling circuit, this also leads to a more sensitive trend of RL vs. $P_c$ (see FIG. 7D) for smaller $P_c$ values. As a result, any sub-harmonic parametric frequency generators exhibit the lowest CL (0 dB, when considering all the circuit components to be lossless as was done here) for a much lower $P_c$ value than the frequency doubling counterparts (13 dB lower in this studied numerical example). Yet, they also show CL values that more rapidly increase from their optimal value as $P_c$ is increased well beyond $P_{th}$ (see FIG. 7E). This feature can be easily verified by noticing that the minimum CL is achieved for both investigated circuits at the same $P_c$ values giving the minimum RL at relative to their input ports (see FIGS. 7D and 7E). It is worth emphasizing that the curves reported in FIGS. 7A-7E refer to the case in which all the circuit components are lossless. Much higher CL values are practically attained, in fact, due to the limited Q (<80) that commercially available lumped inductors can attain.

Figure 8A:
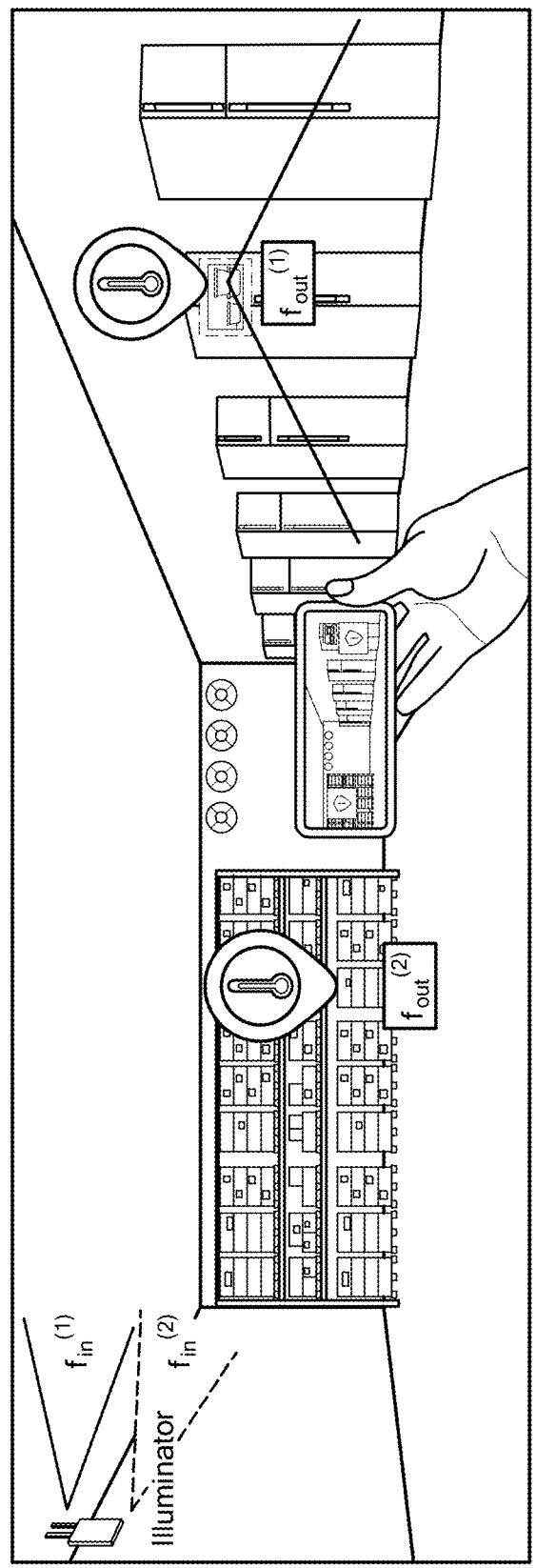
FIGS. 8A-8C illustrate a use of embodiments of parametric alarm sensor tags (PASTs) in a cold-chain facility.
Figure 8B:
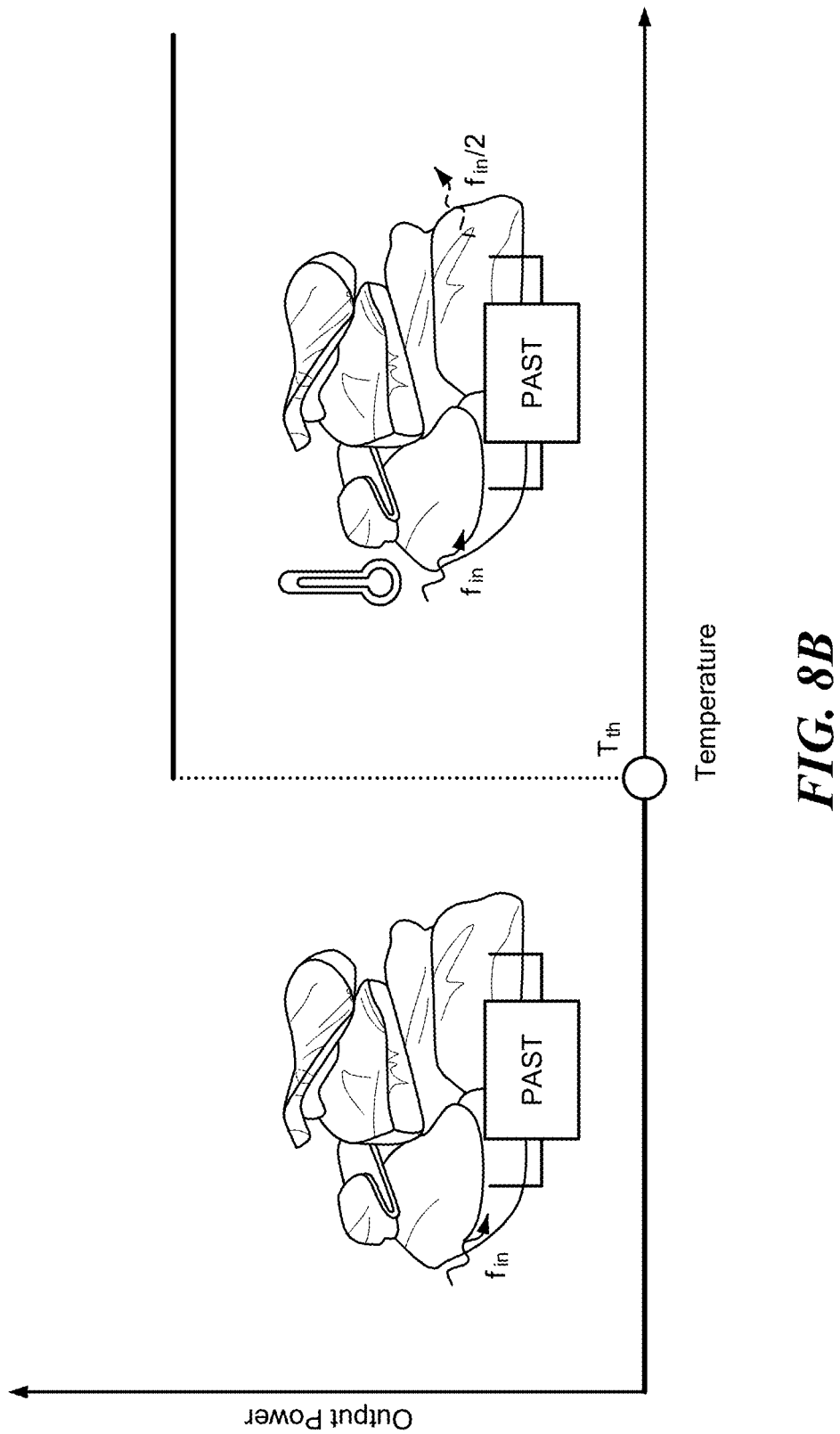
Figure 8C:
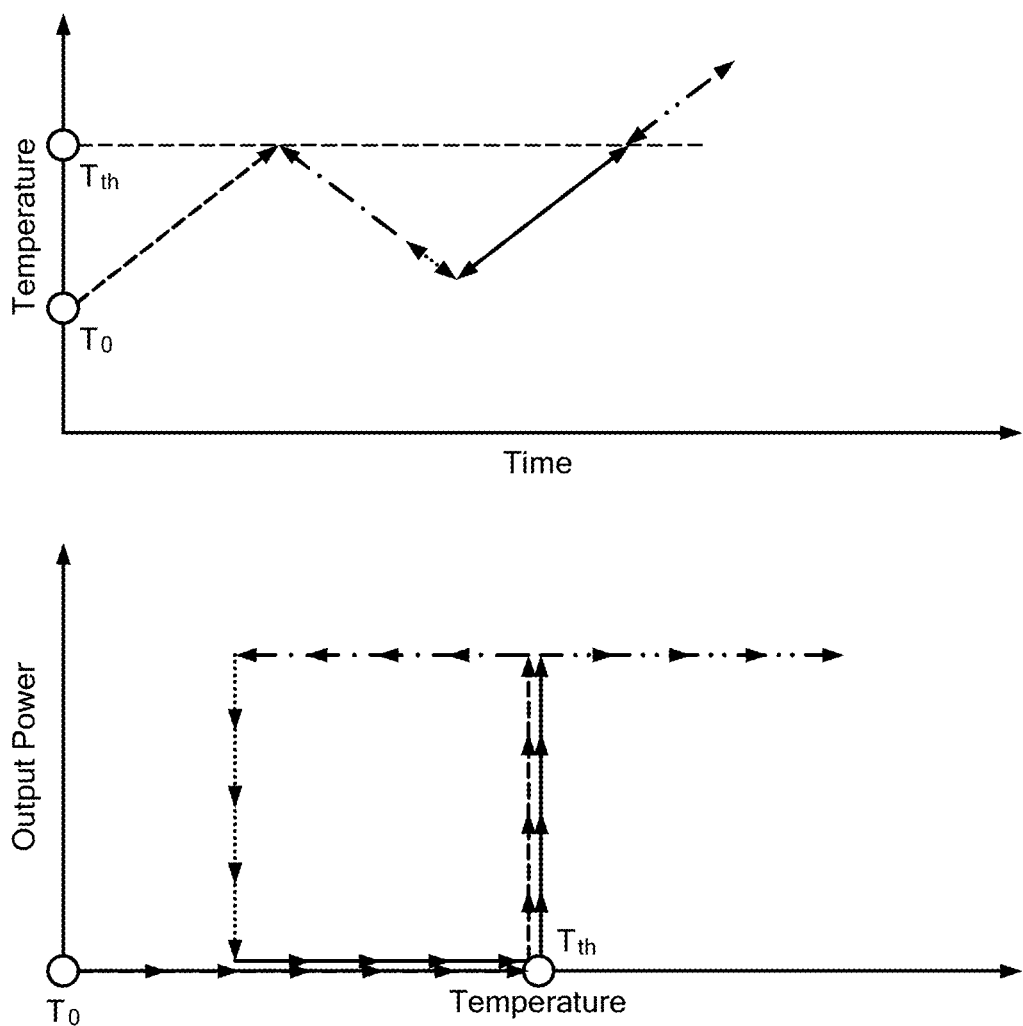

In some embodiments, the device incorporating subharmonic tag circuitry can be used as a parametric alarm sensor tag (PAST) that exhibits features useful for monitoring parameters of interest such as temperature, and particularly, for monitoring cold temperatures. For temperature-monitoring, the ability to detect, with vary large reading ranges, any specific violations of the storage temperature affecting perishable foods or drugs in the cold-chain can be beneficial (FIG. 8A). This can be done while just relying on off-the-shelf lumped components assembled on printed substrates and on a three-way sensing architecture. In particular, by leveraging some unexplored dynamics, the described PAST can rely on the not-rectified energy of a received ultra-low power RF signal with frequency ($f_{in}$), generated by a tethered co-site omnidirectional radiator used and labeled as illuminator (FIG. 8A), to trigger a strong output signal at a frequency ($f_{out}$) equal to $f_{in}/2$ only when the temperature at the tag's location exceeds a threshold value ($T_{th}$) that can be significantly lower than 0° C. (FIG. 8B). This feature allows any portable low-power readers to be able to assess whether or not a temperature violation has occurred by simply monitoring the power received at $f_{out}$, if any. Also, since such readers do not need to transmit any interrogating signals and they can remain in stand-by until awakened by the output signal of a reachable PAST, they can exhibit much longer battery lifetimes, not affected by the high power they generally consume when transmitting any interrogating signals. Furthermore, the period-doubling mechanism exploited by the reported PAST exhibits a temperature controlled hysteresis loop (FIG. 8C). Due to such unique dynamical signature and despite the fact that only conventional memory-less components are effectively used, the output signal generated in occurrence of a temperature violation event remains active even if the temperature returns to a tolerable value. This permits to flag any items in the cold-chain exposed to inadequate temperatures, allowing their prompt identification and, when strictly needed, their disposal. Also it is shown that by strategically selecting different $f_{in}$ values, any PAST can exhibit remotely reconfigurable $T_{th}$ values ranging from −47° C. to 19° C., thus providing fundamental means to monitor any items in the cold-chain at chilled, frozen and deep-frozen temperatures.

Figure 9:
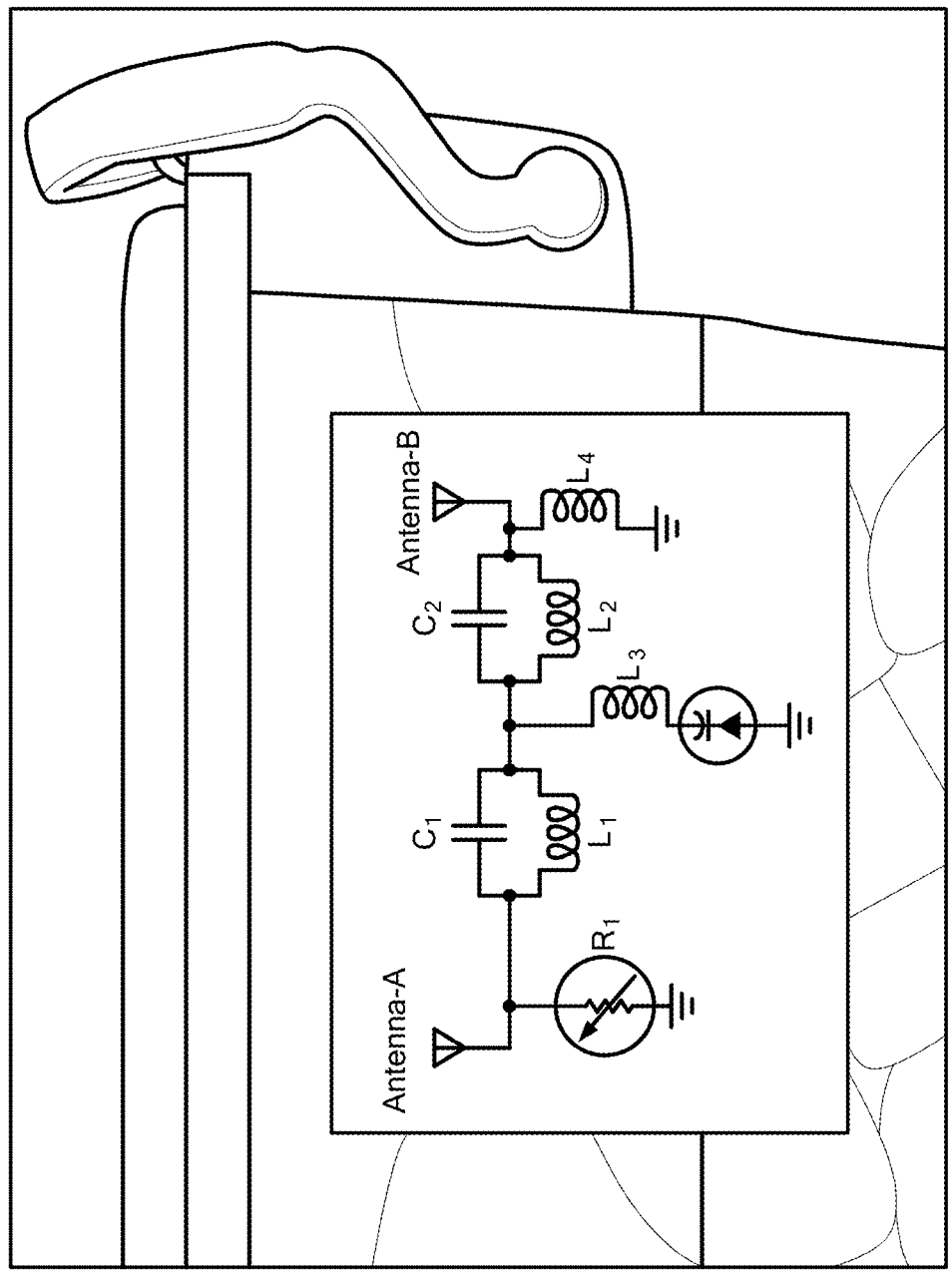
FIG. 9 illustrates a circuit schematic of a realized PAST. The off-the-shelf components forming the reported PAST are shown, including a thermistor used as a temperature sensitive element, a solid-state varactor used as the parametric element and a set of lumped components responsible to shape the PAST's stability region so that the lowest $P_{in}$ is needed to activate the subharmonic output signal generating $P_{out}$. The values and model numbers of all the adopted components are listed in Table 2.

A PAST device for temperature monitoring (FIG. 9) can be described as a passive two-port electrical network built on a printable substrate, formed by an un-biased diode and a set of lumped electrical passive components including an analog temperature sensor. The two ports are connected to properly sized antennas, with technology (wired, planar, etc.) arbitrarily selected based on specific system-level requirements and whose bandwidths are centered around $f_{in}$ and $f_{out}$, respectively. For fixed values of $f_{in}$ and of the power ($P_{in}$) received from the illuminator, and depending on the temperature ($T_a$) varying the electrical impedance of the sensor, PASTs can exhibit operational regions where an internal 2:1 subharmonic oscillation is active, initiating a passive conversion process of $P_{in}$ into radiated power ($P_{out}$) at $f_{out}$. This period-doubling mechanism occurs following a bifurcative change in the PASTs' electrical behavior, marking a transition from non-dividing to dividing operational regions. However, differently from SubHTs, which exploit the unique dynamical characteristics exhibited in the proximity of a super-critical bifurcation to achieve a boosted temperature sensitivity and an intensity-level sensing functionality, the parametric frequency generation in any PASTs is triggered following a sub-critical bifurcation. Therefore, as the PASTs' temperature exceeds a certain threshold (i.e., $T_{th}$) that can be remotely selected by varying $f_{in}$, they instinctually switch from a not-dividing operational regime to a dividing one, characterized by a large $P_{out}$ value. These features provide the means to correlate the occurrence of any events in which $T_a$ has exceeded $T_{th}$ with the existence of a wireless signal at $f_{out}$, effectively acting as an alarm for any dedicated readers (see FIG. 8B). Furthermore, due to the large parametrically enabled conversion efficiency from $f_{in}$ to $f_{out}$, PASTs can produce large $P_{out}$ values even from ultra-low $P_{in}$ ones (<−10 dBm), allowing any readers to reliably assess from a record-high distance whether or not a temperature violation has occurred, even when operating in uncontrolled electromagnetic environments. Ultimately, by leveraging a temperature-controlled hysteresis behavior originated from the operation at a $f_{in}$ value corresponding to a sub-critical bifurcation, the period-doubling mechanism responsible for the generation of $P_{out}$ in PASTs remains active even if the sensed temperature returns back to the tolerable range (see FIG. 8C). As a result, even though no NVMs or other advanced materials and devices are used, PASTs can address the functionality of a temperature-controlled non-volatile memory, permitting to identify any items in the cold-chain exposed to inadequate temperatures even when such temperature violations occurred while no reader was operative. Yet, the operation of PASTs can be reset to their original non-dividing state at any time, by temporarily interrupting the transmission of power from the illuminator. All these unique characteristics allow to indefinitely re-use any fabricated PASTs to monitor heterogeneous items kept at extremely different storage temperatures, covering the large majority of the products processed and distributed along the cold-chain.

Thus, embodiments of a parametric alarm sensor Tag (PAST), a printable can provide a battery-less and chip-less tag for temperature monitoring of refrigerated items. Due to its parametric behavior, this sensing device can allow the remote identification any cooled items exposed to inadequate temperatures, exceeding any remotely configurable threshold values ($T_{th}$) ranging from −47° C. to 19° C. Also, due to a dynamically enabled temperature-controlled hysteresis behavior and despite the fact that only conventional memory-less passive components are used, the PAST can allow flagging of any items exposed to an unsustainable temperature even if such exposure occurred when no operational reader was active.

Embodiments of the technology described herein can provide a number of advantages. The device and system can achieve a real-time identification and a massive simultaneous sensing of a large number of items and systems. In some embodiments, the device can rely on the combination of a high-Q resonant component included at the output port of a parametric frequency divider or subharmonic tag. By simultaneously leveraging the properties of both elements, the device can overcome the performance achieved by previously developed counterparts by orders of magnitude.

The device can be fabricated through conventional IC-techniques, in large scale production. It can show better sensitivity than achieved by existing sensing technology. It can permit the achievement of a continuous parameter sensing and a threshold parameter sensing in the same device. It can enable a real time exchange of data between the sensor and the reader, because the reader can interrogate the sensor at a different frequency from the one used by the sensor to transmit the information. The device is fully passive and can in some instances be battery-free. The technology is readily scalable to generate thousands of different sensors, without adding fabrication complexity and which minimizes production costs. The technology can help to overcome the sensitivity by conventional sensors. With the technology, it can be possible to avoid using any active radio components to process the information back to the reader.

The technology can be used in a variety of applications. For example, the technology can employ a variety of sensors, such as a temperature sensor, pressure sensor, humidity sensor, vibration sensor, acceleration sensor, strain sensor, magnetic sensor, gyroscopic sensor, infrared sensor, chemical sensor, gravitational sensor, radio frequency identification (RFID) sensor, environmental parameter sensor, chemical parameter sensor, or physical parameter sensor. The technology can be used for passive wireless sensing. The technology can be used for RF-identification at low-cost and large signal contrast (i.e. noise-immune). The technology can be used for embedded sensors for harsh environments. The technology can be used in the Internet of Things (IoT). The sensing device can be disposed in a variety of locations, such as in a cold storage device, a refrigerator, a freezer, a cold storage facility, a cold transportation vehicle, on food packaging, on medical packaging, on drug packaging, in concrete or other construction materials, in a structure for structural health monitoring, a bridge, a tunnel, or a building.

The sensing device can be used with applications for remote sensing of intra-body biomedical markers without requiring components that need to be replaced after a short time. The sensing device can be used for structural integrity monitoring of structures such as buildings or bridges by embedding the tags in concrete or other construction materials, enabling the monitoring of their structural health through wireless readers that can be hundreds meters away from them. The tags of the present technology can be in applications in which RFID tags, SAW-based tags, or harmonic tags may be used.

In some applications, the sensing device can include a temperature sensor and the parameter of interest can be a temperature ranging from +60° C. to −70° C. In some embodiments, the sensing device can sense threshold temperature. In some embodiments, the temperature can be −70° C., −60° C., −50° C., −40° C., −20° C., −10° C., 0° C., +10° C., +20° C., +30° C., +40° C., +50° C., +60° C., +70° C., +80° C., +90° C., +100° C., +150° C., +200° C., or +300° C.

The technology is applicable to compact and passive radio-frequency (RF) transponders, like RFID-tags, to enable the temperature monitoring of a steadily growing number of different kinds of goods and items, such as specialized equipment used in manufacturing warehouses and data-centers. Similarly, the availability of such RF systems can also be beneficial in cold-chain applications, where passive temperature-threshold systems can enable the prompt identification of any perishables, from food to medicine, exposed to incompatible temperatures. While different types of passive transponders, enabling either a continuous or a threshold temperature sensing, have been demonstrated, none of them can address both the two functionalities and have design characteristics that enable monitoring of multiple, in some instances thousands, of different items.

EXAMPLES

Example 1

Figure 10:
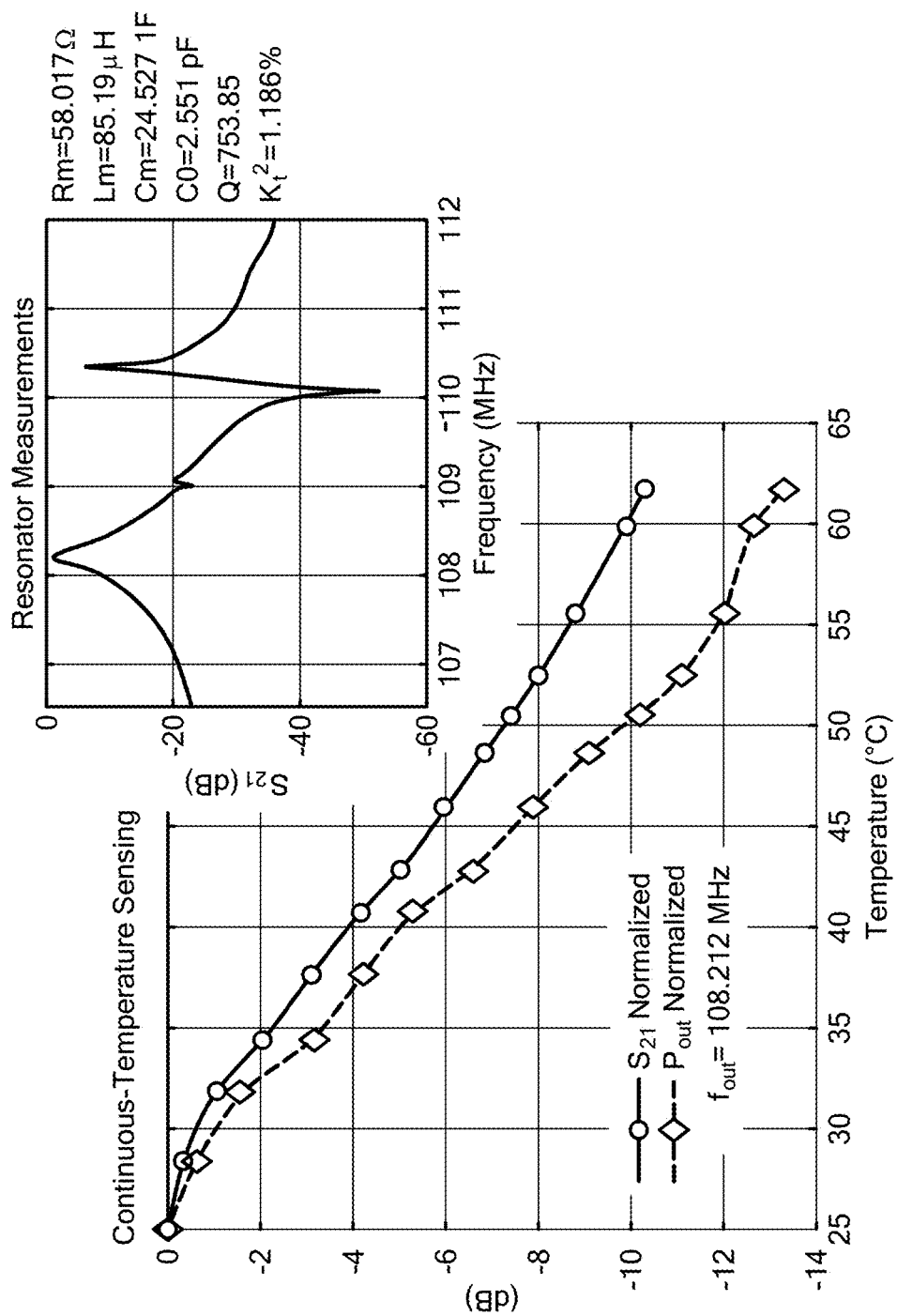
FIG. 10 illustrates measured trends of the normalized PAT output power ($P_{out}$, in red) vs. T and of the resonator $S_{21}$ vs. T (in blue), for $V_{DC}$=0.4V. The measured $S_{21}$ of the LiNbO$_3$ resonator and its equivalent MBVD parameters, at ambient temperature, are also reported. Both trends were extracted after varying the T-value, at the PAT location, through a reprogrammable hot-plate.
Figure 11:
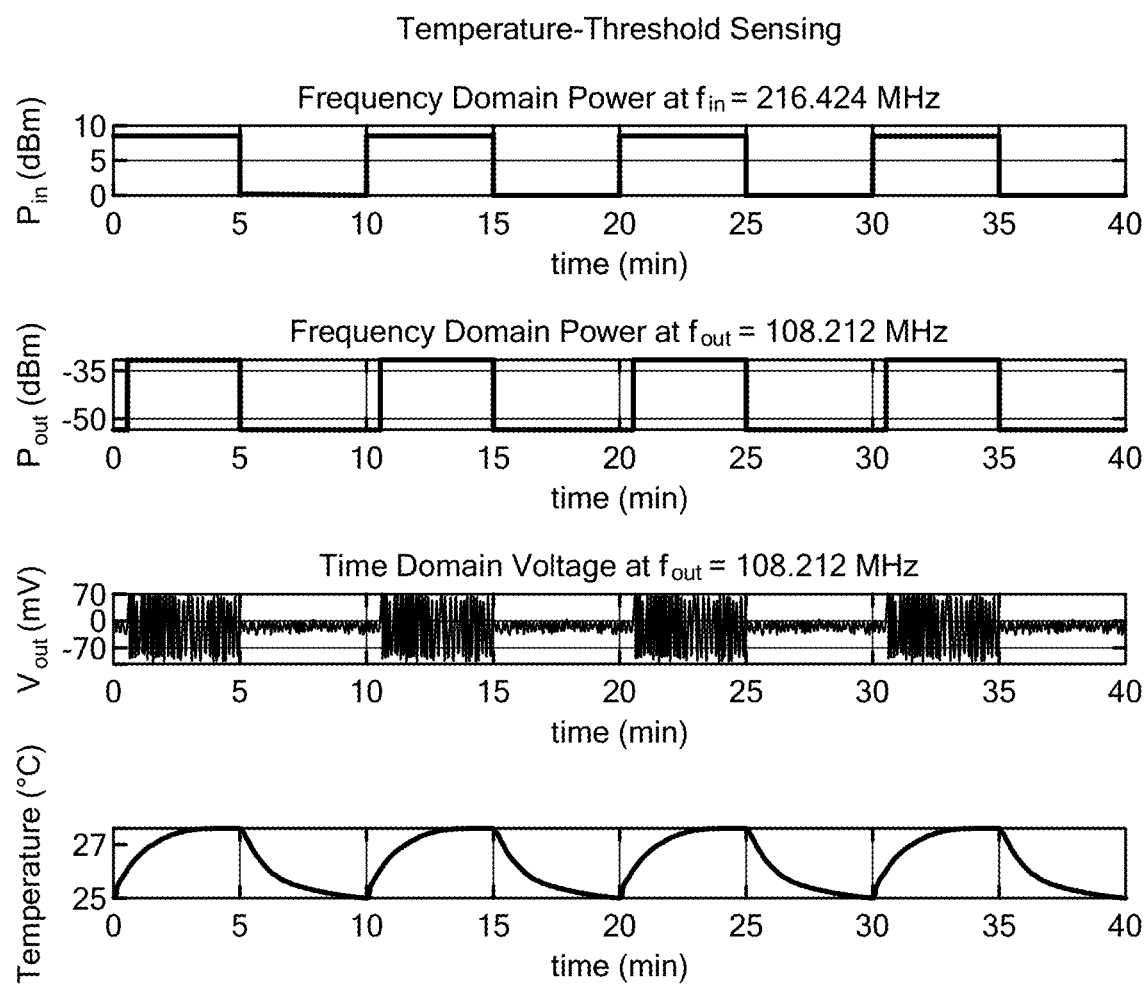
FIG. 11 illustrates frequency-domain trends of $P_{in}$ (@$f_{in}$) and of the measured $P_{out}$ (@$f_{in}$/2) within a 40 minutes time-frame, including 4 temperature triggering events. Also, a time-domain representation of the PAT output voltage ($V_{out}$), is reported. Finally, the controlled time-domain temperature profile, at the PAT location used in the experiment is also reported.

A prototype was built of a passive acoustic transponder (PAT) as described above. This device relied on a lumped PFD, using off-the-shelf components. The PFD was designed for a minimum $P_{th}$(~−15 dBm) at $f_{in}$~$2f_{res}$ ($f_{res}$=108.212 MHz), in which $f_{res}$ was the resonance frequency of the LiNbO$_3$ resonator, at ambient temperature. The PAT, driven by a signal at $2f_{res}$ with power $P_{in}$, showed different $P_{out}$ vs. T distributions, for $V_{DC}$ equal to 0.4 or 0.7V. In particular, for $V_{DC}$=0.4V, its PFD operated in proximity to a super-critical bifurcation (continuous-temperature-sensing mode). Due to this feature, $P_{out}$ exhibited a higher sensitivity to T than that exhibited by the transmission coefficient ($S_{21}$, see FIG. 10) of the LiNbO$_3$ resonator, operating as a conventional temperature sensor. In contrast, for $V_{DC}$=0.7V, the PFD operated close to its sub-critical bifurcation (temperature-threshold-sensing mode), thus generating a divided signal only in the presence of ~1-degree temperature rise (FIG. 11).

The experiment showed the capability to use the disclosed device to implement an ultra-sensitive wireless temperature measurement, in an uncontrolled lab space. Moreover, for this second demo, the parametric frequency divider (PFD) was operated at higher frequencies, approaching the ISM-band (the one used by most commercial IoT devices). The whole system was based on only passive off-the-shelf components that can operate without the need of a battery. The system included a PFD and a thermistor, connected to the input of the PFD. The PFD exhibited unique dynamics that make it able to activate a 2:1 sub-harmonic oscillation when its input power ($P_{in}$) exceeded a certain threshold power ($P_{th}$) (see FIGS. 12A, 12B).

The experiment included two parts: the wired measurements and the wireless measurements. Both the two parts are discussed in the following sections.

A. Wired Setup

Figure 12A:
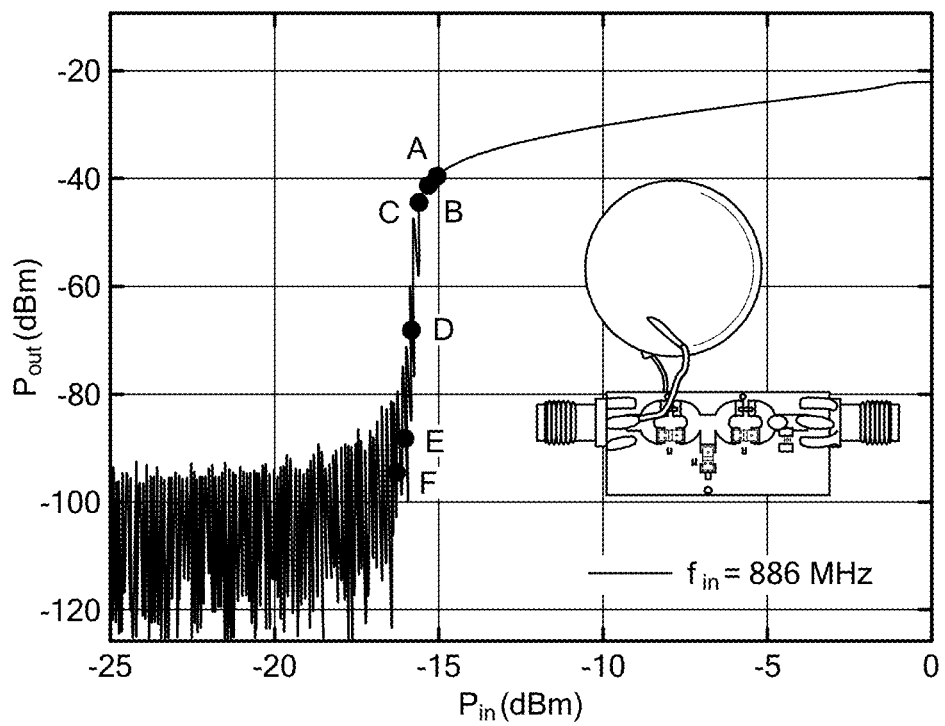
FIGS. 12A and 12B are A) the bifurcation phenomenon of the wired output power measurements of the PFD vs the input power at $f_{in}$=886 MHz. The inset shows the system of the fabricated PFD connected to the thermistor; B) the wired measurements of the output power vs the temperature at different input power values located on the bifurcation curve in FIG. 12A.
Figure 12B:
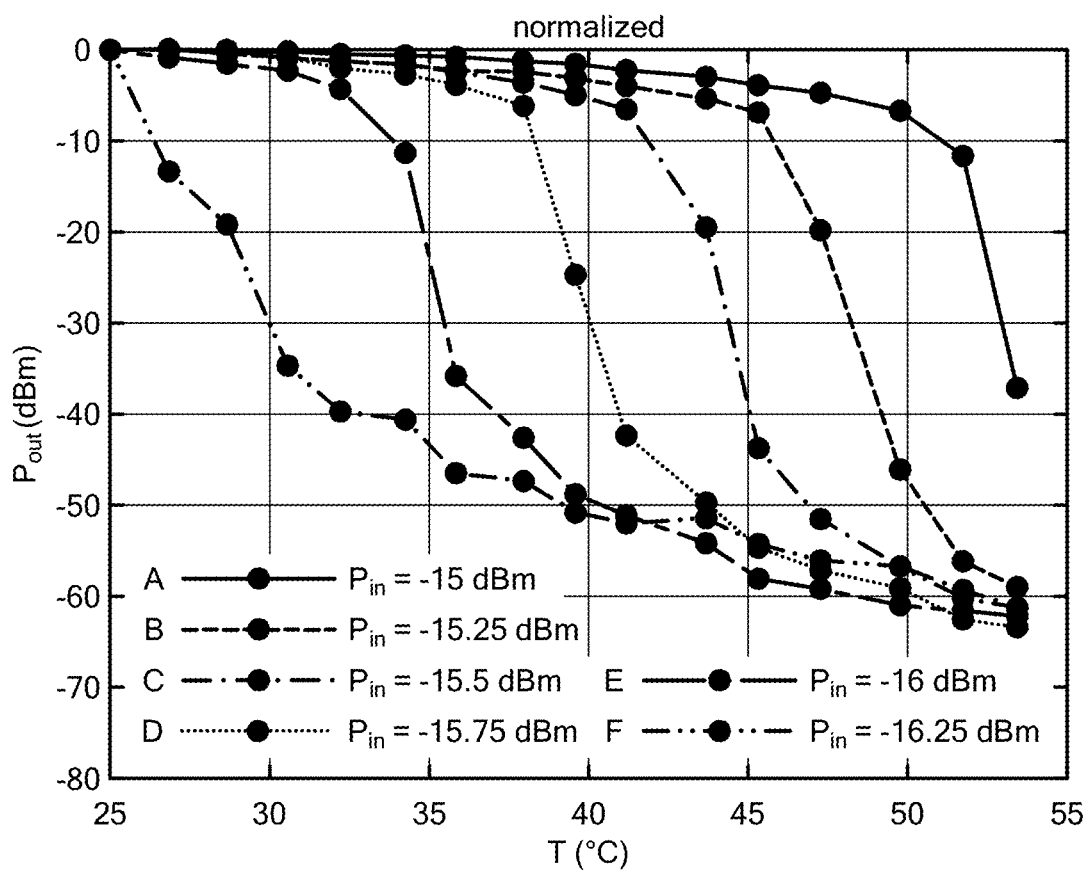

In this part of the experiment, the behavior of the system using RF cables was characterized. The PFD was here driven by a signal generated from a signal generator at 886 MHz and its output power ($P_{out}$) (at the divided frequency, 443 MHz) was monitored through a spectrum analyzer. FIGS. 12A and 12B illustrates the relationship between $P_{out}$ and $P_{in}$ of the PFD, at room temperature. In FIG. 12A, the different points (from A to F) on the curve represent different operating regions, with different slopes (i.e. different temperature sensitivities), where they are accessible through the use of different $P_{in}$-values. So, by sweeping the temperature when operating at every single considered point, different sensitivities of $P_{out}$ vs. temperature were leveraged, within an explored temperature range (from 25 to 55 degrees, for this experiment).

It can be seen from FIG. 12A4 that selecting as the operating points those corresponding to the highest slopes in FIG. 12A (points C, D and E) allows the production of a large change of $P_{out}$, even for low temperature differences. For instance, at point D in FIG. 12A, a change of 3.2 degrees in temperature around 39.5° C. produced a change in the $P_{out}$ level of 36 dB, which is approximately 11.25 dB/° C.

B. Wireless Setup

Figure 13A:
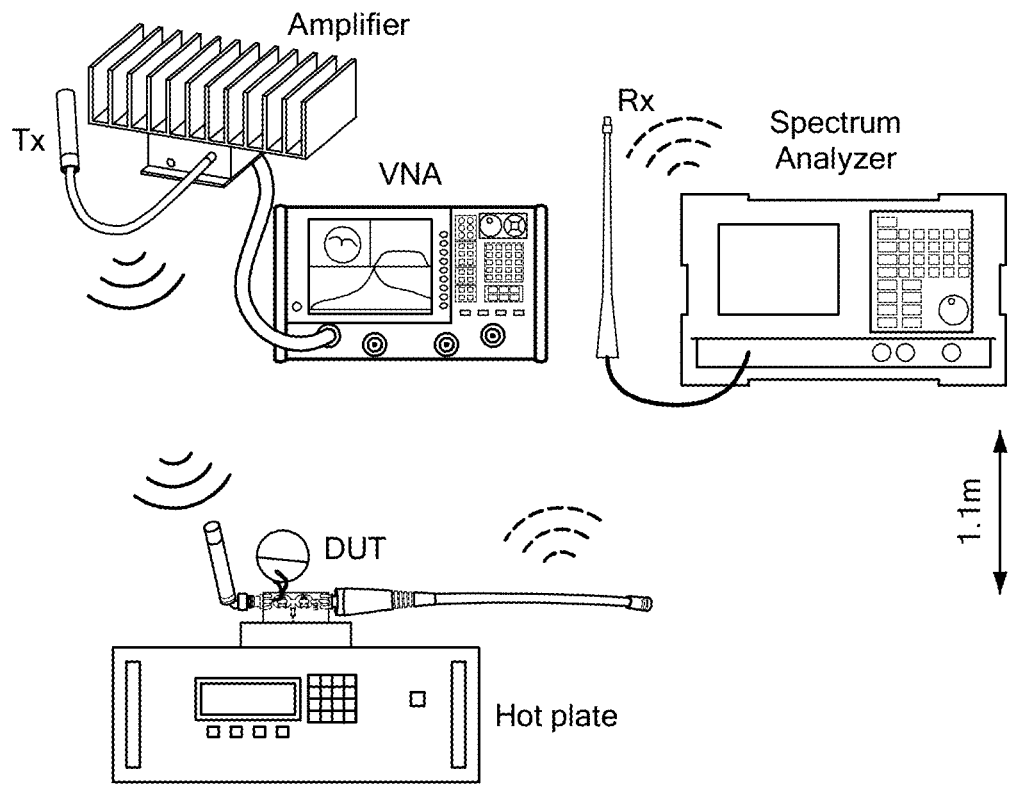
FIGS. 13A and 13B are A) the wireless experiment setup where the DUT is placed over a temperature-controlled hotplate. The DUT receives a signal at 886 MHz from the Tx antenna that is fed from a vector network analyzer (VNA) (PNA N5221A) through an amplifier (ZHL-1000-3 W+). The DUT transmits a signal at 443 MHz to the Rx antenna that is connected to a spectrum analyzer (E4402B; B) the wireless measurements of the output power vs the temperature at different input power values located on the bifurcation curve.
Figure 13B:
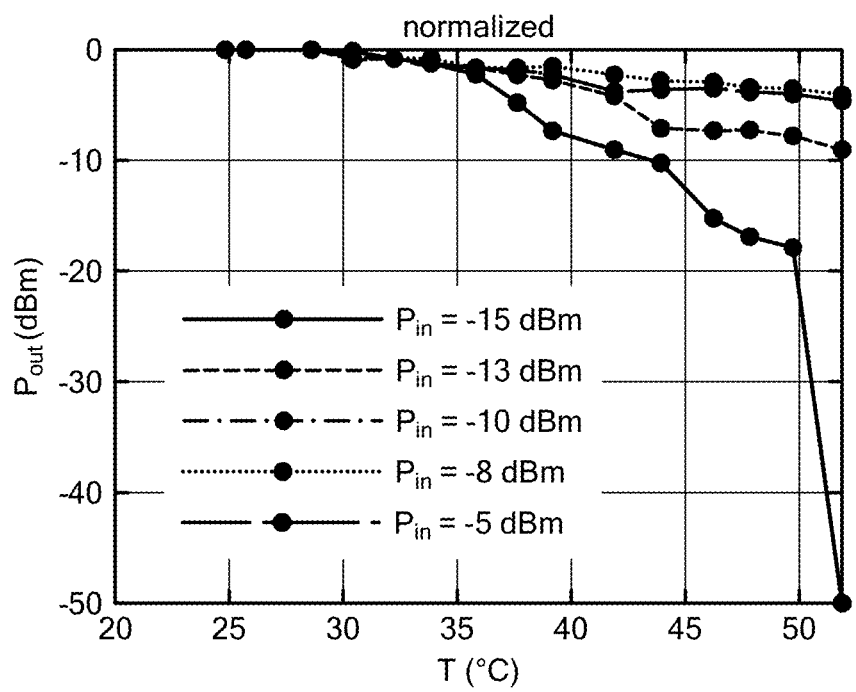

In the second part of the experiment, the same procedure was followed except that all the RF cables were replaced with commercial antennas, as shown in FIGS. 13A, 13B. In this case a wireless transmitter was used to produce $P_{in}$ (when a temperature measurement was needed) and receive $P_{out}$, thus being able to extract the temperature information. The device under test (DUT) was placed 1.1 m away from the transmitter.

The behavior of $P_{out}$ vs. temperature is reported in FIG. 13B, thus showing a similar trend attained through the wired characterization. The demonstrated system differed from any other reported to date. In particular, the system was fully-passive and did not need batteries or chips. The system used differently spaced channels to implement a real-time temperature sensing. The large frequency difference between transmit and receive channels enabled the reader to both interrogate and acquire the information, reliably, at the same time. The system achieved unprecedented temperature sensitivities without requiring high quality factor electrical components, which are often expensive.

Example 2

Figure 21A:
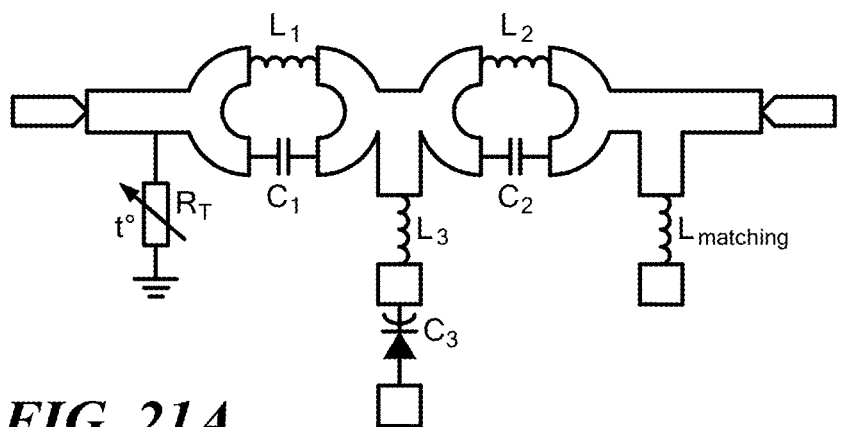
FIGS. 21A-21C illustrate the details of the fabricated prototype of the SubHT.
Figure 21B:
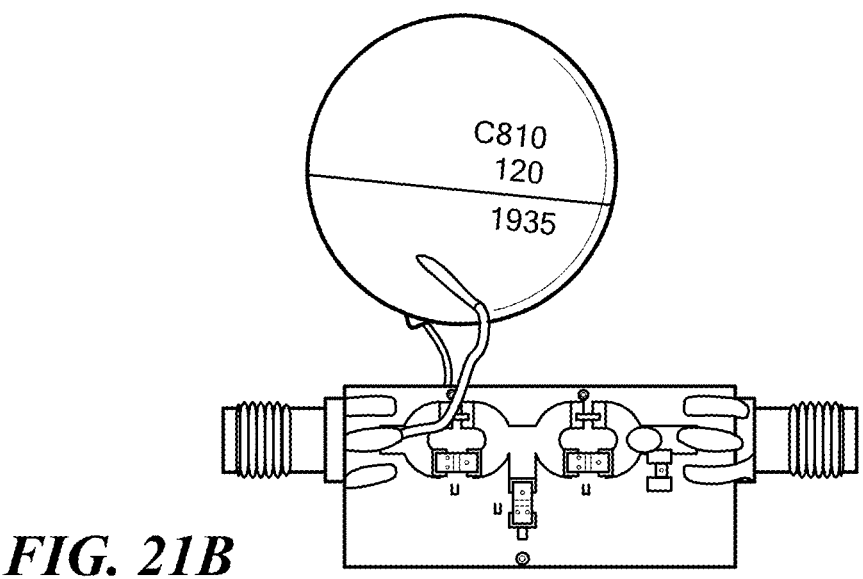
Figure 21C:
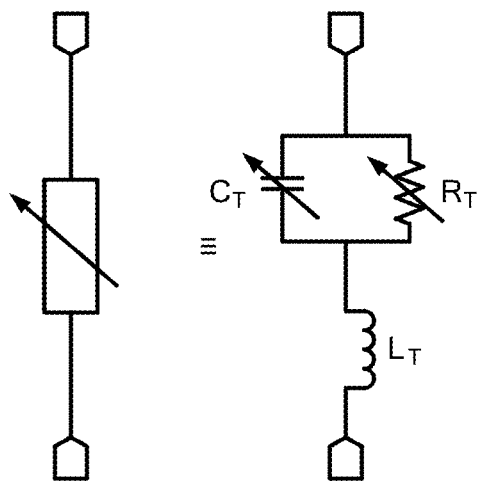

An ultra-high-frequency subharmonic tag (SubHT) prototype was built (see FIGS. 21A-21C), designed to continuously monitor the temperature remotely from an interrogating node. The dynamics leveraged by the system and discussed herein allowed the achievement of large, electronically and passively boosted temperature sensitivity and dynamic range, up to 6.2 dB/° C. and 48 dB. These values are respectively 37 and 35,000 times higher than what is possible when the commercial thermistor, selected as the SubHT temperature-sensitive component, is independently used as a temperature sensor for operation within the same explored temperature range. Also, due to its large sensitivity, a minimum temperature resolution of 0.002° C. was found. The maximum sensitivity achieved by the SubHT highly exceeded the ones attained by state-of-the-art counterparts relying on advanced on-chip manufacturing or on large optical components and systems.

The subHT prototype was made of off-the-shelf lumped components, described further below. The device operated at $f_{in}$ equal to 886 MHz and remotely measured temperature at 4 meters from a complementary interrogating node. Despite the fact that this SubHT did not rely on any advanced components with high temperature-sensitivity and high dynamic range but only on a commercial off-the-shelf thermistor, it was able to show a sensitivity (Sm) and a dynamic range that were orders of magnitude higher than what is achievable when the same thermistor is used as a separate sensor.

Figure 14:
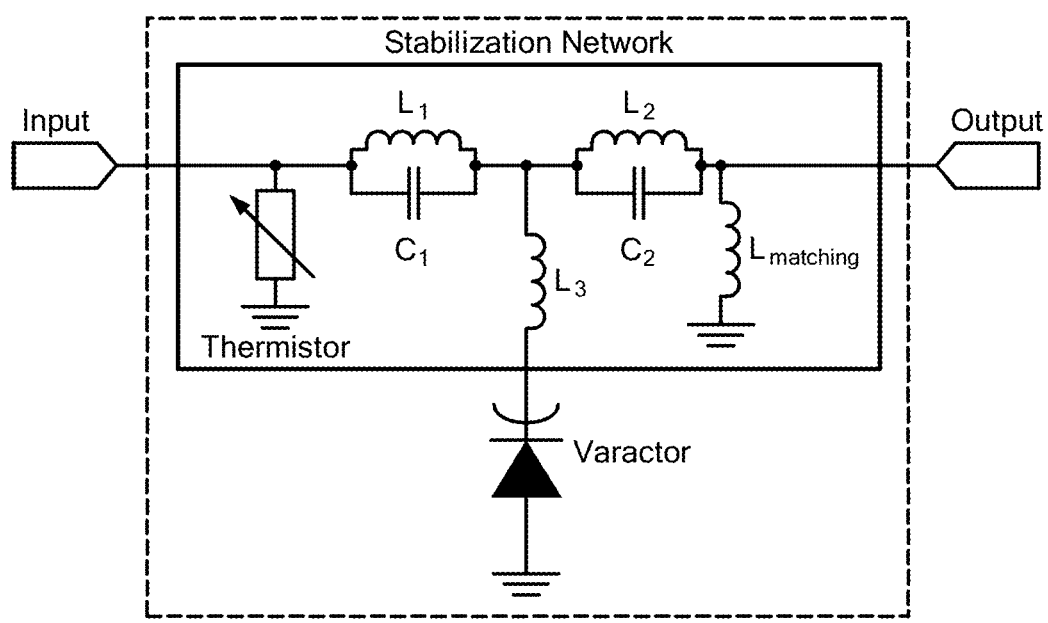
FIG. 14 illustrates a circuit schematic of the realized SubHT for temperature sensing. The components forming the stabilization network of the built SubHT are shown, including the off-the-shelf thermistor used to activate the temperature-sensitive dynamics leveraged during the sensing operation. The values and model-numbers of all components in the circuit and a picture of the fabricated SubHT are available in FIG. 5 and Table 2.

More particularly, the SubHT prototype was built targeting a remote and continuous temperature (T) sensing. This prototype was designed and assembled on a printed circuit board (PCB) made of FR-4, relying on off-the-shelf lumped components including two capacitors ($C_1$ and $C_2$), four inductors ($L_1$, $L_2$, $L_3$, $L_{matching}$), one varactor and a commercial thermistor (FIG. 14). The thermistor was used as the required sensitive element in the SubHT stabilization network, allowing its temperature-sensitive dynamics. Employing the stability of varactor-based parametric systems, and given the impedance exhibited at room temperature by the selected thermistor, the inductors and capacitors of the built SubHT were selected to minimize $P_{th}$ at $f_{in}$ equal to 886 MHz. This was done by satisfying four resonant conditions allowing the maximum voltage level across the varactor at $f_{in}$, the minimum leakage of $P_{out}$ towards the receiving antenna and the lowest impedance magnitude seen by the varactor at $f_{out}$. Such design conditions simultaneously enable the largest modulation depth of the varactor's capacitance, the highest output power, and the lowest loss that is to be parametrically compensated in order to trigger the desired sub-harmonic oscillation in the circuit. The temperature sensing capabilities of the SubHT were characterized by placing it on a digitally controlled hotplate to vary the T value at the SubHT location from 25° C. to 60° C. with a step of 2.5° C. The SubHT input and output ports were connected to two synchronized network analyzers, respectively acting as a 50Ω signal generator at $f_{in}$ and as a 50Ω power meter at $f_{out}$.

Figure 15A:
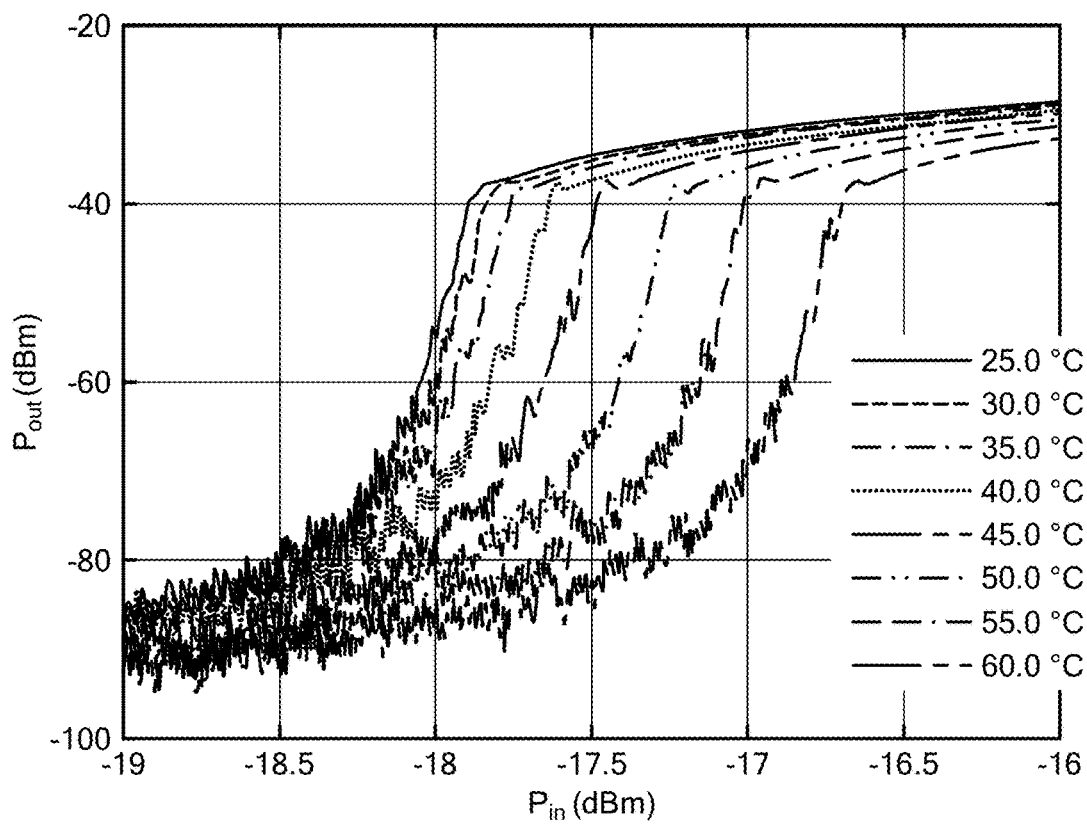
FIGS. 15A-15D illustrate an evaluation of the sensing capabilities of the fabricated SubHT.
Figure 15B:
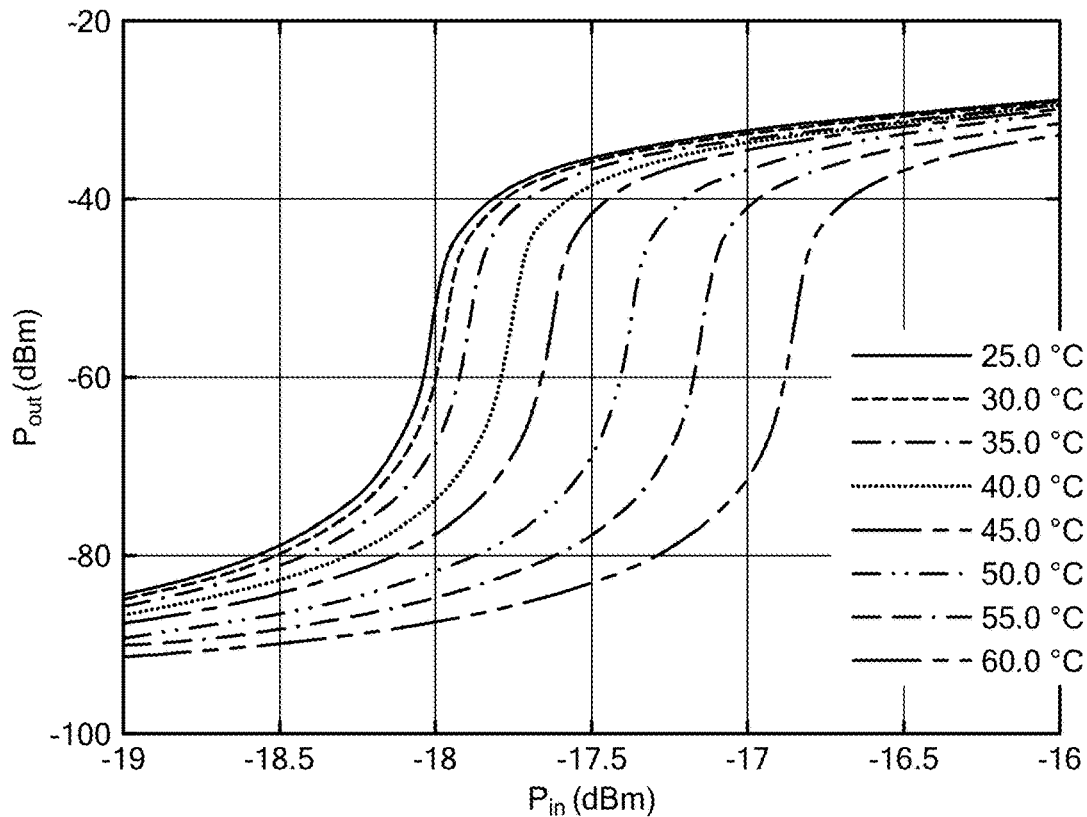
Figure 15C:
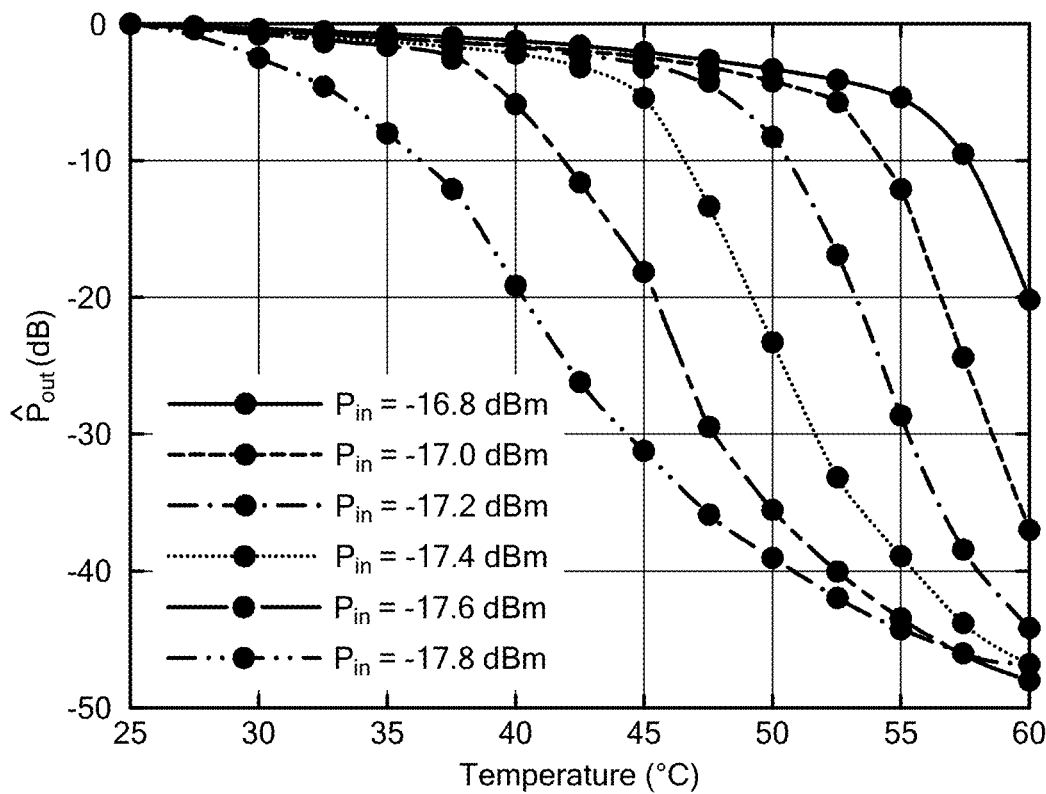
Figure 15D:
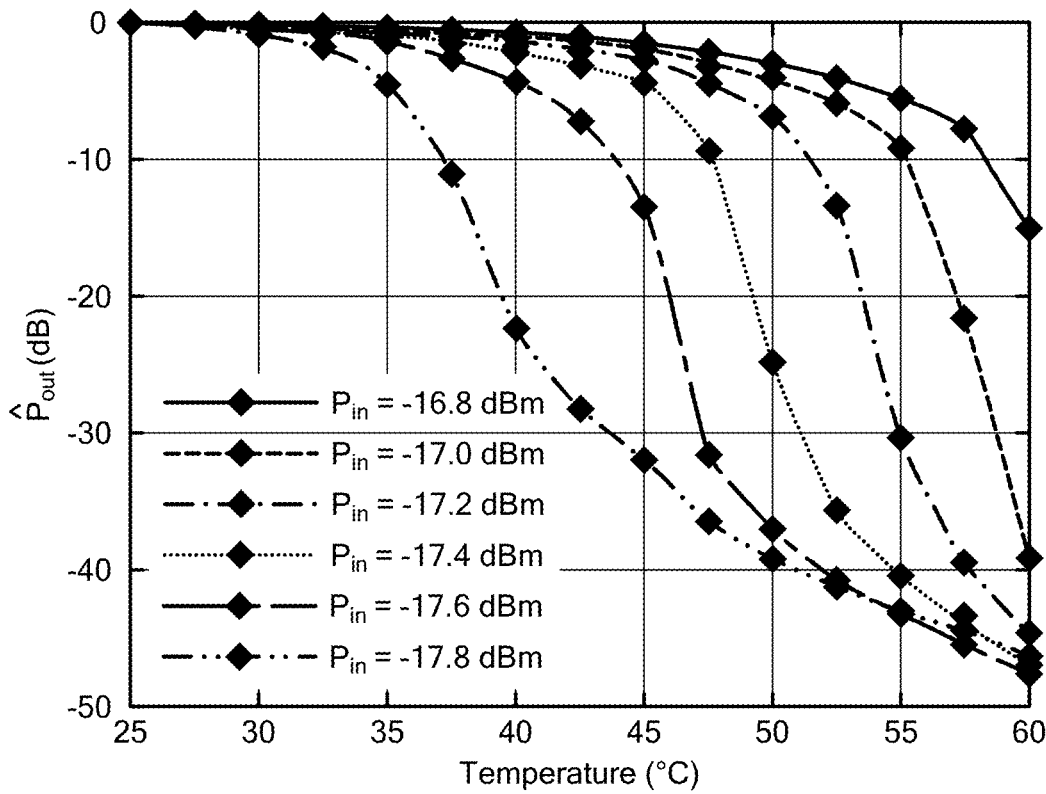
Figure 16:
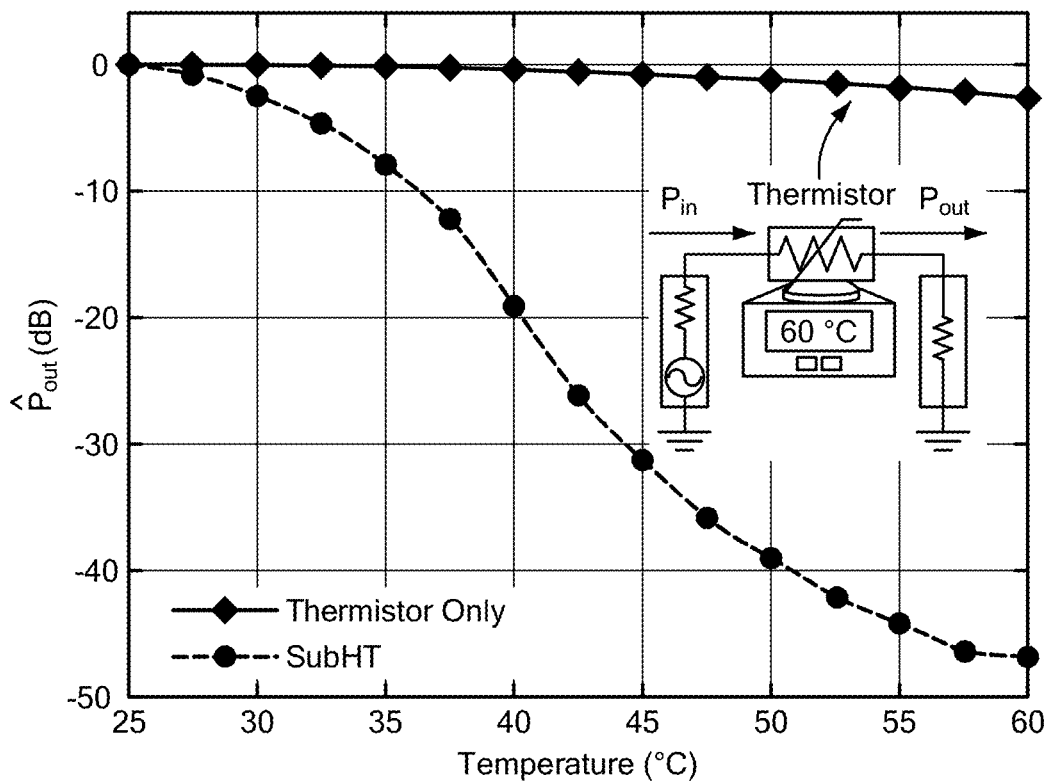
FIG. 16 is a graph illustrating surpassing the limits in the achievable sensitivity. A comparison of the $P^{\wedge}_{out}$ values attained by the built SubHT (with circles, in green), for the different investigated temperatures, with the corresponding $P_{out}$ values (with diamonds, in blue) that would be attained, instead, if the thermistor used by the SubHT was individually utilized as the temperature sensor. For clarity, the circuit schematic used for the evaluation of the latter case is also displayed in the inset.
Figure 17:
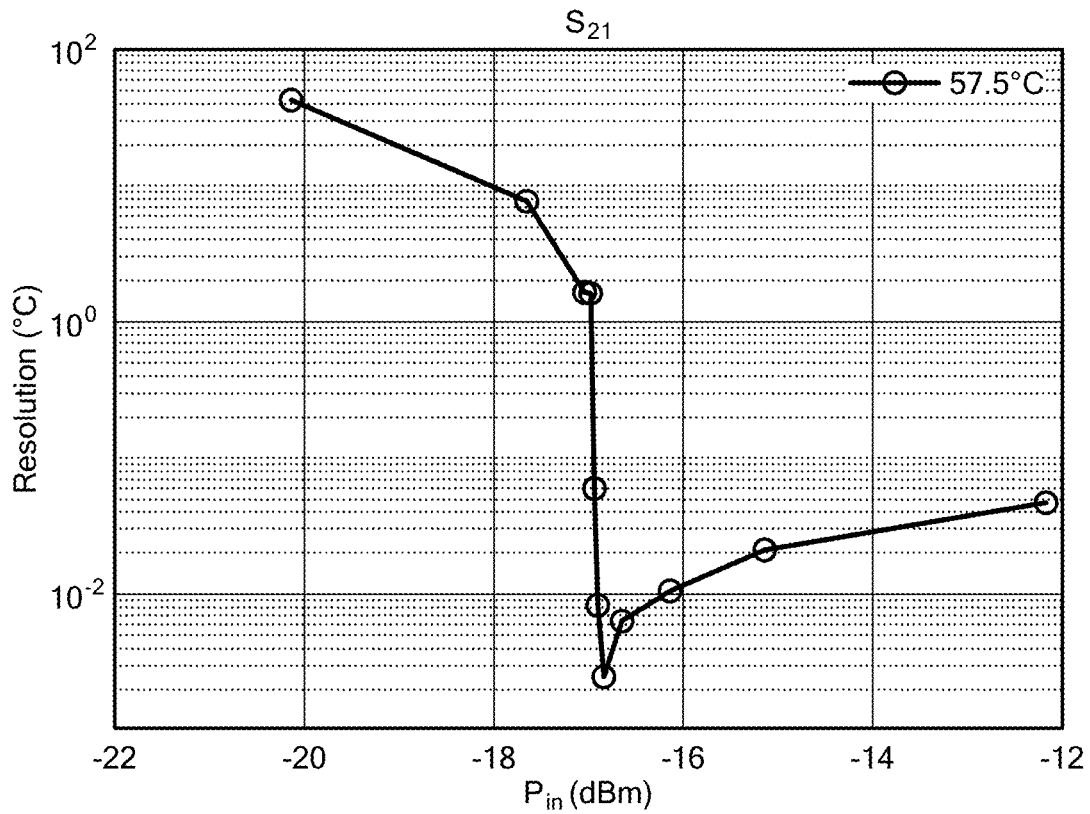
FIG. 17 illustrates the temperature resolution of the SubHT. The plot is illustrating the temperature resolution vs. $P_{in}$ at 57.5° C. The temperature resolution of the SubHT is calculated by obtaining the maximum noise-induced variation of $P_{out}$ for different $P_{in}$ values around $P_{th}$ and divide it by the corresponding temperature sensitivity relative to the same $P_{in}$. It can be seen that the minimum resolution is achieved at $P_{in}$=−17 dBm, which is the $P_{in}$ value corresponding to the highest temperature sensitivity ($S_{max}$).

The measured $P_{out}$ vs. $P_{in}$ characteristics for all the explored T values are reported (FIG. 15A), along with the closely matching corresponding ones found through circuit simulations (FIG. 15B). As expected, a super-critical bifurcation was found for all the explored T values, marking the transition between the SubHT operational regions without frequency division and the ones with frequency division. In particular, $P_{th}$ values as low as −18.5 dBm were measured along with conversion loss (CL) values approaching 21 dB, which are significantly lower than the ones of any reported harmonic tags relying on unbiased nonlinear reactances to avoid using batteries or energy harvesters. Furthermore, as the temperature at the SubHT location was varied, a clear monotonic increase of $P_{th}$ was noticed caused by a temperature-driven change of the impedance seen by the varactor at $f_{in}$. Due to the steep slope of the $P_{out}$ vs. $P_{in}$ characteristic exhibited in proximity of the super-critical bifurcation, such a shift in $P_{th}$ can produce a large variation of $P_{out}$ that provides for the achievement of the superior sensing capabilities reported herein. In fact, by strategically selecting a $P_{in}$ value close to the specific $P_{th}$ value measured at 25° C., this SubHT can obtain large sensitivities and dynamic ranges that cannot be reached otherwise. This was confirmed, through both direct measurements and circuit simulations, by extracting the corresponding $P_{out}$ values for different $P_{in}$ close to −18.5 dBm and when considering the same analyzed T values. The extracted values ($P^{\wedge}_{out}$) from both the measurements and simulations, normalized to the corresponding $P_{out}$ values at 25° C., are shown in FIG. 15C and FIG. 15D respectively. As evident, the built SubHT can exhibit remarkable ratios ($\Delta P^{\wedge}_{out}$) between the $P^{\wedge}_{out}$ values extracted at 25° C. and 60° C. This allowed the device to reach average temperature sensitivities ($S_{avg} = \Delta P^{\wedge}_{out}/\Delta T$, $\Delta T$ being the size of the explored temperature range) as high as 1.4 dB/° C. Such $S_{avg}$ value is 20 times higher than what is attainable (0.07 dB/° C.) when the thermistor included in the built SubHT is used as a separate sensor, altering the power flow between the two electrical ports of a dedicated optimized circuit exposed to the same temperature changes (FIG. 16). In addition, the SubHT showed a maximum value ($S_{max}$) for the temperature sensitivity across the investigated temperature range, defined as the magnitude of the largest slope of the $P^{\wedge}_{out}$ vs. T trend, of 6.2 dB/° C., measured at $P_{in}$ equal to −17 dBm and around a T value of 57.5° C. In particular, it was found that, by operating at such optimal working condition, the built SubHT not only exhibited the highest sensitivity but also attained the lowest temperature resolution, equal to 0.002° C. (see FIG. 17 for a measured trend of resolution vs. $P_{in}$ at 57.5° C.). This showed that the predominant noise source limiting the value of the minimum detectable temperature change was not the adopted thermistor but the network analyzer used for the read-out.

Furthermore, the SubHT showed a large dynamic range of 48 dB. The measured S. and dynamic range values were respectively 37 times and 35,000 times higher than the corresponding values (0.17 dB/° C. and 2.6 dB) attained when the thermistor in the SubHT circuit was used as a separate temperature sensor (FIG. 16). Finally, the adjusted R-squared value relative to the SubHT measured $P^{\wedge}_{out}$ vs. T trend reached 0.9669, demonstrating a good linearity between temperature and $P^{\wedge}_{out}$. So, the measured results demonstrated that SubHTs can surpass the fundamental limits of the sensitive component in their stabilization networks. A comparison between $S_{max}$ and the maximum sensitivity values attained by other recently reported intensity-level temperature sensors is provided in Table 1. As evident, the measured SubHT can exhibit a higher temperature sensitivity than any other previously reported counterparts, yet not requiring any active and large sensing set-ups, such as those needed when relying on optical components and systems, or any advanced integrated complementary metal-oxide-semiconductor (CMOS) and SAW devices.

TABLE 1

Comparison with other temperature sensors. The maximum temperature sensitivity and the corresponding resolution of the SubHT (i.e., $S_{max}$) are compared with previously reported counterparts, over different temperature ranges and through other sensing technologies.

| Sensor | Sensor Technology | Temperature Range (° C.) | Max Sensitivity (dB/° C.) | Min Resolution (° C.) |
|---|---|---|---|---|
| This work | Parametric | 25-60 | 6.2 | 0.002 |
| 1 | Optical | 22-27 | 0.058 | — |
| 2 | Optical | 25-65 | 0.42 | — |
| 3 | Optical | 26-100 | 0.23 | — |
| 4 | Optical | 47-63 | 2.26 | — |
| 5 | Optical | 22-40 | 2.1 | 0.0005 |
| 6 | Optical | 40-100 | 0.24 | — |
| 7 | Optical | 15-60 | 0.22 | — |
| 8 | Optical | 20-75 | 0.03 | 0.03 |
| 9 | Optical | 30-80 | 0.1 | 0.0098 |
| 10 | Optical | 22-60 | 0.13 | — |
| 11 | SAW | 25-300 | 0.16 | — |
| 12 | SAW | 35-118 | 0.13 | — |
| 13 | SAW | 25-300 | 0.065 | 0.15 |
| 14 | SAW | 20-100 | — | 0.016 |
| 15 | CMOS | 0-100 | — | 0.0582 |
| 16 | CMOS | 30-49 | 0.027 | 0.003 |
| 17 | CMOS | −20-60 | — | 0.21 |

Figure 18A:
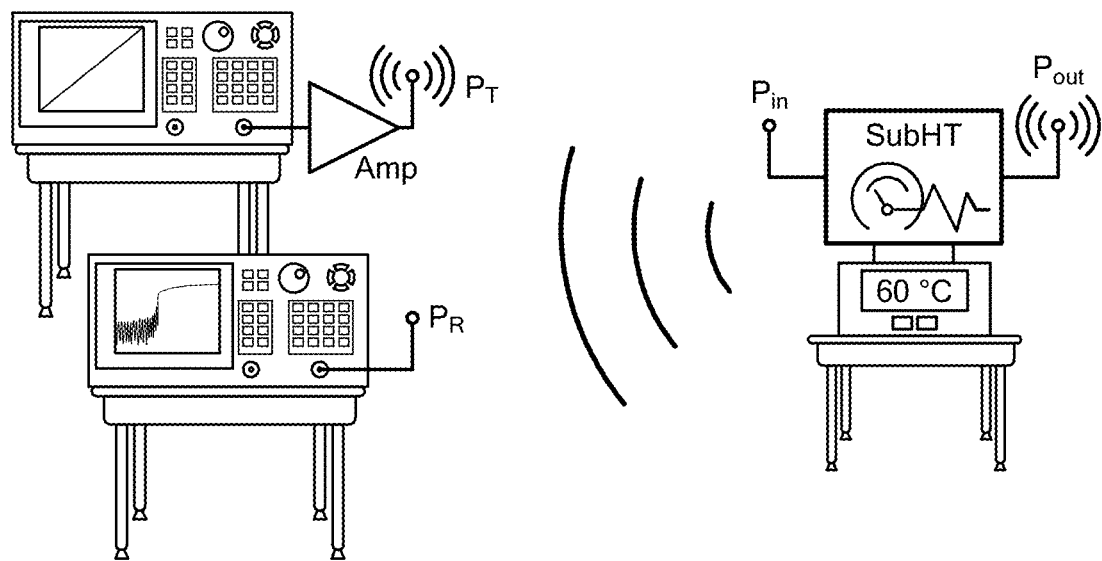
FIGS. 18A-18D illustrate wireless characterization of the built SubHT used as a wireless sensor node (WSN).
Figure 22:
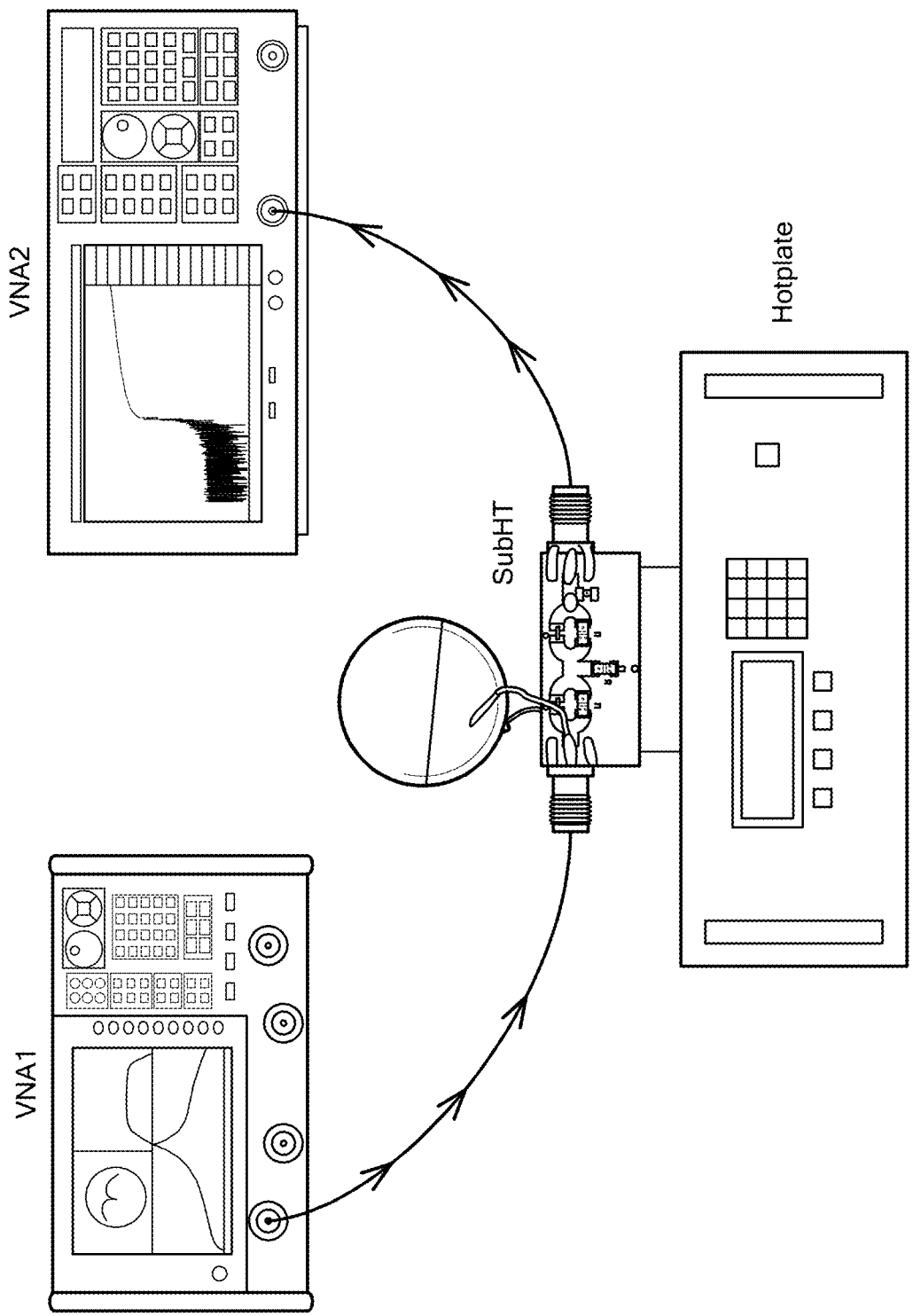
FIG. 22 illustrates the experimental setup for the wired characterization and temperature sensing of the SubHT. During the wired characterization of the sensing characteristics of the built SubHT (see FIGS. 15A-15D), two vector network analyzers (VNAs) and a temperature controlled hotplate were used. The first VNA (Keysight PNA N5221A) was continuously feeding the SubHT's input port with a signal at $f_{in}$=886 MHz, while sweeping the power from −25 dBm to 5 dBm. The second VNA (Keysight ENA E5071C) was monitoring the power of the SubHT's output port at $f_{out}$=443 MHz, while being triggered by a synchronization signal from the first VNA in order to collect all the measured data points. The SubHT was placed over a digitally controlled hotplate for a temperature sweep from 25° C. to 60° C. with steps of 2.5° C., while waiting sufficiently long for each temperature data point to make sure that a steady-state temperature at the SubHT location was reached. By relying on a commercial IR detector, it was determined that a waiting time of 10 minutes was sufficient for the SubHT to reach its steady-state temperature after any temperature changes during the experiment. For every temperature, the power sweep data was collected from the VNAs to monitor the temperature-driven shift of the $P_{out}$ vs $P_{in}$ characteristics.
Figure 23A:
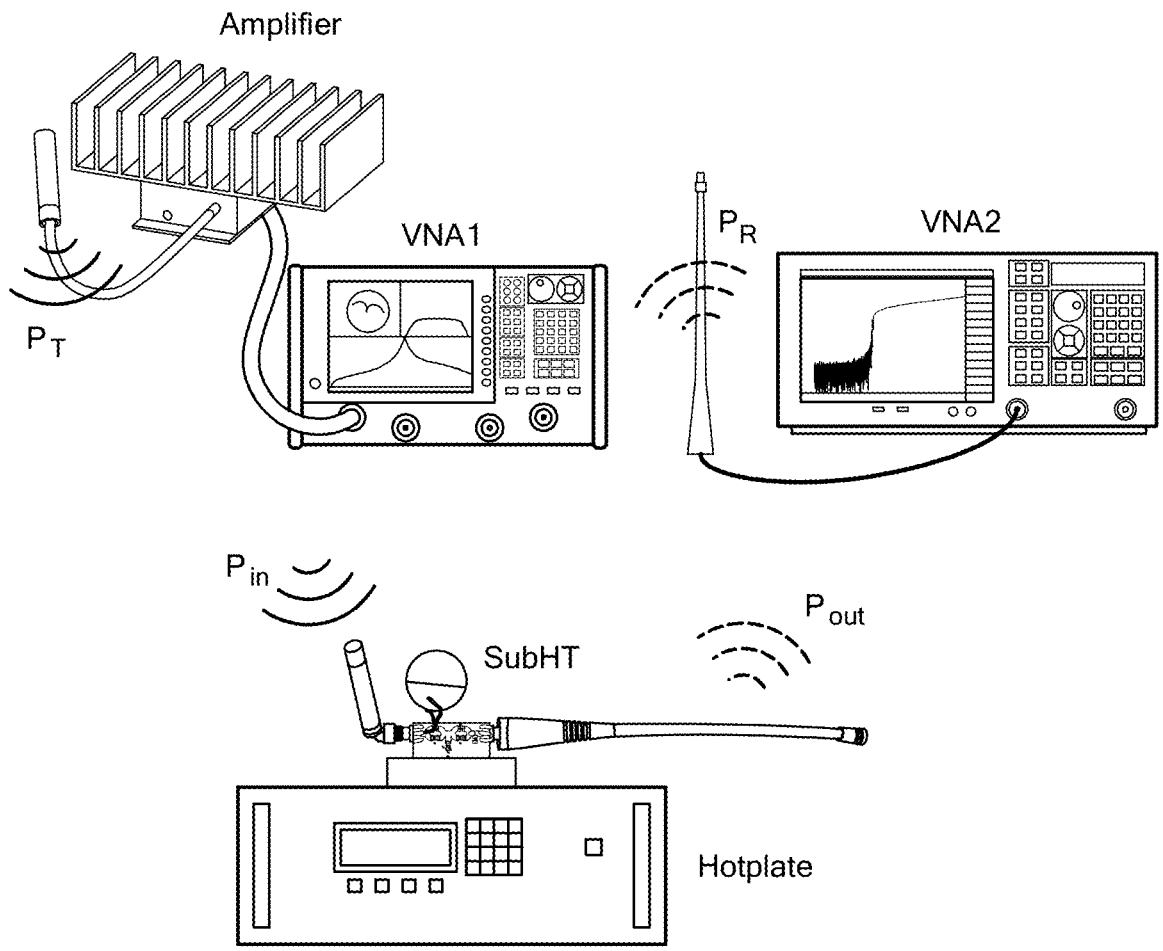
FIGS. 23A and 23B illustrate the experimental setup for the wireless temperature sensing of the SubHT.
Figure 23B:
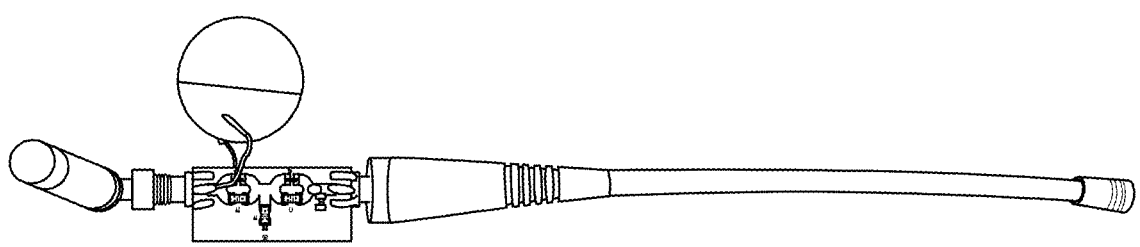

After characterizing its sensing capabilities through a wired set-up (FIG. 22), a new experiment was designed to demonstrate the ability of the built SubHT to operate as a fully passive WSN, remotely sensing any temperature variations even when operating in uncontrolled electromagnetic environments (FIGS. 23A, 23B). In order to do so, two off-the-shelf 50Ω-matched dipole antennas were connected at the SubHT's input and output ports. This rendered the SubHT simultaneously able to receive its interrogating signal wirelessly and to radiate its parametrically generated output signal. Moreover, two additional antennas, identical to those used by the subHT, were connected to the same network analyzers from the previous wired characterization (FIG. 15C). This allowed to emulate a complementary wireless interrogating transceiver like the one illustrated in FIG. 1, able to radiate an interrogating signal at 886 MHz with power $P_T$ while simultaneously receiving a portion (i.e., $P_R$) of $P_{out}$ at 443 MHz. The two network analyzers were positioned 4 meters away from the SubHT and next to each other, as depicted in FIG. 18A. As in the former experiment, the SubHT was placed on top of a digitally controlled hotplate to set the temperature value at its now remote location. All the antennas were physically oriented to minimize any polarization losses that would lower the power received by the SubHT (i.e., $P_{in}$) and reduce $P_R$. The adoption of an additional amplification stage, connected between the output port of the network analyzer used for transmission and the adjacent antenna, allowed to sweep $P_T$ between 20 dBm and 40 dBm, while varying T at the SubHT location as in the former wired experiment.

Figure 18B:
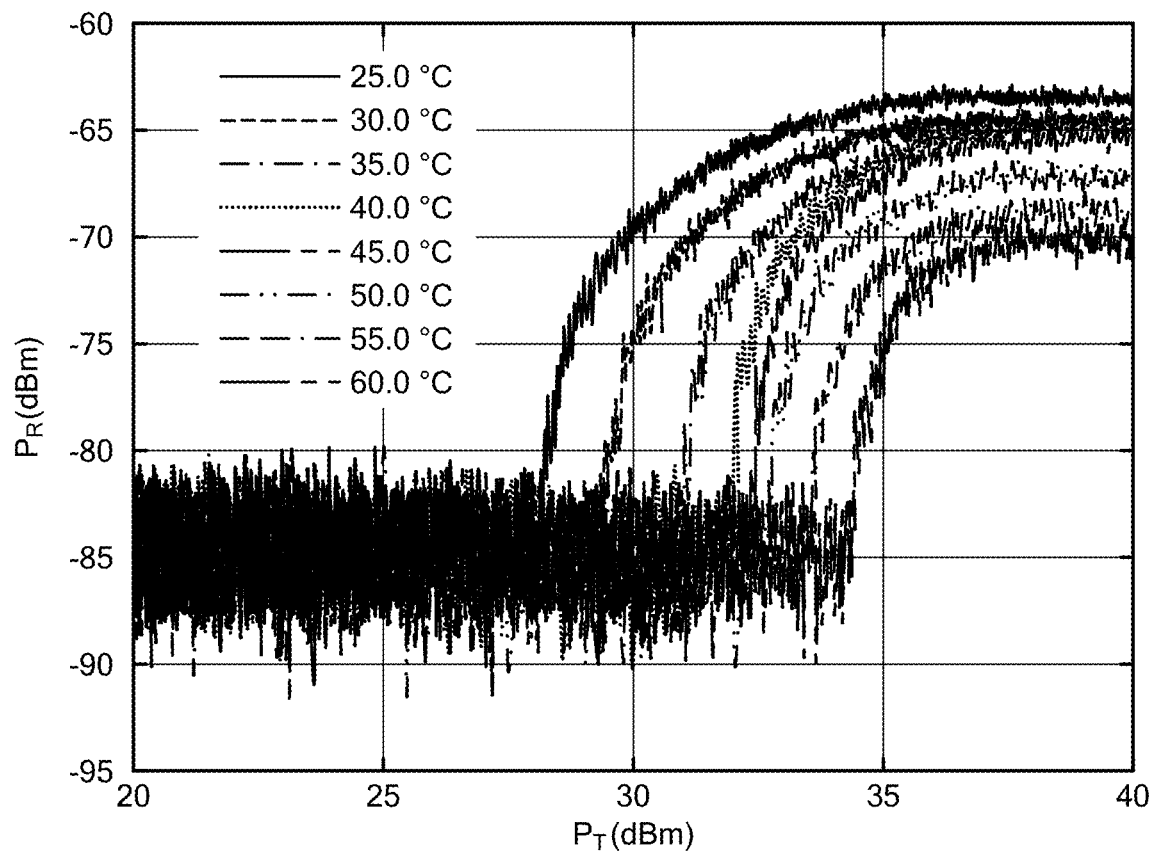
Figure 18C:
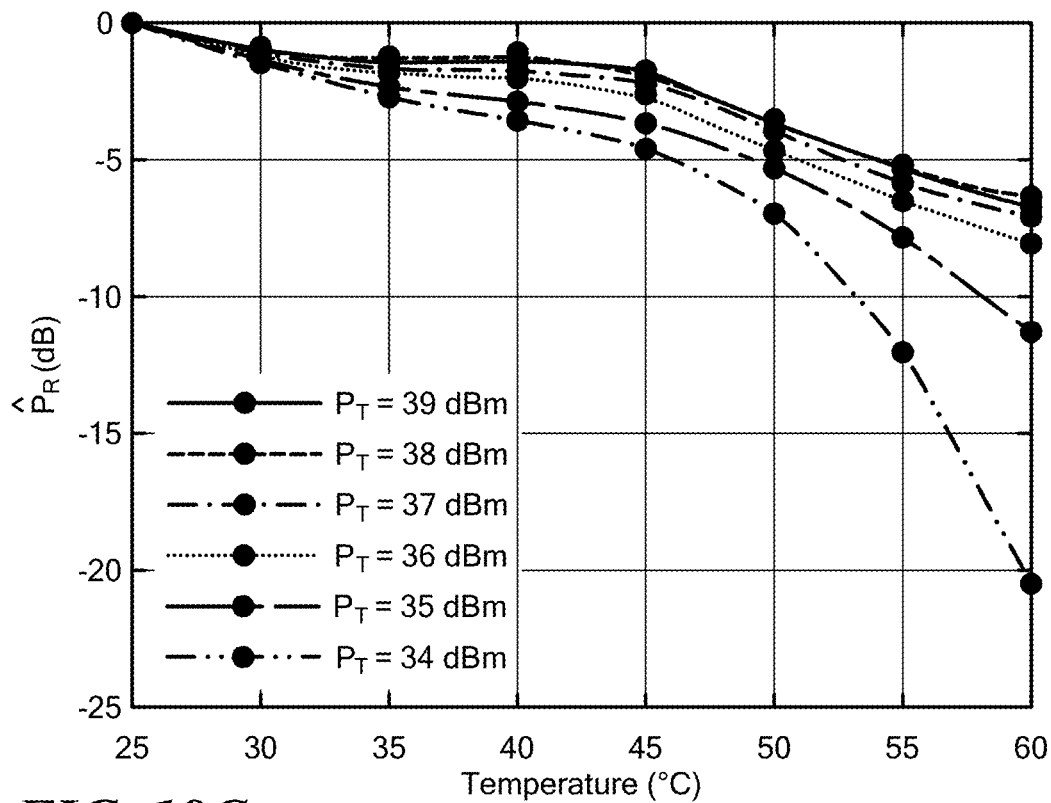
Figure 18D:
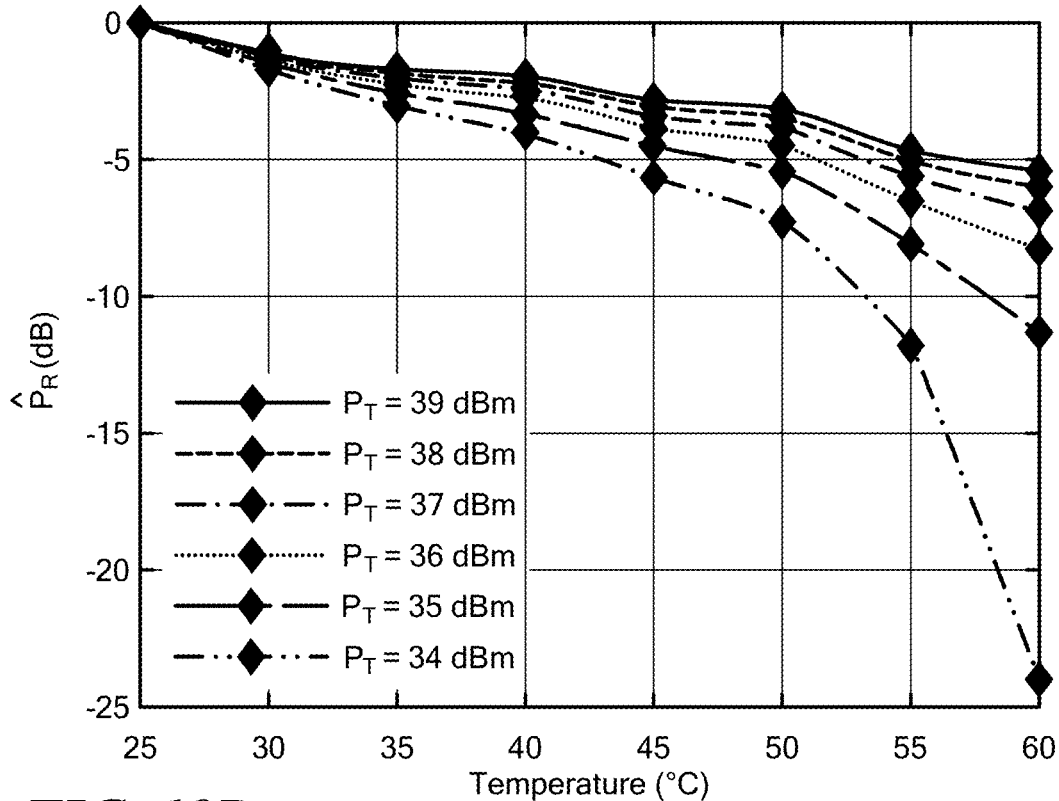

The measured $P_R$ vs. $P_T$ characteristic for the explored 30 T values is reported in FIG. 18B. As evident, distinguishable and monotonic temperature-driven changes of the $P_T$ values triggering the sub-harmonic oscillation ($P^T_{th}$) in the SubHT can be observed, even when operating the SubHT as a WSN. In particular, $P^T_{th}$ values between 27 dBm and 34 dBm were found as T was varied from 25° C. to 60° C. Such high power levels were needed to compensate for the losses encountered during the electromagnetic propagation and for those introduced by all the adopted electrical components and connections. Since for $P_T$ higher than $P^T_{th}$ the measured $P_R$ values are 20 dB or less above the noise floor of the network analyzer used to extract them, the wireless sensing of T can be achieved across the entire explored temperature range for $P_T$ values higher than 34 dBm. The measured and simulated $P_R$ values ($P^{\wedge}_R$) for all the investigated T values and normalized with respect to the corresponding $P_R$ values at 25° C. are reported in FIG. 18C and FIG. 18D respectively. As evident, a large difference ($\Delta P^{\wedge}_R$) between the $P_R$ values at 25° C. and 60° C. was found for $P_T$ equal to 34 dBm, resulting in an average sensitivity ($S^w_{avg}$) of 0.6 dB/° C. and in a dynamic range of 21 dB. A maximum measured sensitivity ($S^w_{max}$) of 3 dB/° C. was detected for the same $P_T$ value. Note that the measured $S^w_{avg}$ and $S^w_{max}$ values exceeded by nearly 4 and 19 times corresponding ones demonstrated by using advanced mm-wave imaging circuits that analyze the temperature sensitive echo generated by a 2 meters distant passive tag. The measurements showed that the built SubHT enabled longer communication ranges, up to 7 meters. Longer ranges can be provided through the use of custom low-impedance (<10Ω) antenna designs to reduce this power threshold by more than 200 times, thereby enabling much longer communication ranges and higher sensitivities, which can be exclusively limited by the receiver's power sensitivity and by the noise floor of the interrogating nodes.

Additional details regarding the subHT design flow can be described as follows. Since commercial antennas were used for this first SubHT prototype, the ultimate design goal was to minimize $P_{th}$ when terminating the SubHT input and output ports with 50Ω, which is the input impedance of the majority of the commercial antennas available on the market. For this purpose, following the theoretical study in Hussein et al. on the stability of varactor-based parametric systems and components, a varactor device was selected with a small capacitance ($C_0$) when left unbiased and characterized by the largest capacitance tuning range that could be found. Yet, any varactors with a $C_0$ value smaller than 200 fF were avoided, as this would have resulted in the need of inductors that are too large to avoid self-resonance at 886 MHz. By relying on the previously constructed simulation and design frameworks and by using a circuit topology that includes a shunted inductor before the output port (to reduce the electrical loading caused by the SubHT output antenna) and a commercial thermistor after the input port, an optimization process was run to determine the optimum values of the other electrical components of the SubHT, along with the best geometrical characteristics of the layout elements (microstrips and vias) used for interconnections. Such process allows to find the proper circuit parameters that resonate and minimize the impedances seen by the adopted variable capacitor at both 886 MHz and 443 MHz. This optimization process was performed in a commercial harmonic-balance (HB) simulator using the simulation technique of Hussein et al. to detect the rising of sub-harmonic oscillations in largely-modulated nonlinear dynamical systems. This technique, referred to as the power auxiliary generator technique, was developed to detect the existence of bifurcations in the operation of largely-driven varactor-based circuits through standard harmonic-balance algorithms, along with the steady-state operational response exhibited by such systems. The optimal components selected after completing the optimization routine are listed in Table 2.

TABLE 2

Values of the components used in the SubHT prototype.

| Component | Nominal Value | Model |
| --- | --- | --- |
| $C_3$ (varactor diode) | 1.24 pF | Skyworks SMV1430 |
| $C_1$ | 1.5 pF | GJM1555C1H1R5WB01 |
| $C_2$ | 1.4 pF | GJM1555C1H1R4WB01 |
| $L_1$ | 39 nH | 1206CS-390XGLB |
| $L_2$ | 22 nH | 1206CS-220XGLB |
| $L_3$ | 22 nH | 1206CS-220XGLB |
| $L_{matching}$ | 1.8 nH | 0603HP-1N8XJLU |
| $R_T$ (Thermistor) | 2.6Ω | B59810C0120A070 |

Another parameter for any temperature sensors is the minimum temperature resolution, which represents the smallest temperature change that can be reliably sensed and distinguished by any existing background noise generated from stochastic fluctuations in the electrical response of the adopted temperature sensitive component (for example, a thermistor) or from those originated from the electronic equipment used for read-out. Similarly to any other intensity level sensors using the output power of a system as the manner to extract the temperature information, the minimum resolution can be found from the ratio between the largest magnitude of the noise-driven output power fluctuations ($\Delta P_{out}$) and the sensitivity of the sensor. However, differently from any previously reported temperature sensors and as shown herein, such ratio generally depends on the selected SubHT operational point, thus varying with $P_{in}$ and with T. As the interest is in characterizing the minimum resolution that the built SubHT can achieve, the SubHT was made to work at the operational temperature enabling the highest temperature sensitivity (i.e. 57.5° C.). Also, since the sensitivity of SubHTs is generally dependent on $P_{in}$, $\Delta P_{out}$ was experimentally extracted at many $P_{in}$ values. In order to measure $\Delta P_{out}$, a continuous-wave (CW) signal was injected at 886 MHz into the input port of the built SubHT, characterized by $P_{in}$ values ranging from −20 dBm to −12 dBm. On the other hand the output of the SubHT was monitored at 443 MHz after setting the IF bandwidth of the measurements to 100 Hz. By monitoring the time fluctuations of $P_{out}$ for any explored $P_{in}$ values, $\Delta P_{out}$ was extractable by calculating the maximum variation of $P_{out}$ over the considered time period. Then, by using Eq. 2 and after extracting the temperature sensitivity relative to each investigated $P_{in}$ from Fig. P4, the trend of the resolution vs. $P_{in}$ was found that showed the minimum resolution at the $P_{in}$ value giving the highest temperature sensitivity (Fig. SUPP 5).

$$Resolution = \frac{\Delta P_{out}}{Sensitivity} \quad (2)$$

Example 3

In a further example, through the adoption of a parametric alarm sensor tag (PAST) as described above, it was possible to remotely detect, in an uncontrolled electromagnetic environment, temperature violations triggered at −25° C. (i.e. the typical storage temperature along the cold-chain for deep-frozen meat and fish) from a record-high distance of 46 meters, not in a line-of-sight.

A prototype was built that employed a 870 MHz PAST and was shown, due to its characteristics, to be able to identify any items along a cold-chain whose temperature exceeded a remotely configurable $T_{th}$ value as low as −47° C., even if operating in uncontrolled electromagnetic environments and up to 46 meters away from the corresponding PAST, not in a line-of-sight.

Figure 19A:
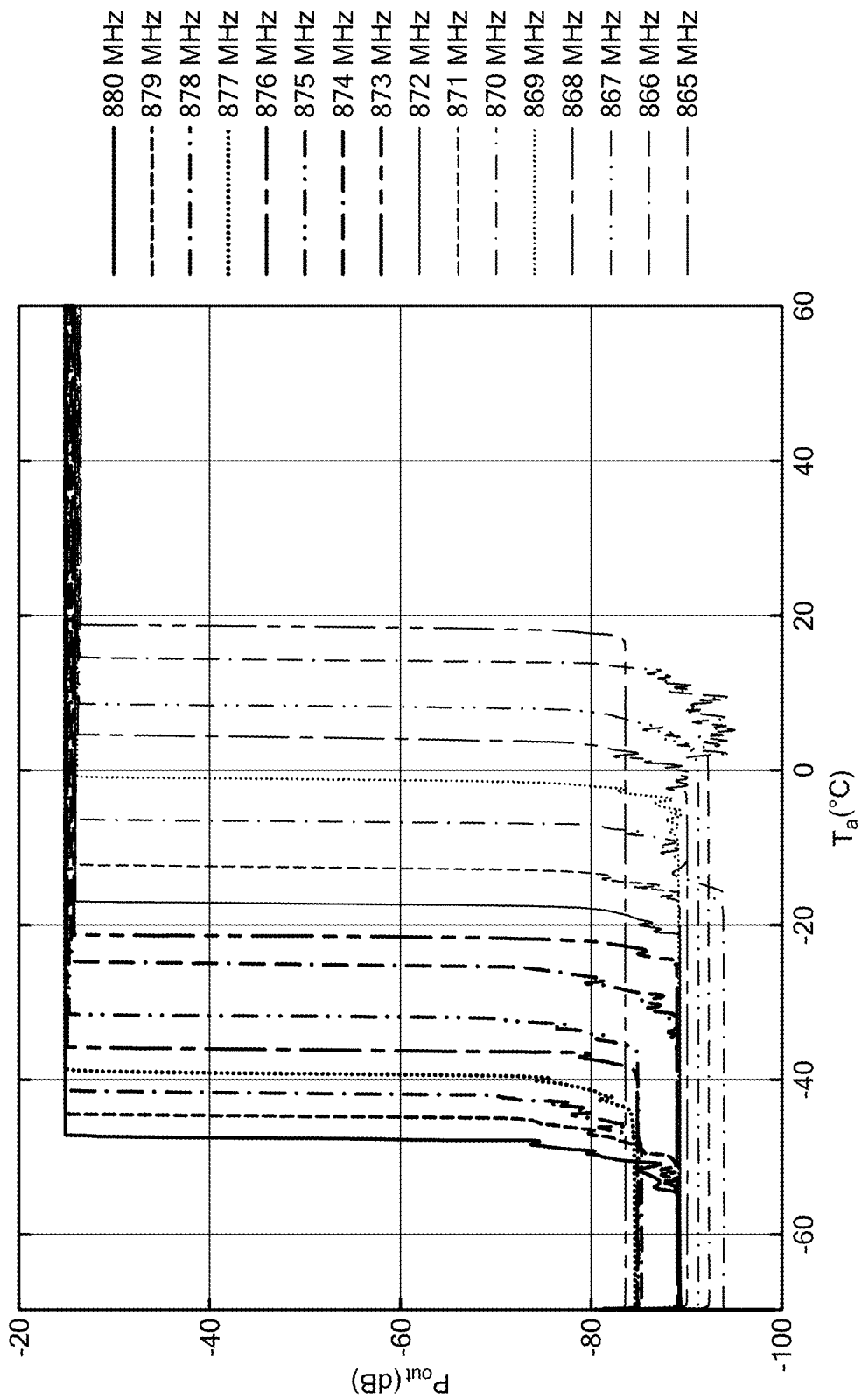
FIGS. 19A-19C illustrate temperature threshold characterization of the built PAST.

In order to experimentally demonstrate the performance features of PASTs, the was built (see FIG. 9) on a printed-circuit-board (PCB) made of FR-4, operating at $f_{in}$ 870 MHz and relying on two commercial antennas designed to operate around 870 MHz (i.e. "Antenna-A") and 435 MHz (i.e. "Antenna-B"), a set of off-the-shelf lumped components [four inductors (L1, L2, L3 and L4), two capacitors (C1 and C2)] and a commercial off-the-shelf thermistor (see Table 1 for the model numbers of all components). The lumped components were selected ad-hoc, following the design methodology based on the stability of diode-based parametric circuits, in order to minimize the minimum received power level ($P_{th}$) at which a frequency-division can be triggered. By doing so, in fact, the reading range at $f_{out}$ can be greatly extended and the largest distance (d) between the illuminator and any one of its illuminated tags can be used, allowing, in any practical operational scenarios, to increase the number of PASTs and consequently of items that any illuminator can simultaneously reach. First, the $P_{out}$ vs. the $T_a$ characteristic of the built PAST placed in a digitally-controlled temperature chamber was characterized. The characterization was performed through a wired experiment after connecting the PAST's input and output ports to two synchronized network analyzers, respectively acting as a generator at $f_{in}$ and as a power meter at $f_{out}$. FIG. 19A reports the measured $P_{out}$ vs. $T_a$ for a fixed $P_{in}$ (−11 dBm) and for a set of $f_{in}$ values giving radically different $T_{th}$ values, ranging from −47° C. to 19° C. From FIG. 19A, it is evident how the built PAST undergoes sudden changes in its output power as the temperature surpasses specific $T_{th}$ values set by $f_{in}$. In particular, the measured trend of $T_{th}$ vs. $f_{in}$ is reported in FIG. 19B for a $P_{in}$ value of −11 dBm, further showing that the frequency division mechanism encoding the occurrence of a temperature violation event can be triggered at largely different $T_{th}$ values by remotely controlling the value of $f_{in}$.

Figure 19B:
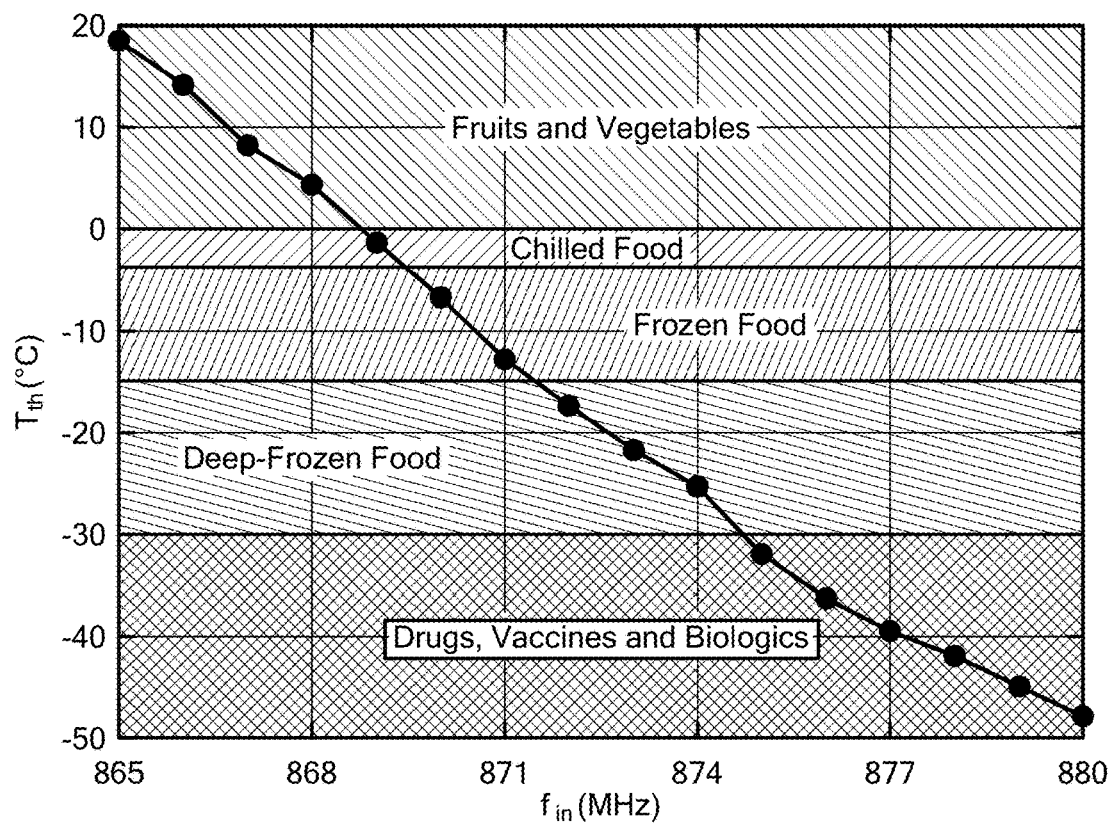
Figure 19C:
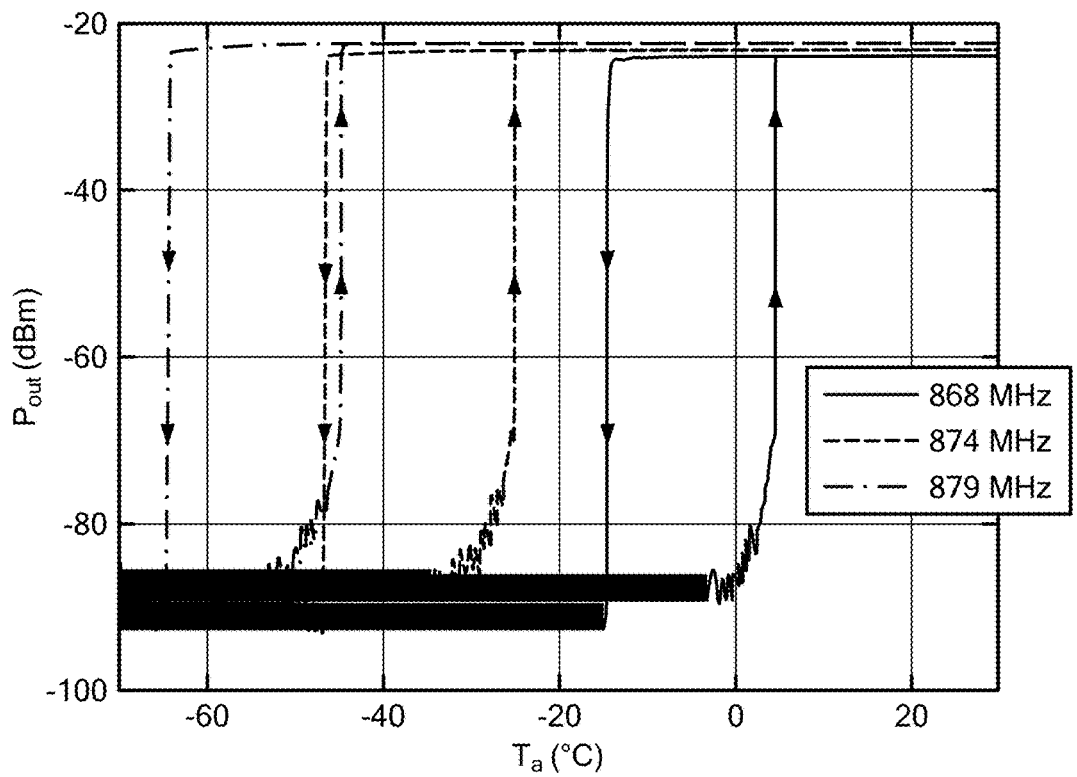

In order to demonstrate the existence of a parametrically-induced temperature-controlled hysteresis behavior across the same range of $T_{th}$ values found in FIG. 19B, $P_{out}$ was studied when sequentially selecting $f_{in}$ to set $T_{th}$ to three different values (−45° C., −25° C. and 4° C.), representative of the majority of the storage temperatures at which any perishables foods or drugs are preserved along the cold-chain. For each driving condition, a temperature sweep from −70° C. to 10° C. was applied, followed by a backward sweep bringing the temperature back to −70° C. As evident from FIG. 19C, a hysteresis-loop was found for each explored $f_{in}$ value, showing that the system dynamics of the PASTs can serve as a tool to reconstruct the equivalent functionality of a 1-bit temperature-controlled non-volatile memory, even though the PAST's circuit included conventional and printable memory-less components. Also, for each targeted $T_{th}$, an achievable hysteresis width higher than 20° C. was found, ensuring that the subharmonic signal generated at the occurrence of a temperature violation event continued to be sustained even if the temperature ultimately returned to the tolerable range or if the PAST was affected by small temperature fluctuations, such as can occur during the transportation or the delivery of any refrigerated items. Note also that the achievement of such significant hysteresis widths minimizes the chances of missing any temperature violations even when readers relying on extremely low duty-cycles are used.

Figure 20A:
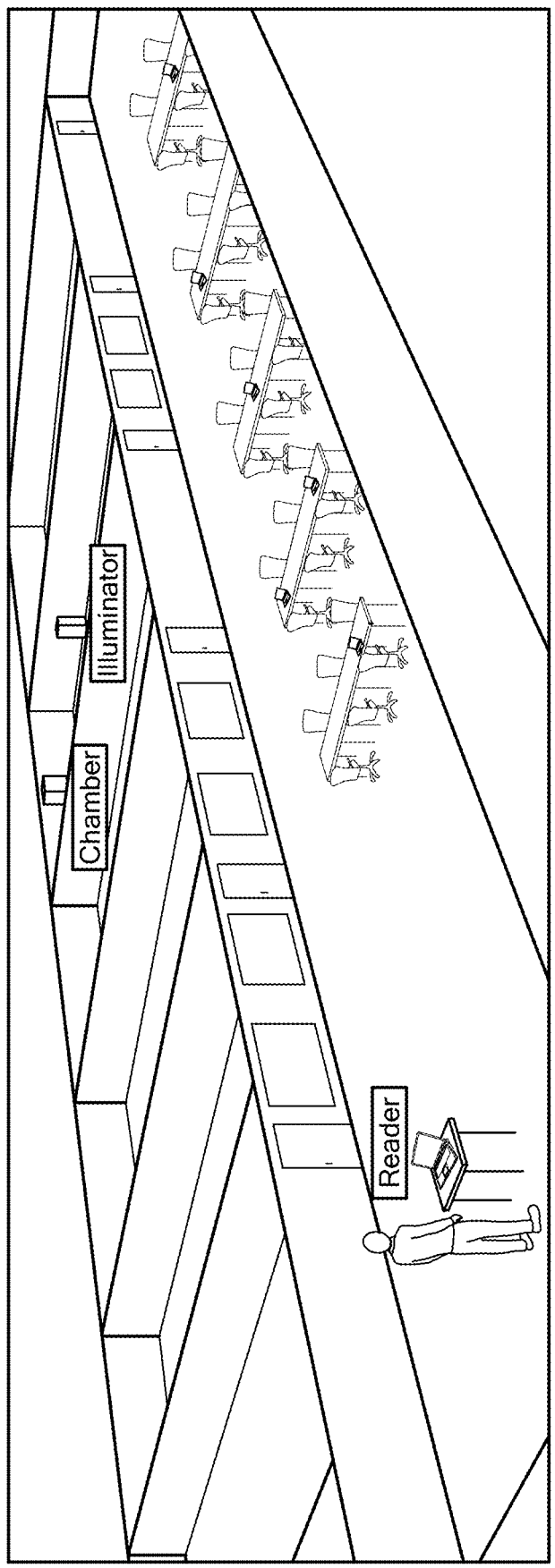
FIG. 20A-20C illustrate wireless characterization of the built PAST.
Figure 20B:
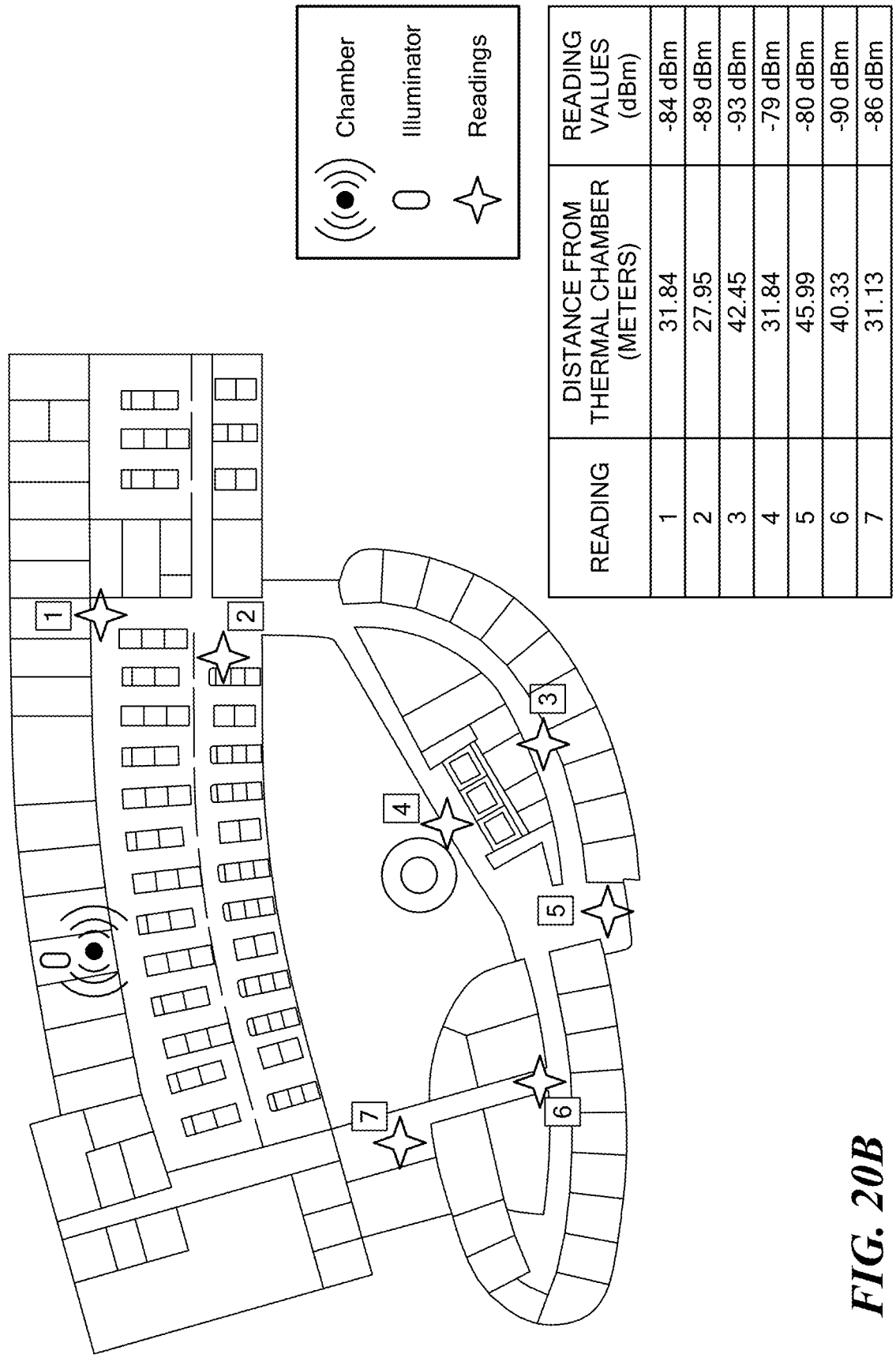
Figure 20C:
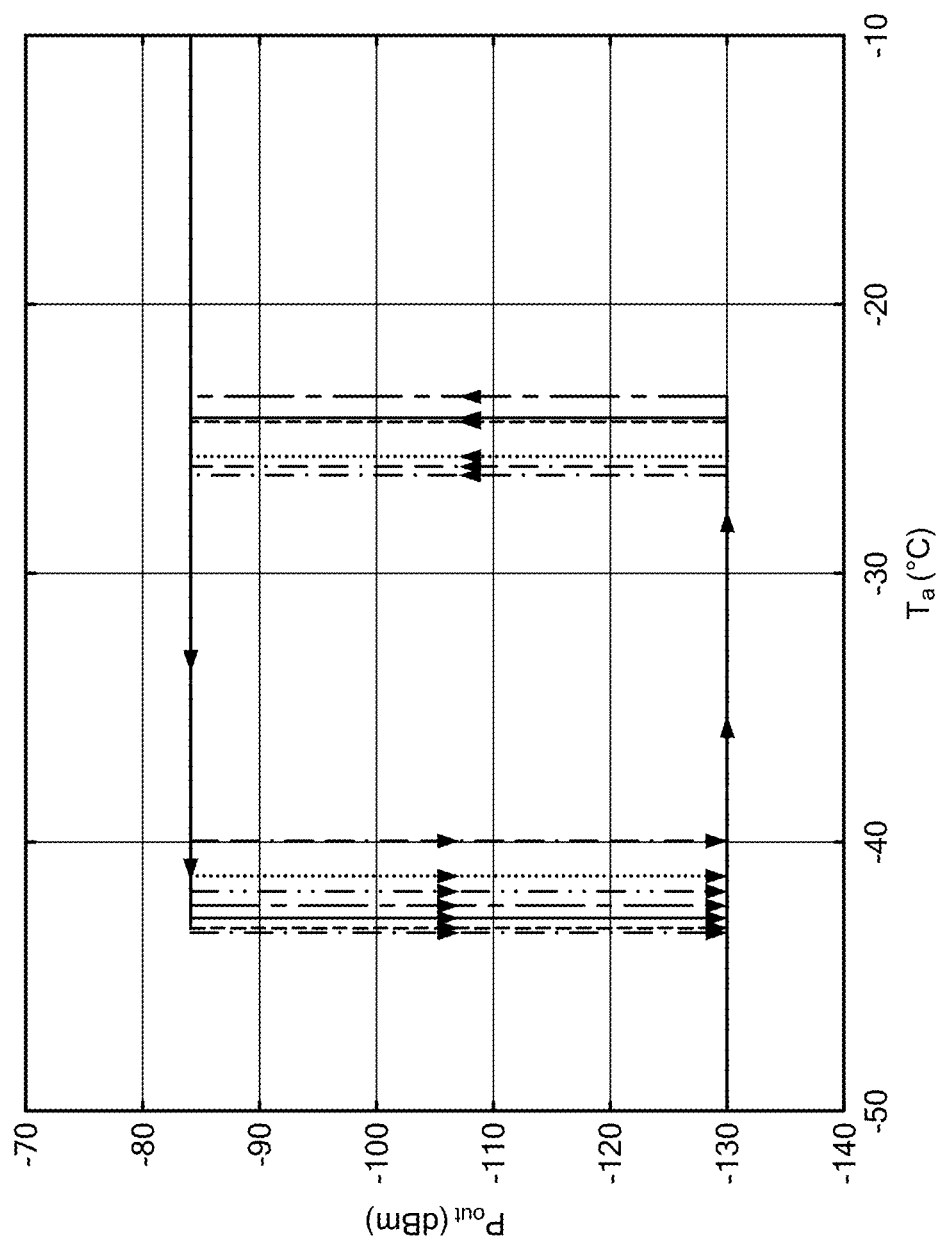

Following the completion of the wired experiment, a wireless characterization was implemented after connecting the input and output ports of the built PAST, still located in the chamber, to Antenna-A and to Antenna-B. Also, an antenna identical to Antenna-A was connected to the signal generator adopted in the wired experiment to enable a wireless injection of $P_{in}$. The signal generator, here acting as an illuminator and configured to transmit a total power of 20 dBm, was placed at the largest possible distance from the PAST, considering the dimensions of the laboratory space where the chamber was located. Finally, the same spectrum analyzer used as power meter in the wired experiment was employed to verify that a long-distance remote detection of any temperature violations was indeed possible, even when operating in an uncontrolled electromagnetic environment. In order to do so, the spectrum analyzer, whose input port was connected to an antenna identical to Antenna-B, was moved farther away (FIG. 20A), to another indoor space in areas of RF devices and wireless communication. Meanwhile, $f_{in}$ was tuned to set $T_{th}$ to −25° C. by properly configuring the output frequency of the signal generator (see FIG. 19B). During this wireless characterization, the expected dynamical changes triggered by the PAST's temperature exceeding $T_{th}$ were detected at many locations highlighted in the floor-map shown in FIG. 20B. This permitted to demonstrate the capability enabled by PASTs of achieving extraordinarily high detection ranges, here approaching 46 meters not in a line-of-sight. Also, after placing the reader at one of the investigated locations and after running the same temperature cycle executed during the wired characterization (FIG. 19C) multiple times (each cycle lasting 50 minutes), the built PAST responded very similarly to the occurrence of all the scheduled temperature violations, showing, for all the executed runs, $T_{th}$ values matching closely the targeted value (i.e. −25° C., see FIG. 20C) and not significantly affected by the random changes that inevitably occur in any uncontrolled electromagnetic scenarios.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A sensing device comprising:
    an input port and an output port; and
    sensing circuitry, connected to the input port and the output port, comprising:
        a sensor having an impedance sensitive to a parameter of interest,
        one or more passive electrical components, and
        a variable capacitor connected to the sensing circuitry;
    wherein the sensing circuitry is triggered to generate an output signal for transmission from the output port, the output signal dependent on the parameter of interest sensed by the sensor and on an input power value, $P_{in}$, of an input signal received at the input port being greater than a parametric threshold power value, $P_{th}$;
    wherein the sensing circuitry is operative to vary the parametric threshold power value, $P_{th}$, and an output power value, $P_{out}$, of the output signal in response to perturbations of the parameter of interest;
    wherein the sensing circuitry is operative to activate, responsive to the variation of the parametric threshold power value, $P_{th}$, at least one of a period doubling mechanism through a super-critical bifurcation triggered by the input power of the input signal or a frequency divider circuit through a sub-critical bifurcation triggered by the input power of the input signal to generate the output signal at an output frequency that is half of an input frequency of the input signal;
    wherein the sensing circuitry is operative, subsequent to activation of the period doubling mechanism through the super-critical bifurcation and/or the frequency divider circuit through the sub-critical bifurcation, to exhibit a hysteresis behavior, whereby the output signal remains active when a value of the parameter of interest sensed by the sensor returns to a tolerable range of values.

2. The device of claim 1, wherein the sensing circuitry is operative as a frequency divider circuit to generate the output signal at an output frequency that is half of an input frequency of the input signal.

3. The device of claim 1, wherein the parametric threshold power value $P_{th}$ is determined by the impedance of the sensor, a junction capacitance and tuning range of the variable capacitor, or impedances of the passive electrical components of the sensing circuitry.

4. The device of claim 1, wherein the parametric threshold power value $P_{th}$ is a minimum power value at which the sensing circuitry is operable.

5. The device of claim 1, wherein the sensing circuitry is operative to boost a sensitivity to the parameter of interest and a dynamic range of the output power value, $P_{out}$, in proximity to a supercritical bifurcation.

6. The device of claim 1, wherein the output signal is representative of a continuous measurement of the parameter of interest or passing of a threshold value of the parameter of interest.

7. The device of claim 1, wherein the passive electronic components include a plurality of inductors and capacitors connected in series or in parallel, and/or one or both of the input port and the output port are connected to an antenna for wireless communication.

8. The device of claim 1, wherein the sensor is a temperature sensor, pressure sensor, humidity sensor, vibration sensor, acceleration sensor, strain sensor, magnetic sensor, gyroscopic sensor, infrared sensor, chemical sensor, gravitational sensor, radio frequency identification (RFID) sensor, or environmental sensor.

9. The device of claim 1, wherein the parameter of interest is a temperature, and the sensor is a temperature sensor, and wherein the temperature sensor is a thermistor, a thermocouple, a resistance temperature detector, an integrated circuit temperature sensor, or a microelectromechanical acoustic resonator.

10. The device of claim 1, wherein the sensor comprises a resonator having a resonance frequency $f_{res}$ and an electrical response sensitive to the parameter of interest, and the sensing circuitry is operative to trigger the output signal when a received input frequency is at or close to a multiple of the resonance frequency.

11. The device of claim 10, wherein the resonator is an acoustic-based transponder or a microelectromechanical acoustic resonator or a piezoelectric acoustic resonator.

12. The device of claim 1, wherein the sensing circuitry is further operative to generate from the input signal a further output signal with a polarization orthogonal to a polarization of the output signal.

13. The device of claim 1, wherein the device is disposed in a cold storage device, a refrigerator, a freezer, a cold storage facility, a cold transportation vehicle, on food packaging, on medical packaging, on drug packaging, in concrete, on a bridge, in a tunnel, in a building, or in a structure.

14. A sensing system comprising:
the sensing device of claim 1; and
a transmitting device comprising a transmitter operative to transmit the input signal to the sensing device at a frequency representative of the parameter of interest; and
a receiving device operative to receive the output signal from the sensing device and determine a strength of the parameter of interest at the sensing device based on the output power of the output signal.

15. The sensing system of claim 14, wherein the receiving device is operative in a stand-by mode to awaken upon receipt of the output power signal.

16. A method of sensing a parameter of interest, comprising:
providing the sensing device of claim 1 at a location to sense the parameter of interest;
transmitting the input signal from a transmitting device to the sensing device to generate the output signal from the sensing device, the output signal having a frequency that is half of the frequency of the input signal transmitted by the transmitting device; and
receiving the output signal from the sensing device at a receiving device and determining a strength of the parameter of interest at the sensing device based on the output power of the output signal.

17. The device of claim 11, wherein the resonator is the piezoelectric acoustic resonator, the piezoelectric acoustic resonator including a piezoelectric material selected from the group consisting of $LiNbO_3$, AlN, AlScN, PZT, and lithium tantalate.

18. The device of claim 1, wherein the sensing circuitry is operative, responsive to a temporary interruption of the input signal received at the input port, to deactivate the period doubling mechanism and/or the frequency divider circuit and end the hysteresis behavior.

* * * * *